US008304566B2

(12) United States Patent
Cantizani

(10) Patent No.: US 8,304,566 B2
(45) Date of Patent: Nov. 6, 2012

(54) PROCESSES AND APPARATUS FOR SMALL-SCALE IN SITU BIODIESEL PRODUCTION

(76) Inventor: Antonio Cantizani, Sao Paulo (BR)

( * ) Notice: Subject to any disclaimer, the term of this patent is extended or adjusted under 35 U.S.C. 154(b) by 0 days.

(21) Appl. No.: 13/416,395

(22) Filed: Mar. 9, 2012

(65) Prior Publication Data

US 2012/0167648 A1   Jul. 5, 2012

(51) Int. Cl.
*C11C 3/00* (2006.01)
(52) U.S. Cl. ........ 554/169; 554/124; 554/174; 554/167; 554/168; 554/170
(58) Field of Classification Search .................. None
See application file for complete search history.

(56) References Cited

U.S. PATENT DOCUMENTS

| | | | |
|---|---|---|---|
| 2,383,579 A | 8/1945 | Allen et al. | |
| 2,494,366 A | 10/1950 | Sprules et al. | |
| 2,551,254 A | 5/1951 | Dunning | |
| 3,428,660 A | 2/1969 | Morren | |
| 4,164,506 A | 8/1979 | Kawahara et al. | |
| 4,695,411 A | 9/1987 | Stern et al. | |
| 4,901,635 A | 2/1990 | Williams | |
| 5,188,090 A | 2/1993 | Griggs | |
| 5,385,298 A | 1/1995 | Griggs | |
| 5,578,090 A * | 11/1996 | Bradin | 44/308 |
| 6,015,440 A | 1/2000 | Noureddini | |
| 6,440,057 B1 | 8/2002 | Ergun et al. | |
| 6,627,784 B2 | 9/2003 | Hudson et al. | |
| 6,768,015 B1 | 7/2004 | Luxem et al. | |
| 6,965,044 B1 | 11/2005 | Hammond et al. | |
| 7,045,100 B2 | 5/2006 | Ergun et al. | |
| 7,087,771 B2 | 8/2006 | Luxem et al. | |
| 7,112,229 B2 | 9/2006 | Khalil et al. | |
| 7,360,755 B2 | 4/2008 | Hudson et al. | |
| 2003/0032826 A1 | 2/2003 | Hanna | |
| 2003/0229238 A1 | 12/2003 | Fleisher | |
| 2005/0027137 A1 | 2/2005 | Hooker | |
| 2006/0074256 A1* | 4/2006 | Alasti | 554/174 |
| 2006/0080891 A1 | 4/2006 | Ghosh et al. | |

(Continued)

FOREIGN PATENT DOCUMENTS

CN   1900223 A   *   1/2007

(Continued)

OTHER PUBLICATIONS

DE 102006047580 A1, Koerber, H. et al., English Abstract, 2 pages.*

(Continued)

*Primary Examiner* — Yate K Cutliff
(74) *Attorney, Agent, or Firm* — Brown & Michaels, PC

(57) ABSTRACT

Processes and apparatus produce economically feasible biodiesel without subsidies. Toward that end, integrated small plants process materials containing lipids with anhydrous bioethanol as solvent and reactant, and sulfuric acid and potassium hydroxide mainly as catalysts to produce up to 3 million gallons of biodiesel per plant per year. The product is predominantly fatty acids ethyl esters (FAEE) and a chemically-enhanced organic fertilizer as byproduct. The raw material may include a wide variety of non-edible solid matter that contains lipids, which normally have from 0.5% to 80% by weight of free fatty acids in total oils. Multiple apparatus makes this process feasible. In addition to not competing with food production, since they supply fertilizer for small scale farmers, the processes and apparatus allow sustainable liquid fuel production.

11 Claims, 11 Drawing Sheets

U.S. PATENT DOCUMENTS

| | | |
|---|---|---|
| 2006/0288636 A1 | 12/2006 | Iijima et al. |
| 2007/0010681 A1 | 1/2007 | Dall' Agnol et al. |
| 2007/0175092 A1 | 8/2007 | Ames |
| 2007/0196250 A1 | 8/2007 | Leveson et al. |

FOREIGN PATENT DOCUMENTS

| | | | |
|---|---|---|---|
| DE | 102006047580 A1 | * | 3/2008 |
| GB | 2078542 A | | 1/1982 |

OTHER PUBLICATIONS

CN 1900223A, Yuan Z, et al., English translation, 8 pages.*
Naughton, F.C., Castor Oll, Jul. 2011, Kirk-Othmer Encyclopedia of Chemical Technology, 21 pages including cover.*
Casanave, D., et al., Diesel fuels from biomass, 2007, Pure Appl. Chem., vol. 79, No. 11, pp. 2071-2081.*
M. E. Porter, 1996. "What is Strategy?" Harvard Business Review, Nov./Dec. 1996, pp. 61-78. See mainly the underlined parts and figure on p. 73.
M. J. Haas et al., 2000, Simple, High-Efficiency Synthesis of Fatty Acid Methyl Esters from Soapstock, JAOCS (Journal of the American Oil Chemists' Society), vol. 77, No. 4, pp. 373-379. See mainly the underlined parts.
S. Özgül et al., 1993. "In situ Esterification of Rice Bran Oll with Methanol and Ethanol". JAOCS, vol. 70, No. 2, pp. 145-147. See mainly the underlined parts.
E. T. Champagne et al., 1992. "Utilizing Ethanol to Produce Stabilized Brown Rice Products". JAOCS, vol. 69, pp. 205-208. See mainly the underlined parts and figures 3, 4 and 5.
S. Özgül et al., 2003, "FA Monoalkylesters from Rice Bran Oil by in Situ Esterification". JAOCS, vol. 80, No. 1, pp. 81-84. See mainly the underlined parts and Table 3.
V. B. Veljkovic et al.,2006. "Biodiesel production from tobacco (*Nicotiana tabacum* L.) seed oil with a high content of free fatty acids". Fuel 85 (2006) pp. 2671-2675. See mainly the Abstract, figures 1 and 2 and the underlined parts.
N. A. Khan et al., 1953. "The Composition of Coffee Oil and its Component Fatty Acids". JAOCS, Dec. 1953, pp. 606-609. See mainly Table III and the Summary on p. 609.
A. S. Ramadhas et al., 2005. "Biodiesel production from high FFA rubber seed oil". Fuel (2005), pp. 335-340. See mainly the Abstract, figures 1,3 and 4 and the underlined parts.
Y. Chisti, 2007. "Biodiesel from microalgae". Biotechnology Advances 25 (2007) pp. 294-306. See mainly the Abstract, the Conclusion and the References.
H. Özgünay et al., 2007. "Performance and emission study of biodiesel leather industry pre-fleshings". Waste Management 27 (2007), pp. 1897-1901. See mainly the Results and the Discussion and also Table 1 and the underlined parts.
EBB—European Biodiesel Board, Statistics, The EU biodiesel industry, on the following site accessed on Oct. 21, 2007 www.ebb-eu.org/stats.php. See the statistics.
Biodiesel, The Official Site of the National Biodiesel Board, Biodiesel Production Estimate Graph, on the following site www.biodiesel.org,accessed on Oct. 21, 2007. See mainly the figures and the underlined parts.
S. Friedrich, 2004, "A World Wide Review of the Commercial Production of Biodiesel—A technological, economic and ecological investigation based on case studies". Institu für Technologie and Nachhaltiges Produkt Management der Wirtschaftsuniversitat, A-1090 Wien, Augasse 2-6, Austria. See all paper.
M. M. Azam et al.,2005 "Prospects and potential of fatty acids methyl esters of some non-traditional seed oils for use as biodiesel in India". Biomass and Bioenergy 29 (2005), pp. 293-302. See mainly the underlined parts and Table 1.
A. Demirbas, 2003. "Biodiesel fuels from vegetable oils via catalytic and non-catalytic supercritical alcohol transesterification and other methods: a survey". Energy Conversion and Management 44 (2003), pp. 2093-2109. See mainly the Abstract, Table3, the Conclusions and the underlined parts.
M. Di Serio et al., 2005. "Synthesis of biodiesel via homogenous Lewis acid catalyst". Journal of Molecular Catalysis: Chemical 239 (2005), pp. 111-115. See mainly the underlined parts and figures 2 and 3.
H. S. Ginwat et al., 2005. "Seed source variation in growth performance and oil yield of *Jatropha curcas* in Central India". Silvae Genetica, 2004 published 2005 (vol. 53), (No. 4), pp. 186-192. See mainly the Abstract and the Discussion.
R. J. Hron, Sr et al., 1984. "An Acqueous Ethanol Extraction Process for Cottonseed Oil". JAOCS, vol. 61, No. 9, pp. 1457-1460. See mainly the underlined parts and Fig. 1.
L. A. Johnson et al., 1983. "Comparison of Alternative Sovents for Oils Extraction" JAOCS, vol. 60, No. 2, pp. 229-242. See mainly the underlined parts.
J. Lu et al., 2002. "Nearcritical and supercritical ethanol as a benign solvent: polarity and hydrogen-bonding". Fluid Phase Equilibria 198 (2002), pp. 37-49. See mainly the underlined parts and figures 7, 8 and 9.
G. Kildiran et al., 1996. "In-situ Alcoholysis of Soybean Oil". JAOCS, vol. 73, No. 2, pp. 225-228. See mainly the underlined parts and Tables 2 and 3.
K. J. Harrington et al., 1985. "A Comparision of Conventional and in situ Methods of Transesterification of Seed oil from a Series of Sunflower Cultivars." JAOCS, vol. 62, No. 6, pp. 1009-1013. See mainly the underlined parts.
K. J. Harrington et al., 1985. "Transesterification in Situ of Sunflower Seed Oil". Ind. Eng. Chem. Prod. Res. Dev. 1985, 24, pp. 314-318. See mainly the underlined parts and Schemes II and III.
S. Siler-Marinkovic et al., 1998. "Transesterification of sunflower oil in situ". Fuel, vol. 77, No. 12, pp. 1389-1391. See mainly the underlined parts and Tables 1 and 2.
P. Cancalon, 1971. "Chemical Composition of Sunflower Seed Hulls". JAOCS, vol. 48, October, pp. 629-632. See mainly the underlined parts and Tables I and II.
T. P. Hensarling et al., 1974. "Extraction of Lipids from Cottonseed Tissue: IV Use of Hexane-Acetic Acid". JAOCS, vol. 51, April, pp. 166-168. See mainly the underlined parts.
T. P. Hensarling et al., 1983. "Solvent Extraction of Lipids from Soybeans with Acidic Hexane". JAOCS, vol. 60, No. 4, pp. 783-784. See mainly the underlined parts and Table I.
E. Lotero et al., 2005. "Synthesis of Biodiesel via Acid Catalysis". Ind. Eng. Chem. Res. vol. 44, pp. 5353-5363. See mainly the underlined parts.
G. Vicente et al., 2004. "Integrated biodiesel production: a comparison of different homogenous catalysts systems". Bioresource Technology, vol. 92, pp. 297-305. See mainly the underlined parts and Fig. 3.
A. Cantisani, 2006. "Technological innovation processes revisited". Technovation, 26, pp. 1294-1301. See mainly items 1,4 and 6.
R. K. Rao et al., 1958. "Alcoholic Extraction of Vegetable Oils. V. Pilot Plant Extraction of Cottonseed by Aqueous Ethanol". JAOCS, vol. 35, June, pp. 277-281. See mainly the underlined parts, Fig. 6 and Tables II and III.
R. J. Hron, Sr et al., 1992. "Acidic Ethanol Extraction of Cottonseed". JAOCS, vol. 69, No. 9, pp. 951-952. See mainly the underlined parts.
H. J. Berchmans et al., 2007. "Biodiesel production from crude *Jatropha curcas* L. seed oil with high content of free fatty acids". Bioresource Technology, doi:10.1016/j.biortech.2007.03/051. See mainly the underlined parts and Fig. 3.
S. Chongkhong et al., 2007. "Biodiesel production by esterification of fatty acid distillate". Biomass and Bioenergy, doi: 10.1016/j.biombioe.2007.03.001. See mainly the underlined parts and figures 1, 3 and 5.
Y. Zhang et al, 2003. "Biodiesel production from waste cooking oil: 1. Process design and technological assessment". Bioresource Technology, 89, (2003), pp. 1-16. See mainly the underlined parts, Table 1, Table 2 and the Conclusion.
M. Berrios et al., 2007. "A kinetic study of the esterification of free fatty acids (FFA) in sunflower oil". Fuel (2007), doi:10.1016/j.fuel.2007.02.002. See mainly the underlined parts and Fig. 6.
B. Freedman et al., 1984. "Facts Affecting the Yields of Fatty Esters from Transesterified Vegetable Oils." JAOCS, vol. 61, No. 10, pp. 1638-1643. See mainly the underlined parts and figures 1 and 8.

H. Noureddini et al., 1997. "Kinetics of Transesterification of Soybean Oil". JAOCS, vol. 74, No. 11, pp. 1457-1463. See mainly the underlined parts and figures 2 and 4.

D Darnoko et al., 2000. "Kinetics of Palm Oil Transesterification in a Batch Reactor". JAOCS, vol. 77, No. 12, pp. 1263-1267. See mainly the underlined parts, figures 1, 3, 4 and 6.

D. G. B. Boocock et al., 1998. "Fast Formation of High-Purity Methyl Esters from Vegetable Oils." JAOCS, vol. 75, No. 9, pp. 1167-1172. See mainly the underlined parts, Figs. 2 and 4.

R. K. Rao et al., 1955/1957. "Alcoholic Extraction of Vegetable Oils. I. Solubilities of Cottonseed, Peanut, Sesame and Soybean in Aqueous Ethanol". JAOCS, vol. 32, July, pp. 420-423; "II. Solubilities of Corn, Linseed and Tung Oils in Aqueous Ethanol". JAOCS, vol. 33, February, pp. 82-84; "III. Solubilities of Babassu, Coconut, Olive, Palm, Rapeseed and Sunflower Oils in Aqueous Ethanol", JAOCS, vol. 33, September, pp. 389-391; "Solubility of Lard in Aqueous Ethanol", JAOCS, vol. 34, December, 389-391. Figures.

G. Abraham et al., 1993. "Water Accumulation in the Alcohol Extraction of Cottonseed". JAOCS, vol. 70, No. 2, pp. 207-208. See mainly the underlined parts and figures 1,2 and 3.

J. W. Dunning, 1956. "Unit Operations in a Mechanical Extraction Mill". JAOCS, vol. 33, October, pp. 462-470. See mainly the underlined parts and the figures.

"Hydro Dynamics, Inc.—The Solution Company", from www.hdrodynamics.com, accessed Dec. 2007. See mainly the underlined parts and the biodiesel application.

M. A. Kelkar et al., 2007. "Intensification of esterification of acids for synthesis of biodiesel using acoustic and hydrodynamic cavitation." Ultrasonics Sonochemistry, doi:10.1016/j.ultrasonch2007. See mainly the underlined parts and the figures.

T. Ichikawa. 2007. "Electrical demulsification of oil-in-water emulsion". Colloids and Surfaces: Physicochem. Eng. Aspects 302 (2007), pp. 581-586. See mainly the underlined parts and figures 5 and 6.

\* cited by examiner

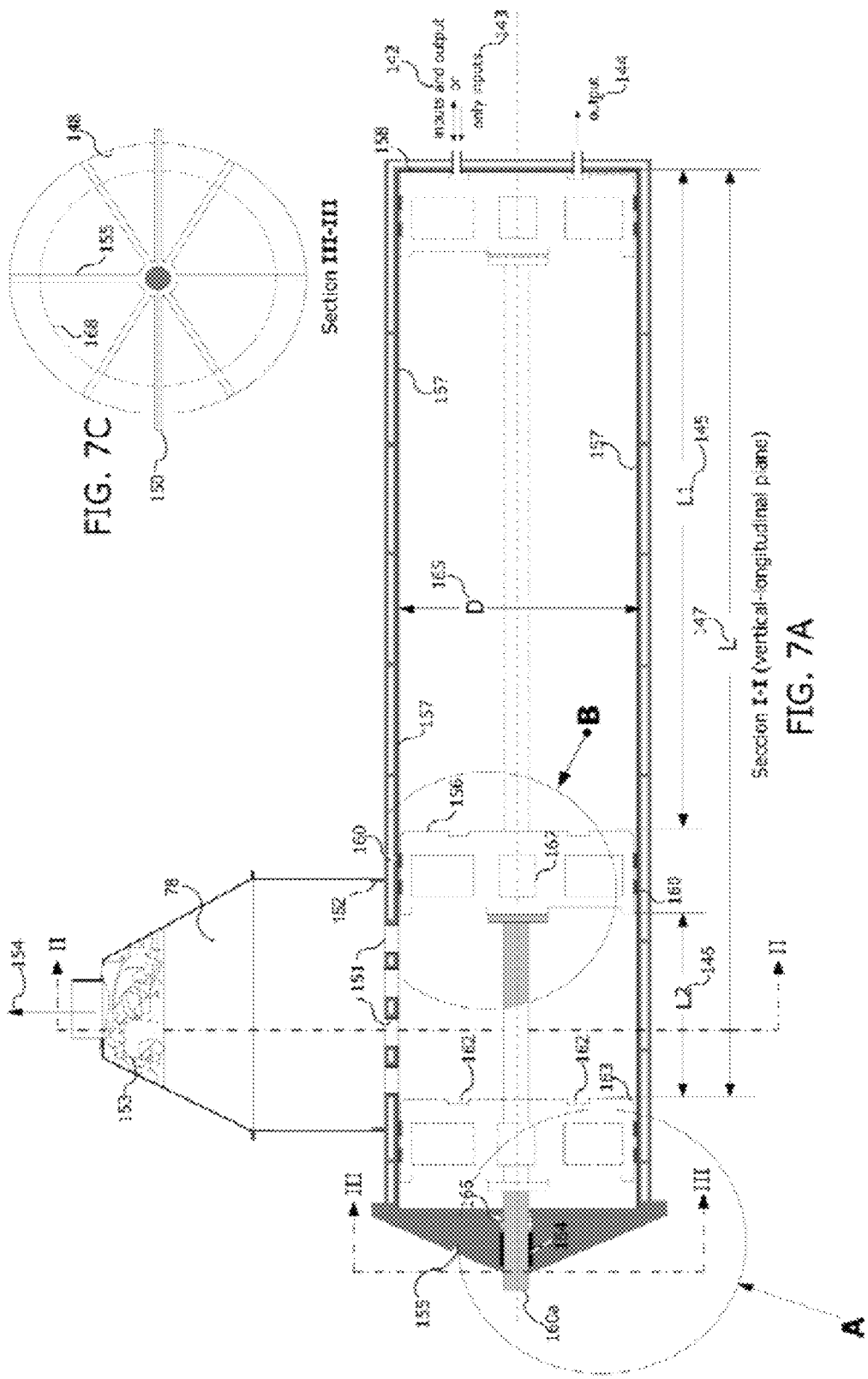

Expanded view B

Section II-II expanded

Expanded view A

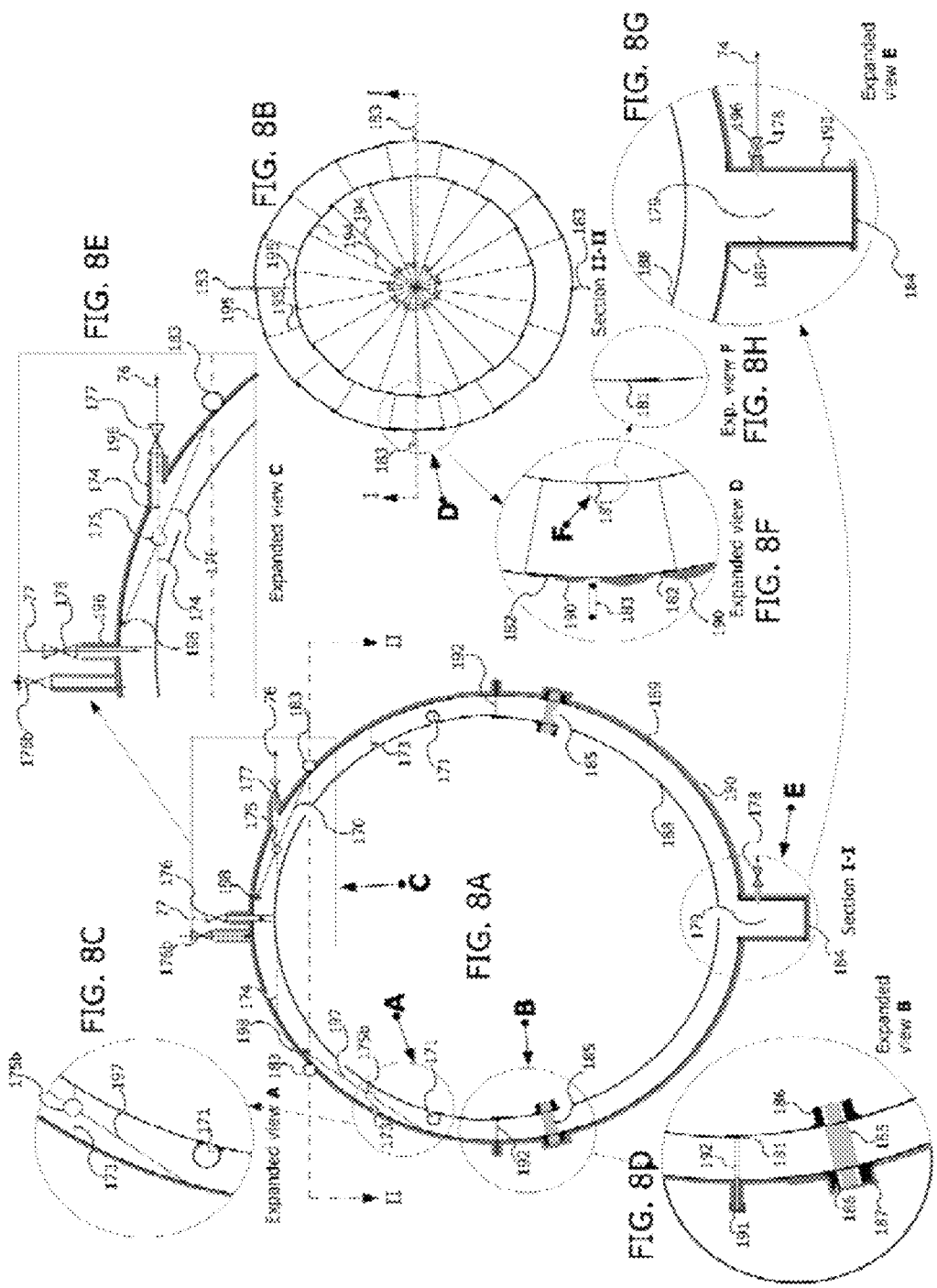

PROCESSES AND APPARATUS FOR SMALL-SCALE IN SITU BIODIESEL PRODUCTION

BACKGROUND OF THE INVENTION

1. Field of the Invention

The invention pertains to the field of biodiesel. More particularly, the invention pertains to processes and apparatus for small-scale in situ biodiesel production.

2. Description of Relate Art

Biodiesel, according to ASTM International (West Conshohocken, Pa., US), is "the mono alkyl esters of long chain fatty acids derived from renewable feedstock, such as vegetable oils or animal fats, for use in compression ignition (diesel) engines". The biodiesel industry chooses the methyl group for the mono alkyl esters in the form of fatty acids methyl esters (FAME).

SUMMARY OF THE INVENTION

Processes and apparatus provide economically feasible biodiesel, without subsidies, whenever petroleum prices are above US$60 per barrel. Toward that end, integrated small plants process materials containing lipids with anhydrous bioethanol as solvent and reactant, and sulfuric acid and potassium hydroxide mainly as catalysts to produce up to 3 million gallons of biodiesel per year. The products are a predominantly fatty acids ethyl esters (FAEE) biodiesel along with a chemically-enhanced organic fertilizer as byproduct. The raw materials may include a wide variety of non-edible solid matter that contains lipids, which normally have from 0.5% to 80% by weight of free fatty acids in total oils. Multiple apparatus makes this process feasible. Since they supply fertilizer for small scale farmers, more than not competing with food production, the processes and apparatus allow sustainable liquid fuel production in addition to supplying a useful byproduct to farmers.

The processes and apparatus provide a strategic positioning in the biodiesel business that is economically feasible without governmental subsidies, which is preferably done using scattered small plants to produce 3 million gallons of biodiesel per year close to vegetable oil sources, thus minimizing raw material logistical costs as well as that of providing chemically-enhanced organic fertilizer, produced as a byproduct. Besides using inedible and usually less edible oils and fats, ingenuity was applied to transform every type of molecule of fatty acids into biodiesel, including, but not limited to, free fatty acids (FFA), phospholipids, fatty acids of waxes of seeds hulls, monoglycerides, diglycerides, and triglycerides.

In addition to the use of cheaper oil sources and an integral plant converting oil sources to biodiesel, it is important to use equipment capable of efficient oil extraction as well as chemical reactions. This is accomplished by an acid-enhanced solvency and expression-based extractor and in situ reactor, whose functioning relies on a polarity-flexible solvent and reactant. That is mainly why the source of alkyl groups for the mono alkyl esters of long chain fatty acids is preferably exclusively anhydrous bioethanol, that is, biodiesel, which, in this case, is composed predominately of FAEE and not the preponderant FAME (fatty acids methyl esters) of present art.

The preferred sources of oil original raw material have large percentages of FFA, and its conversion to esters is at the same time important for efficiency as well as difficult. That is why, besides the main equipment named in the last paragraph, additional equipment is disclosed for acid catalysis of FFA and other polar molecules and for basic catalysis of mono-, di-, and triglycerides. This additional equipment is referred to herein as a "piston-cylinder reactor".

As described herein, water is the big villain in biodiesel production; that is why its presence is prevented and remediated in the main equipment and in the piston-cylinder reactors through flash vaporization. To avoid the use of water in biodiesel polishing, a third piece of equipment is used. This third piece of equipment is referred to herein as an "electrically-enhanced decanter".

The operation of the integral small plant is preferably divided into: i) original raw materials preparations; ii) bioethanol and catalysts preparation; iii) extractor/in situ reactors/separators; and iv) separation and refining. The main equipment and the piston-cylinders reactors are in iii) and the decanter is in iv).

BRIEF DESCRIPTION OF THE DRAWINGS

FIG. 7A shows a vertical-longitudinal cross sectional view of the piston-cylinder reactor along Section I-I of FIG. 7B.

FIG. 7C shows a cross sectional view along Section III-III of FIG. 7A.

FIG. 8A shows a cross-sectional view of an electrically-enhanced decanter along Section I-I of FIG. 8B.

FIG. 8B shows a cross-sectional view of the electrically-enhanced decanter along Section II-II of FIG. 8A.

FIG. 8C shows an expanded view of Circle A of FIG. 8A of the line/moving buoy for level measurement and the ring that allows assembly of the inner sphere.

FIG. 8D shows an expanded view of Circle B of FIG. 8A of the union of the two external hemispheres and the support of the inner sphere by the external sphere.

FIG. 8E shows an expanded view of Rectangle C of FIG. 8A of the input of the liquid to be decanted, the air releasing valve, the output porthole for biodiesel as well as the metering line/moving buoy.

FIG. 8F shows an expanded view of Circle D of FIG. 8B of the position of the welds that joins the mechanically conformed "petals" that form the spheres and the ring for moving the upper external hemisphere.

FIG. 8G shows an expanded view of Circle E of FIG. 8A of the exit of glycerin as well as the hinged porthole lid to remove precipitated salts.

FIG. 8H shows an expanded view of Circle F of FIG. 8F of the main weld of the inner sphere.

DETAILED DESCRIPTION OF THE INVENTION

Figure 1:
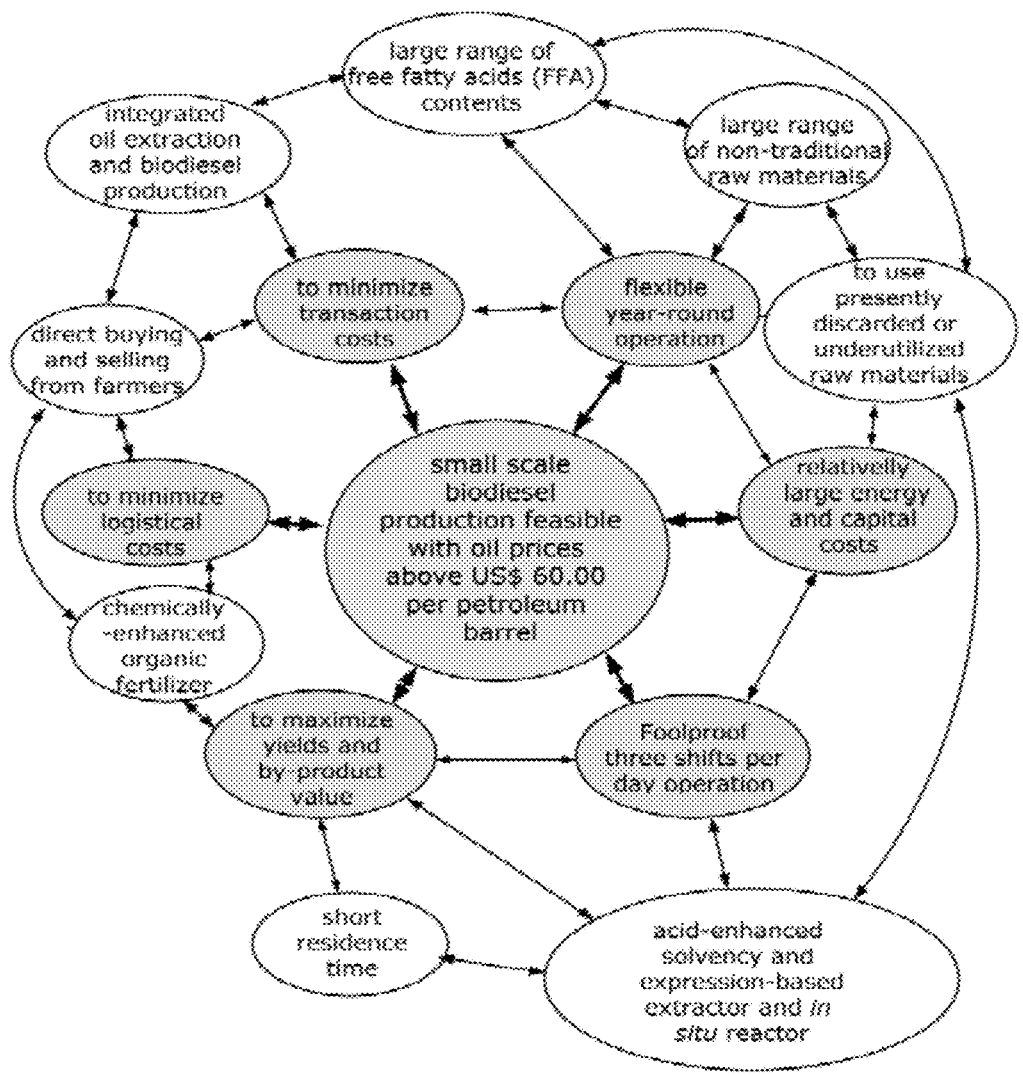
FIG. 1 shows an "activity map" representing a firm's strategic position in a business. Inside the ellipsis are the choices made about how to do things.

In some embodiments, a process produces a biodiesel product including a fatty acid ethyl ester product. The process preferably includes processing at least one raw material source including an average of at least 0.5% by weight of free fatty acids in total oil, extracting the free fatty acids and other reactive lipids from the raw material source and reacting the free fatty acids and other reactive lipids with ethanol using an acid catalyst and a base catalyst to form the fatty acid ethyl ester product, transesterifying any unreacted lipids with ethanol using a base catalyst, and separating the fatty acid ethyl ester product from a glycerin byproduct. The ethanol is preferably anhydrous bioethanol. The process preferably occurs at a single biodiesel production plant. Processing the raw material source preferably includes filtering and steam washing the raw material source to remove dirt, stones, and sand, milling the raw material source, heating and cooking the raw material source, and dehydrating the raw material source to remove excess water.

Extracting and reacting the free fatty acids and other reactive lipids preferably includes feeding the raw material source using a screw against a countercurrent liquid flow including the ethanol and the acid catalyst to react with the free fatty acids and recycling at least a portion of the countercurrent liquid flow through the screw after flash dehydrating and passing the portion of the countercurrent liquid flow through a cavitation reactor. Feeding the raw material source using the screw against the countercurrent liquid flow including the ethanol and the acid catalyst to react with the free fatty acids and other reactive lipids preferably occurs within a temperature range of about 110 to about 140° C., wherein the acid catalyst includes sulfuric acid.

In some embodiments, the step of transesterifying any unreacted lipids with ethanol using the base catalyst further includes partially neutralizing the resulting liquid stream with a base, esterifying unreacted free fatty acid using an acid to a concentration less than or equal to 0.5% by weight, and transesterifying the liquid stream with a base catalyst. In some embodiments, potassium hydroxide is the base and the base catalyst. The partial neutralization and esterification preferably occur in at least one piston-cylinder reactor with a residence time in a range of about 20 to about 40 minutes and a temperature within a range of about 5 to about 15° C.

In some embodiments, separating the fatty acid ethyl ester product from the glycerin byproduct includes decanting the fatty acid ethyl ester product from the glycerin byproduct, metering and mixing the fatty acid ethyl ester product with an adsorption material to remove impurities from the fatty acid ethyl ester product, and pressure filtering the fatty acid ethyl ester product and the adsorption material to separate the fatty acid ethyl ester from the adsorption material and impurities.

In some embodiments, a solid fraction of the raw material source is processed to produce a chemically-enhanced organic fertilizer product.

In some embodiments, a biodiesel production plant includes a raw materials preparation unit receiving and processing at least one raw material source including an average of at least 0.5% by weight of free fatty acids in total oil, an acid-enhanced solvency and expression-based extractor and in situ reactor unit receiving the raw material source from the raw materials preparation unit and converting the free fatty acids and other reactive lipids in the raw material source to the fatty acid ethyl ester product by acid catalysis and base catalysis with ethanol, an ethanol and catalyst preparation unit supplying ethanol, acid catalyst, and base catalyst to the acid-enhanced solvency and expression-based extractor and in situ reactor unit, and a separation and refining unit receiving a liquid stream including the fatty acid ethyl ester product and glycerin from the acid-enhanced solvency and expression-based extractor and in situ reactor unit and separating the fatty acid ethyl ester product from the glycerin and impurities in the liquid stream.

The raw materials preparation unit preferably includes at least one separation unit receiving the raw material source including, but not limited to, a plate magnetic separator, at least one orbital screen, or a steam washer, at least one mill supplied by the separation unit including, but not limited to, a hammer mill or a roller mill, and a heating, cooking, and dehydrating unit supplied by the mill.

The acid-enhanced solvency and expression-based extractor and in situ reactor unit preferably includes at least one main screw, a housing containing the main screw and having a first end and a second end, and a hydraulic motor driving the main screw to rotate in the housing to feed the raw material source received in solid form from the raw materials preparation unit from the first end of the housing to the second end of the housing. The main screw propels the raw material source from the first end to the second end under increasing pressure generated by a decreasing screw pitch, a conical screw shape, or a choke on the end of the main screw at the second end of the housing. A countercurrent liquid flow including the ethanol and the acid catalyst flows through the main screw from the second end to the first end to react with the free fatty acids, and at least a portion of the countercurrent liquid flow is preferably returned from the first end of the housing to the second end of the housing after passing through a flash dehydrator and a cavitation reactor.

The acid-enhanced solvency and expression-based extractor and in situ reactor unit preferably further includes a feeder-seal screw receiving a solid fraction from the acid-enhanced solvency and expression-based extractor and in situ reactor unit, a cake breaker receiving the solid fraction from the feeder-seal screw and a solid fraction from at least one plate filter press of the separation and refining unit and separating the solid fractions into smaller pieces, a mixer-neutralizer receiving the solid fractions from the cake breaker and mixing the solid fractions with an aqueous potassium hydroxide solution to adjust a pH of the solid fractions, a rotary dryer receiving the solid fractions from the mixer-neutralizer and removing excess water from the solid fractions, and a cooler-bagger receiving the solid fractions from the rotary dryer and cooling and bagging the solid fractions as a chemically-enhanced organic fertilizer.

The acid-enhanced solvency and expression-based extractor and in situ reactor unit preferably further includes at least one first piston-cylinder reactor receiving the liquid stream from the acid-enhanced solvency and expression-based extractor and in situ reactor and partially neutralizing the liquid stream with the base catalyst and a second piston-cylinder reactor receiving the liquid stream from the first piston-cylinder reactor and transesterifying the liquid stream with the base catalyst.

The ethanol and catalyst preparation unit preferably includes a potassium hydroxide/ethanol storage tank holding a potassium hydroxide-ethanol mixture and supplying the potassium hydroxide-ethanol mixture to the acid-enhanced solvency and expression-based extractor and in situ reactor unit, a sulfuric acid/ethanol storage tank holding a sulfuric acid-ethanol mixture and supplying the sulfuric acid-ethanol mixture to the acid-enhanced solvency and expression-based extractor and in situ reactor unit, a concentrated sulfuric acid storage tank holding concentrated sulfuric acid and supplying the concentrated sulfuric acid to the sulfuric acid/ethanol storage tank, and an ethanol storage tank holding anhydrous ethanol and supplying the anhydrous ethanol to the potassium hydroxide/ethanol storage tank, the sulfuric acid/ethanol storage tank, and the acid-enhanced solvency and expression-based extractor and in situ reactor unit.

The separation and refining unit preferably includes at least one electrically-enhanced decanter receiving the liquid stream from the acid-enhanced solvency and expression-based extractor and in situ reactor unit and separating the liquid stream into a glycerin fraction and a fatty acid ethyl ester fraction, a buffer tank receiving the fatty acid ethyl ester fraction from the decanter, a metering and mixing tank receiving the fatty acid ethyl ester fraction from the buffer tank and mixing the fatty acid ethyl ester fraction with an adsorption material to remove impurities, and a pressure filter system receiving the fatty acid ethyl ester fraction and the adsorption material from the metering and mixing tank and separating the fatty acid ethyl ester from the adsorption material and impurities.

The produced biodiesel is preferably primarily fatty acids ethyl esters (FAEE). Moreover, the ethanol used to produce FAEE is preferably bioethanol, that is, biologically obtained ethanol. Furthermore, the other main raw material—long-chain fatty acids—is preferably non-edible or rarely used as edible vegetable oils or animal fats. For example, refined or raw soybean oils, or the original soybean, and, similarly, oils or seeds of canola or other varieties of edible rapeseed, as well as of sunflower are preferably not used as long-chain fatty acid sources. According to Porter ("What is Strategy?" *Harvard Business Review*, November/December 1996, pp. 61-78), an original strategic positioning in a business imposes the adoption of tradeoffs, for example, what not to choose as original raw materials and alkyl groups, though this been contrary to the usual paradigm in the biodiesel field.

The present field of endeavor belongs to a new industry—biodiesel production and sale—that, as such, currently nourishes itself in the knowledge and practices of older industries, such as edible vegetable oil extraction and refining, soap and non-edible oil industry, liquid fuels production from petroleum, fuels specification and performance in compression ignition internal combustion engines, as well as general chemical engineering knowledge of unit operations.

Usually an innovation requires a new strategic positioning in a business, which often requires technological innovations in processes, equipments, etc—and vice versa. One way of summarizing the degree of innovativeness of a strategic positioning is an Activity-System Map, such as the one delineated in FIG. 1. That map shows the trade-offs made, the more important choices being shaded in gray. The positive synergy intended between the activities chosen is shown by lines linking them. Hence, these lines depict the adjustment, or fit, fundamental for competitive advantage sustainability.

The description in this section follows the choices of FIG. 1, contrasting them with published current choices, in the fields of professional literature (e.g., patents and technical journals) and commercial practice. The emphasis is in the delineation of specific problems and opportunities, with a short statement of the chosen solutions, which are elaborated upon further in other sections.

In a preferred embodiment, the economic feasibility of small scale biodiesel production at market prices is obtained, that is, without any kind of governmental incentive or subsidy. Biodiesel is preferably intended for the extension or substitution of petroleum derived diesel fuel, which is why the feasibility looked for is the one reachable with petroleum prices above US$ 60/barrel. This objective is shown in the central ellipse of FIG. 1.

In 2006, the average installed capacity of 65 American and Canadian biodiesel plants was 24 million gallons per year (GPY). In 2007, 27 new intended plants lowered the average slightly to 23.5 million GPY, although there are plants already built of a 100 million GPY capacity and a planned one of a 320 million GPY capacity. In a sample of 108 plants that published installed production capacity in November 2011 with the National Biodiesel Board (NBB), the average installed capacity was 18.6 million gallons per year (GPY), lower than the estimate for 2007 of 23.5 million GPY. The reason for that is the large increase of very small plants (e.g. 0.03, 0.5, 1.0, 1.5 million GPY capacity). The quantity of plants with installed capacity less than or equal to 3.0 million GPY is 35, that is, 32% of the plants. These plants are mainly dedicated to transesterification of used and recycled cooking oil. Capacities between 10.0 and 30.0 million GPY comprises 31% of the plants. Capacities greater than 30 million are 16% of 108 plants, but account for 53% of the total installed capacity. The second-largest plant, for 90 million GPY, has two projects outside its Houston home: one in Montana whose goal is to process 100 million GPY of biodiesel from a customized varied of Camelina (*Camelina sativa*) that is being planted there and another with plantations in Central America of palm oil trees (*Elaeis guineensis*). Therefore, it looks like that the biodiesel industry in North America is going in the direction of using disregarded raw material (wasted cooking oil) and not usually edible oil (camelina), besides oils that though edible, are employed in a variety of industrial uses (palm and palm kernel oil). In Brazil the fuel ethanol business went, like in the USA and Germany, through ups and downs. When the subsidies ended, a large number of plants went bankrupt, but many survived by increasing efficiency, mainly through agricultural innovations.

Plants presently considered to be "small scale" in the industry are preferably a standard modular plant size in the system described herein to manufacture by batch process to stock, rather than not to order, for 3.0 million GPY or about 11.4 million liters per year (LPY) of installed capacity, in three 8 hours shifts per day in a year-round operation. As used herein, the term "from various original raw materials" means "original" in the sense of raw materials that contain long chain fatty acids, normally chemically bonded to the alcohol glycerol as tri-, di-, or monoesters of glycerol (glycerides), as free fatty acids (FFA), or as phospholipids. Therefore, all kind of lipids transformable in FAEE may be used, including solid waxes. For example, "original" raw materials include, but are not limited to, the whole "beans" of the castor oil plant, cottonseeds, physic-nuts, or rice bran powder, which is a byproduct of rice milling. The "in situ" part means that there is an extraction of the above-mentioned materials from the solid original raw materials that contain them followed by their chemical transformation in biodiesel and vice versa. In other words, these physical and chemical transformations occur concomitantly in the same apparatus. As will be seen, in situ reactions described in the prior art refer only to laboratory bench scale apparatus. Nowhere in the prior art is equipment presented that is capable at the same time of in situ reactions and acid-enhanced extraction by solvency and expression.

The production scales of present biodiesel plants referred to above follows the traditional paradigm of the chemical industries: economies of production scale due to productive capacity following a third power law of equipments' linear dimensions and capital costs following a second power law of the same dimension. Besides that, there is improved sharing of indirect costs and buying and selling bargaining power. In an attempt to counteract the prevailing paradigm of economies of production scale in biodiesel production, embodiments of the present invention, as shown in FIG. 1, consider mainly the minimization of raw material transaction and logistical costs and yields maximization, as well as adding value to byproducts.

Small scale implies a greater number of production units, which enables locations closer to grown domesticated and semi-domesticated plants, extractive activities of wild plants, and agribusiness units with useful residues or under-valued byproducts. This proximity allows direct buying and selling between the biodiesel production unit and these original raw material producers. The lack of intermediation minimizes transaction costs and shorter distances do the same for transportation costs. Transportation costs tend to grow with petroleum prices going to or surpassing US$ 60.00/barrel. Besides that, shorter distances means less fuel consumption to transport raw material for biodiesel production, enhancing the Net Energy Gain (NEG) index, that is, the energy produced divided by the energy consumed in that production. The environmental use of the word sustainability, whose importance is increasingly acknowledged, is closely linked to the NEG index.

Direct buying and selling between farmers and biodiesel producers promotes the input of original raw material containing lipids, including, but not limited to, glycerides, FFA, and phospholipids, and the output of chemically-enhanced organic fertilizers, which are very sensitive to logistical costs, all of that requiring integrated oil extraction and biodiesel production. In the present state of the art, oil and fats extraction and refining are done in one plant that supplies the "pure" raw material (usually refined oil) to the biodiesel producer.

About 90% of the world's production of fats and oils is used in edible products, and the objective of most processing steps is to convert crude fats of low palatability or undesirable physical form into refined products that meet the requirements for food fats. That is another present art paradigm—"palatability", "physical form" and also shelf life—that can and should be changed with oils and fats to be esterified and transesterified to biodiesel. For example, within the edible oil paradigm, the extraction of free fatty acids (FFA) and phospholipids is avoided mainly through the use of the selectiveness of commercial hexane as the solvent.

That is why, as shown in FIG. 1, the process and apparatus provide a flexible operation capable of accepting a large range of non-traditional raw materials: mainly those that contains inedible or usually less edible oils and fats of plant origin, including, but not limited to, castor oil (*Ricinus communis*), linseed oil (*Linum usitatissimum*), physic-nut (*Jathropha curcas*), neem-tree (*Azadirachta indica*), tung-nuts (*Aleurites fordii*), chinese tallow (*Sapium sebiferum*), punnai-nuts (*Calophyllum inophyllum*), Indian beech tree (*Pongamia pinnata*), jojoba (*Simmondsia chinensis*), macauba (*Acrocomia aculeate*), buriti (*Mauritia flexuosa*), babassu (*Orbignia martiniana, O. oleifera, O. speciosa*), and saturated fatty acids of the two oils of the oil palm tree (*Elaeis guineensis*). The original raw material in the oil palm tree may be the entire 40-50 kg bunch of fruits, depending on the amount of lipids contained outside of the fruits. Regardless, at least the entire fruit, including the husk, may be used as the original raw material to be processed, without separation of the flesh (source of palm oil) and the kernel (source of palm kernel oil).

Without running the risk of overestimation, one can say that there are more than five hundred plant species that may be considered potential sources of raw material for biodiesel production, outside of those preferred for edible oil manufacture, as shown in the world production of major vegetable oils in the 2001/2002 crop in millions of metric tons (t): soybean—28.85, palm oil—25.42, sunflower—7.61, rapeseed—12.68, cottonseed—3.82, peanut—4.88, coconut—3.23, olive—2.78, palm kernel oil—3.12; which gives a total of 92.4 million t/year.

Of these 500 species, only a few can be considered totally domesticated, such as *Ricinus communis* and *Linum usitatissimum*. By "totally" is meant an extensive varietals selection, established cultivation practices in diverse environments, harvesting period and methods, post-harvesting processing and storage, and final processing. A large number may be considered semi-domesticated, meaning that data from the before-mentioned activities are scarce. Many of these semi-domesticated plants have been spread around the world by humans between the 16th and 19th centuries for botanical gardening and landscaping, as well as for economic purposes. Examples include the species *Jathropa curcas, Aleurites fordii, Simmondsia chinensis*, and *Acrocomia aculeate*. The large majority of these species, however, grows wild, historically spread primarily by wind, birds, and rodents. In some cases this spread was helped by humans' unintentional action, such as, through fire. An example is the babassu palm tree, an "invader" kind of plant of Northeastern Brazil.

The semi-domesticated and wild plants are exploited in an extractive fashion in tropical and semi-tropical climates where they predominate and where poor rural dwellers abound, such as in India, Bangladesh, Myanmar, Malaysia, Indonesia, China, Africa, and parts of Brazil and Latin America. This low-cost labor source is important for economic feasibility, but it also provides social inclusion through cash-crops and/or cash by extractive activities, in places where cash alternatives are scarce or inexistent. Flexible operation is important, also, to allow the use of different raw materials by the same processing plant, thereby enhancing installed capacity utilization and diminishing capital costs burden per unit produced. The main equipment—acid-enhanced solvency and expression-based extractor and in situ reactor—permit such processing of various original raw materials and mixtures. This capacity is important to facilitate year-round 24-hours operation and to intensify the diffusion of the process, since there are several phases to complete (see, for example, Cantisani, "Technological innovation processes revisited". *Technovation*, Vol. 26, pp. 1294-1301, 2006) between invention and innovation (implying commercial success), including the most difficult diffusion phase.

As shown in FIG. 1, flexible operation also allows the use of presently-discarded potential raw material or, at least, adds value to their present uses. For example, soap stock is a byproduct of soda ash and alkali refining processes of edible vegetable oils. According to U.S. Pat. No. 3,428,660, entitled "PROCESS FOR RECOVERING FATTY ACIDS AND TRIGLYCERIDE OIL FROM SOAPSTOCK" and issued Feb. 18, 1969 to Morren, "one of the principal purposes of the refining is to remove free fatty acids (FFA), such acids being converted to their corresponding alkali soaps and being removed with the aqueous phase . . . The soapstock itself has relatively little value, having little use except as an additive to animal feeds, its price being one tenth of refined vegetable oil". That was the scenario before biodiesel.

Assuming an average of 93% yield of neutralized oil in the refining process, the 92.4 million tons (t) of raw materials described above multiplied by the 90% of world production described above would originate 5,823,000 t of soapstock, which may be converted to biodiesel by traditional and novel processes. A traditional process (see, for example, Haas et al., "Simple, High-Efficiency Synthesis of Fatty Acid Methyl Esters from Soapstock", *JAOCS*, Vol. 77, pp. 373-379, 2000) is the complete saponification of the soapstock, followed by acidulation using methods similar to those presently employed by the edible oil industry. This results in an acid oil with a FFA content greater than 90%. These FFA are efficiently converted to methyl esters (biodiesel) by acid-catalyzed esterification. According to Haas et al., one can expect a 60% yield of biodiesel following the traditional process; therefore, 5,823,000 t of soapstock×60%≈3,493,800 t of biodiesel. Another process (U.S. Pat. No. 7,087,771, entitled "Method of making alkyl esters using glycerin", issued Aug. 8, 2006 to Luxem et al.) follows an opposite route: react the 70% FFA with glycerol, to produce a mixture of mono-, di- and tri-glycerides as well as the original present glycerides (<30%), and subsequently transesterify through basic catalysis into fatty acid alkyl esters.

Rice bran, obtained as a byproduct in polishing brown rice kernel, has an oil content from 12% to 25%, depending on rice variety and degree of polishing. Besides the higher nutritional value of the simply husked brown rice kernel, the bran must be removed through polishing because the bran oil is highly perishable due to the natural presence of lipase enzymes, whose activity is enhanced by moisture. For example, according to Özgül et al. ("In Situ Esterification of Rice Bran Oil with Methanol and Ethanol", *JAOCS*, Vol. 70, pp. 145-147, 1993) a typical rice bran stored in about 12% moisture went from an initial 14.2% by weight content (w/w) of free fatty acids (FFA) in relation to total vegetable oil to 68.4% w/w of FFA in the oil after 63 days of storage. The intense rice bran oil deterioration and the dispersion of milling plants in the main rice producer/consumer countries (Asia) is what makes the use of rice bran oil difficult for edible purposes. The same thing happens with the methods devised to stabilize the much more nutritious brown rice, as shown by Champagne et al. ("Utilizing Ethanol to Produce Stabilized Brown Rice Products". *JAOCS*, Vol. 69, pp. 205-208, 1992).

In 2005 the world production of paddy rice (with hulls) was 700 million t, the largest world cereal crop, which provides one fifth of the calories consumed by humans. India, the second largest producer with 137 million t, processed this crop in 124,000 rice mills distributed in 24 States/Union Territories for an average of 1,100 t per mill. In actuality, 60% of these plants are well below that average, being small single huller plants whose byproduct rice bran is produced in mixture with husks, making the logistic and oil extraction problem difficult to solve in large production scale plants.

Considering 700,000,000 t of paddy rice, yielding about 476,000,000 t of edible rice, and that the rice bran content is between 5% to 8% of the grain, a conservative estimate would be 31,000,000 t (476,000,000 t×6.5%) of potential rice bran raw material for biodiesel production, meaning about 5,700,000 t (31,000,000 t×18.4%) of oil with FFA contents ranging from 10% to 80% w/w. The flexible processes and apparatus are preferably capable of handling such wide range of FFA contents. For this reason, this byproduct of edible rice, a product of several varieties of *Oryza sativa* and *O. glaberrima*, plants domesticated around 5,000 B.C., is an important potential raw material for biodiesel production. According to Özgul et al. ("FA Monoalkylesters from Rice Bran Oil by in Situ Esterification". *JAOCS*, Vol. 80, pp 81-84, 2003) for in situ acid-catalyzed esterification and transesterification of rice bran with up to 85% FFA, the maximum yield of biodiesel was 80% (w/w). Although in preferred embodiments, the processes and apparatus are expected to achieve at least 95% (w/w) yield, even considering only 80% yield and 40% of rice bran recycling, one gets 5,700,000×80%×40%=1,824,000 t of biodiesel.

The tobacco plant, mainly varieties of *Nicotiana tabacum*, is the most widely grown commercial non-food plant in the world, despite the deleterious effects of the consumption of its derivatives by humans. World production, led by China, India, Brazil, and the USA was 5.7 million t in the 2002/2003 crop, corresponding to about 2.7 million hectares (million ha) of crop area. If the flowers were not cut to intensify leaf development (as usually done in *Nicotiana tabacum* plantations but not with Turkish tobacco varieties of *Nicotiana rustica*), one could estimate 0.8 t seeds/ha with 35% (w/w) of oil content, giving 0.8 t seeds/ha×0.35 t oil/t seed×2,700,000 ha=756,000 t of oil, generally with FFA contents within 10%-30% (w/w).

A two step process, namely acid-catalyzed esterification followed by basic-catalyzed transesterification of these oils, produces biodiesel within the limits prescribed by ASTM D 6751-02 and DIN EN 14214 standards, as shown by Veljkovic et al. ("Biodiesel production from tobacco (*Nicotiana tabacum* L.) seed oil with a high content of free fatty acids", Fuel, Vol. 85, pp. 2671-2675, 2006). According to Veljkovic et al., a maximum conversion of 91% (w/w) is achievable. Assuming an 85% yield, one gets 756,000 t of oil×0.85≈643,000 t of biodiesel as the maximum potential of these presently-discarded byproducts of *Nicotiana tabacum* and *Nicotiana rustica*.

World production of arabica coffee (varieties of *Coffea arabica*) and robusta coffee (varieties of *Coffea canephora*) is 6.7 million t/year. Brazil, being the largest world producer and exporter and the second largest consumer (behind the USA), is the source of 2.0 million t of this world total. Under predominant Brazilian conditions: cultivation (under the sun, not in shades), harvest (all coffee berries, independent of maturation stage are collected), and post-harvest (drying under the sun of whole coffee berries), about 20% of the crop produces defective beans, whose taste deviations, when transformed to liquid coffee, makes it a coffee consumed only by very poor people. Depending on future trade-off conditions 2,000,000×0.2=400,000 t of coffee could be exploited as a potential biodiesel raw material.

According to Khan et al. ("The Composition of Coffee Oil and Its Component Fatty Acids", *JAOCS*, pp. 607-609, 1953), coffee grounds are mainly composed of proteins, carbohydrates, and lipids. About 20%-25% (w/w) of the dry weight of the water-extracted grounds is recoverable as oil. Therefore, considering locations where coffee grounds are less disperse (e.g., instant coffee plants and coffeehouse networks), if 40% of water-extracted coffee grounds are recycled: 0.40×6,700,000×0.90×0.22≈531,000 t of coffee oil. Conservatively guessing a yield of 85% in biodiesel conversion, one could get 531,000×0.85=451,000 t of biodiesel.

The world production of tomato (varieties of *Solanum lycopersicum*) in 2004 was 120 million t. Assuming that 25% is industrially processed, that the pomace (with seeds) represents 30% (w/w) of the fresh fruit's weight, that there is an average of 46% (w/w) of seeds in the pomace (each tomato fruit has between 73 and 346 seeds), and that an average of 20% of oil content in the wet seeds is a conservative estimate, and assuming 60% of pomace recycling, including the recycling of discarded fruits, one has: 120,000,000×0.25×0.30×0.46×0.20×0.60=496,800 t of tomato seeds oil. Assuming an 85% conversion rate as before, 496,800×0.85=422,300 t of biodiesel would be produced. It should be noted that the process and apparatus are preferably capable of processing directly wet pomace mixed with discarded tomato fruits.

The most internationally traded fruits are those of the genus *Citrus*, mainly varieties of the sweet orange (*Citrus sinensis*). Fresh fruits and their derivatives and, increasingly, frozen orange juice concentrate are traded. The larger world producers of these concentrates are in the state of Sao Paulo in Brazil and the state of Florida in the USA. The estimated 2007/08 sweet orange crop in Florida was 168 million boxes of 40.6 kg, and the Sao Paulo and neighboring state of Minas Gerais' 2006/07 crop was 352 million boxes. Therefore, 6.8+14.3≈20.1 million t of sweet oranges were produced in these states.

In the Sao Paulo state, the "pera" varieties of *Citrus sinensis* that predominates contains fewer seeds, from 5 to 10 per fruit, although the average number of seeds in *Citrus* fruits varies in the range of 20 to 48 seeds per fruit. Considering the "pera" varieties and the ones cultivated for juice in Florida, it is fair to say that the weight of the seeds represents 1.5% of the weight of the fresh fruits. And, so, Florida and Sao Paulo crops would generate 20.1 million t×0.015=301,500 t of seeds. Assuming 25% of oil in the wet whole seeds, one gets 75,000 t of oil. The most used orange juice extractor, from FMC Technologies, Inc. (Houston, Tex., USA), separates the peel from the (juice+flesh+seeds) of the oranges, and that latter part, without the juice, can be processed directly in the apparatus of this invention together with discarded oranges.

The 2005 world production of *Citrus* fruits was 62 million t. Assuming an average seed content of 2.5% (w/w) and 40% recycling, one would get 62 million×0.40×0.025×0.25=155,000 t of *Citrus* seed oil, of high FFA content and, so, following the 85% yield above, 155,000×0.85≈132,000 t of biodiesel.

In 2005 the total world rubber production was 21 million t. Forty two percent of this was natural rubber, extracted mainly from the latex of *Hevea brasiliensis*. Of the total of 8.9 million t of natural rubber, 94% came from Asian countries, Indonesia, Malaysia and Thailand being responsible for 72% of the total natural rubber production and, in these countries, one has cheap rural labor for falling fruits gathering.

There are 9.3 million ha of *Hevea brasiliensis* plantations worldwide. Assuming an average of 0.085 t/ha per year (highly dependent on trees age), the maximum collectable amount of seeds is about 800,000 t of seeds yearly. The kernel is 60% (w/w) of the seed and dried (32% moisture), it contains 65% of oil. Therefore, 800,000×0.6×0.68×0.65=212,000 t of rubber kernel oil may be collected. As could be expected by harvest (collection of fallen seeds) and post-harvest conditions, FFA contents range from 15% to 25% but, according to Ramadhas et al. ("Biodiesel production from high FFA rubber seed oil", *Fuel*, Vol. 84, pp. 335-340, 2005) a two step process, similar to the one described above, would give an esterification/transesterification yield of 90%. And, so, 212,000 t of rubber oil×0.9≈191,000 t of biodiesel are producible, under ideal and maximum collection conditions.

There are other agribusiness processing plants producing seeds as a byproduct, for example, grape (*Vitaceae Vitis* sp) seeds, a byproduct of the raisin, wine, and juice industries. In this case, the seed weight makes up 3.5% to 4.5% of the fresh fruit with an oil content between 6% and 21%. In 1983 Italy, France, and Spain produced 42,000 t of grape seeds. Other examples include juices and preserves of the mango fruit (*Mangifera indica*), whose dry stones weigh 10% of the fruit and 75% of these stones is kernel with 10% (w/w) oil, and apricots (*Prunus armeniaca*) and peaches (*Prunus persica*) whose kernels have 40% (w/w) oil. Fifteen percent (w/w) of the papaya fruit (*Carica papaya*) weight is seeds that contain 25%-30% of inedible oil; in Hawaii, the seeds constitute 22% of the waste from papaya puree plants.

Although the preferred targeted raw materials are those of plant origin, in some embodiments, microalgae, whose sunlight conversion efficiency is paramount, as stated by Chisti ("Biodiesel from microalgae", *Biotechnology Advances*, Vol. 25, pp. 294-306, 2007), and two animal fat sources are preferred, due to the physical form of the fat containing raw material and small scale production convenience. The fatty byproducts of poultry slaughterhouses and pre-fleshing operations in tanneries are both favorable raw materials. Besides being a potential raw material for biodiesel, parts of these materials contribute, in the case of poultry slaughterhouses, with 6.8 mg/l BOD (Biochemical Oxygen Demand) per ton of LWK (Live Weight Killed) and 3.5 mg/l of SS (Suspended Solids). In the tannery industry, these numbers are even greater: per t of raw hide processed to 100 mg/l BOD and 200 mg/l of SS.

The state of Georgia in the USA produces 44.6 million gallons of fatty poultry parts. The richest parts in fat content (>85% w/w) are the saddle and the leaf. Offal's fat content is about 10%, and in many cases offal's fat extraction is not considered economically feasible by present methods of extraction and energy prices, with a net energy gain below 60%. The more fatty poultry tissues are sold to rendering facilities at US$ 0.22/gallon. In an embodiment of the present invention, processes and apparatus are preferably capable of processing saddle, leaf, and offal tissues in a large range of FFA to deliver the high pour point biodiesel and solid material for composted chemically-enhanced organic fertilizer. There are increasing health and public concern about using these materials for feeding pigs, fowl, cattle, and pets. In the case of raw hide pre-fleshing tissues, Özgünay et al. ("Performance and emission study of biodiesel leather industry pre-fleshings", *Waste Management*, Vol. 27, pp. 1897-1901, 2007) shows the quality of the biodiesel obtained compared with biodiesel from other sources, as well as comparisons of engine performance and emissions tests.

In summary, this class of potential sources of raw material, where an estimated production of biodiesel was presented, is as follows: soapstock, 3,493,800 t, rice bran 1,824,000 t, tobacco seeds 643,000 t, spent coffee grounds 451,000 t, tomato seeds 422,300 t, Citrus seeds 132,000 t, and rubber seeds 191,000 t, totaling 7,157,100 t. The European Biodiesel Board declared an EU production in 2006 of 4,890,000 t (+−5%) within 27 countries, with Germany responsible for 54%. The production estimate for 2006 of The National (USA) Biodiesel Board was 750,000 t (with an optimistic increase of 200% over the 2005 production). Finally, since according to Friedrich ("A World Wide Review of the Commercial Production of Biodiesel—A technological, economic and ecological investigation based on case studies". Institut für Technologie and Nachhaltiges Produkt Management der Wirtschaftsuniversitat, Vienna, Austria, 2003), in 2003 the combined Asian and Australasian biodiesel production was 32% of the European one, one may optimistically estimate 0.32×4,890,000=1,565,000 t as the Asian/Australasian biodiesel production in 2006. Therefore, the 2006 world production would be somewhere near 4,890,000+750,000+1,565,000=7,205,000 t.

As shown above, discarded or low value byproducts of food processing plants and certain crops could almost double (7.16 versus 7.21 million t) the 2006 world production of biodiesel, presently based mainly on edible oils including rapeseed and sunflower in "set-aside" lands in the EU, soybean in the USA, and Palm oils in Asia. With a new strategic positioning in the biodiesel industry, allowed by preferred embodiments of the present invention, biodiesel production does not have necessarily to compete for raw materials with the food industries. An even greater potential can be attained in the medium and long term, with the 500 non-food plant species mentioned above. For example, Azam et al. ("Prospects and potential of fatty acids methyl esters of some non-traditional seed oils for use as biodiesel in India", Biomass and Bioenergy, Vol. 29, pp. 293-302, 2005) reports that "under the (sic) Indian conditions only such plants can be considered for biodiesel, which produce non-edible oil in appreciable quantity and can be grown in large scale on non-cropped marginal lands and wastelands". After evaluating 75 plant species complying with these requirements, Azam et al. concluded that planting 40.96 million ha with neem-tree (Azadiractha indica) in the wasteland of Gujarat and Rajasthan or 19.9 million ha with Indian beech tree (Pongamia pinnata) in the saline areas of Karnataka, Rajasthan and other parts of India "would be sufficient to meet the target of 100% replacement of imported diesel fuel which amounted to 87.5 million t in 2003-2004. This target is achievable in view of the availability of 93.69 million ha [of] wasteland [in India]".

Returning to FIG. 1, processing raw materials within a large range of free fatty acids (FFA) content has a positive synergy with the operation being sufficiently flexible to allow the processing of presently discarded or underutilized raw materials and a large range of non-traditional raw materials. FFA is one of the consequences of "rancidification", which is the decomposition of oils and fats by hydrolysis, oxidation, or both. Hydrolysis splits fatty acid chains from the glycerol backbone in glycerides. Hence, they become free of the glycerol chemical bond. Some enzymes and heavy metals present at low level in fats and oils promote auto-oxidation, where the fatty acids, whether free or not, break down into hydrocarbons, ketones, aldehydes, and small amounts of epoxides and alcohols, which produce unpleasant and noxious odors and flavors.

If a FFA molecule is not oxidized, it can be transformed into an ethyl ester, for example, through an acid-catalyzed esterification reaction. That reaction does not happen within the present paradigm of the prior art of fats and oils processing, because, for the sake of palatability and shelf life, FFA is removed from edible oils as discussed previously. The hydrolytic processes that produce FFA are fostered by humidity, heat, and enzymes present in the fruit. Additionally, fly infestation and fungal diseases of the fruits, and delay between harvesting and extraction contribute to FFA formation. These conditions prevail when non-traditional oil bearing fruits or their seeds are picked up from the soil after naturally falling from trees, and also in the way some of the byproducts described above are presently treated and stored. That is why the original raw materials to be processed are expected to come from a wide range of FFA content.

The presence of FFA in oils and fats has been avoided by the majority of the existent biodiesel producers through their choice of raw material, namely refined oil. That is because whenever the FFA content of the oil is greater than 0.5% (w/w), as described by Stern et al. (U.S. Pat. No. 4,695,411, entitled "Process for manufacturing a composition of fatty acid esters useful as gas oil substitute motor fuel with hydrated ethyl alcohol and the resultant esters composition", issued Sep. 22, 1987), Demirbas ("Biodiesel fuels from vegetable oils via catalytic and non-catalytic supercritical alcohol transesterifications and other methods: a survey", Energy Conversion and Management, Vol. 44, pp. 2093-2109, 2003), and Di Serio et al. ("Synthesis of biodiesel via homogenous Lewis acid catalyst", Journal of Molecular Catalysis: Chemical, Vol. 239, pp. 111-115, 2005), the preferred basic-catalyzed reaction that is 4,000 times faster than the acid-catalyzed one (see page 5355, Lotero et al., "Synthesis of Biodiesel via Acid Catalysis" Ind. Eng. Chem. Res., Vol. 44, pp. 5353-5363, 2005), forms soaps and water, for example, R—COOH+KOH→R—COOK+$H_2O$, where R—COOH is a FFA with R being a hydrocarbon chain of 12 to 24 carbons and KOH is potassium hydroxide whose K atom is exchanged with the H atom of the hydroxyl functional group (OH) of the FFA to form a soap/carboxylate salt and water. The formed soap and reaction-formed water along with water originally present form emulsions that interact with other substances present (biodiesel, glycerides, ethanol or methanol, and glycerol), to increase the viscosity, thereby forming gels and foams and making the separation of these substances—either by decantation or centrifugation—very difficult. This contributes to a decrease in biodiesel yield, besides the FFA being converted to a salt rather than to the desired mono alkyl esters, i.e., biodiesel.

Di Serio et al. mentions six alternatives to address the problem described in the preceding paragraph, saying: "all the first four methods (a-d) result in a loss of product (biodiesel)" because they discard the FFA, within the present art of the edible oils industry. This is nowadays unacceptable because, as written by Friedrich et al.:

"In the early days, Biodiesel [sic] producers were satisfied when achieving a transesterification rate [yield] of approx. 85-95% thus leaving quite a volume of potential feedstock as waste in the glycerine [sic] phase. However, yield is the second biggest factor affecting profitability [after biodiesel price], i.e. a 10% decline of yield reduces profitability by approx. 25%. It is therefore crucial to transfer any potential molecule into a fatty-acid-methyl-ester; this includes triglycerides and Free-Fatty-Acids [FFA]" [page 22].

The best way to accomplish that, according to Di Serio et al., if one wants to avoid very high temperatures and pressures (method (f), see U.S. Pat. No. 6,768,015, entitled "Method of making alkyl esters using pressure", issued Jul. 27, 2004 to Luxem et al. or U.S. Patent Application Publication No. 2007/0010681, entitled "Process for the production of biodiesel in continuous mode without catalysts", by Dall'Agnol et al. published Jan. 11, 2007) is Di Serio et al.'s method (e):

"pre-esterification method: FFA are firstly esterified to FAME (Fatty Acids Methyl Esters) by using an acid catalyst, RCOOH+MeOH⇌RCOOMe+H$_2$O, and then the transesterification is performed, as usual, using an alkaline catalyst".

The preferred alternative in embodiments of the present invention is method (e) described above but, since the chosen alcohol is ethanol that will act both—as a solvent and as a reactant, the esterified and transesterified esters will be FAEE (Fatty Acids Ethyl Esters) and not FAME, something unusual in the present practice of commercial biodiesel production. As described below, the preferred choice of ethanol and the ability to process a large range of FFA content, forces the trade-off shown in FIG. 1: relatively large capital costs, particularly in equipment type for complete (<0.5% w/w) FFA esterification and instrumentation and automation in exchange for flexible process programming and control feasible for non-specialists ("foolproof operation"), as also shown in the Activity-System Map of FIG. 1.

One of the key activity choices (shaded in gray) in F$i$g.1 is to maximize yields and byproduct value. "Yields" is plural, because it encompasses the efficiency of original raw materials' oil extraction and of oil conversion to biodiesel. In present state of the prior art, small scale existent or proposed plant designs do not strive for maximization of either of these yields, mainly due to presently-presumed capital cost barriers. For example, U.S. Patent Application Publication No. 2006/0080891, entitled "Process for the preparation of fatty acid methyl ester from triglyceride oil by transesterification" by Ghosh et al. and published Apr. 20, 2006, claims: "6. A process as claimed in claim 1 wherein the oil cake contain 5-10% oil and is grounded for subsequent use as organic manure", "7. A process as claimed in claim 1 wherein free fatty acids content of expelled oil is in the range of 1.5% to 10.0% (w/w)", and "10. A process as claimed in claim 1 wherein the soap cake contains 10-30% of residual oil and is converted to a laundry bar . . . ". In examples 1, 2 and 3 of Ghosh et al., the crude oil extracted with a mechanical expeller (screw press) was 25% (oil weight/ whole seeds weight), 22.7% (w/w), and 23.7% (w/w). Nothing, however, was disclosed about the original oil content of those seeds. Considering that *Jatropha curcas* is a semi-domesticated plant, information about oil content varies widely. Ginwal et al. ("Seed source variation in growth performance and oil yield of *Jatropha curcas* in Central India", *Silvae Genetica*, Vol. 53, pp. 186-192, 2005) is a good reference source for Indian growth conditions, so one can assume that the original oil content of the whole seeds used in the before mentioned examples was within the range of 33% to 39% (w/w). And, so, (25+22.7+23.7)/3=23.8% to be compared with (33+39)/2=36%, giving an expeller extraction yield of 23.8/36=66.1%. Therefore, 33.9% of those "crucial . . . potential molecules" mentioned above were likely lost to the press cake, and not 5-10% as disclosed above.

Instead of using a 2-stage esterification/transesterification process to deal with FFA above 0.5% (w/w), for reasons stated in paragraph [015] of U.S. Pat. App. Pub. No. 2006/0080891, the oil neutralization route via soapstock is preferred, within the edible oil industry paradigm. In examples 1, 2 and 3 the efficiencies measured were 83.8%, 95.5%, and 81.7% (weight of neutralized oil after soapstock removal/weight of crude oil). Hence, the average yield of the neutralization was (83.8+95.5+81.7)/3=87.0%. As far as transesterification yield as well as FAME's purification is concerned, examples 7, 9 and 10 show 94.5%, 94.0%, and 94.1% yields. Therefore, the average yield was (94.5+94.0+94.1)/3=94.2%. And, so, the total yield of neutralization, transesterification and purification was 0.87×0.942=82.0%.

In summary, in U.S. Pat. App. Pub. No. 2006/0080891 the oil extraction yield is likely about 66.1% and the conversion (neutralization/transesterification/purification) yield is likely about 82.0%. Hence, in this small scale process, where commercial scale equipment was used only in the oil extraction phase, the total yield is 0.661×0.82=54.2% (weight of biodiesel/weight of the oil contained in the original raw material). In preferred embodiments of the present invention, the total yield is at least 95% (w/w).

In preferred embodiments, one or more byproducts are converted into a commodity of value. Once it was decided to use original raw material containing oil, for several reasons to be described below, the largest amount of byproducts are oil-extracted raw materials, whose more valued constituent is protein. For example, in terms of the maximum oil content mentioned by Ginwal et al., *Jatropha curcas* whole seeds have 39% (w/w) and the kernel from hulled seeds have 58% (w/w), meaning that with whole seeds this byproduct represents 61% of the weight of this inputted raw material, whereas if hulling and discarding the hulls, the byproduct would have 42% (w/w) of the inputted raw material. Due to the amount of this byproduct, the fact that the majority of the oils aimed for are inedible, and the relative proximity of the processing plants to farmers, the use of this byproduct is preferably directed as value-added organic fertilizers by adding potassium, phosphorus, sulfur, and calcium to the extracted cake. Therefore, another clear trade-off was made in FIG. 1: to discard the use of the proteins present in oil-extracted cakes as feed, another prior art paradigm of the edible oil industry.

The oil-extracted cake contains nitrogen and organic materials for soil conditioning, together with the added calcium mentioned for conditioning the acidic soils that abounds in tropical countries. Potassium and sulfur come from the catalysts, namely sulfuric acid and potassium hydroxide that, when the needed neutralizations are performed, produce potassium sulfate salts. Phosphorus and calcium come from one of the adsorbents used: bone char. Potassium and nitrogen also come as residues of phospholipid transesterification. Organic fertilizers are a dilute source of plants' nutrients, which is why whenever soil deficiencies are big, large quantities are needed and become economically unfeasible due to transportation and application costs. However, their use is widespread together with inorganic fertilizers, because of soil conditioning benefits such as mobilizing existing soil nutrients, releasing nutrients at a slower, more consistent rate to help avoid boom-and-bust patterns, soil moisture retention, and improved soil structure. The cakes serve as nitrogen-supplying organic fertilizers containing less soluble nitrogen and as slow release fertilizers. In some embodiments, their effectiveness is greater than conventional nitrogen fertilizers. The chemically enhanced organic fertilizer contains all three of the major plant macronutrients (nitrogen, phosphorus, and potassium) and two of the three secondary plant macronutrients (calcium, sulfur, and magnesium).

Another significant byproduct (about 10% of the weight of the biodiesel produced) is crude glycerin (glycerol). Although pure glycerin has multiple uses, including as a raw material for motor fuels additives in the form of crude glycerin (glycerol ethers, e.g. U.S. Pat. No. 6,015,440, entitled "Process for producing biodiesel fuel with reduced viscosity and a cloud point below thirty-two (32) degrees Fahrenheit" and issued Jan. 18, 2000 to Noureddini, and U.S. Pat. No. 5,578,090, entitled "Biodiesel fuel" and issued Nov. 26, 1996 to Bradin), due to the excessive supply created by biodiesel production, the prevailing remote location of the small plants, and the energy-intensive nature of the process, another trade-off was made based on present and foreseen market circumstances: to use the crude glycerin as a boiler fuel in the cogeneration of electrical power and process steam for the plant. One way of using crude glycerin as a boiler fuel was disclosed in U.S. Patent Application Publication No. 2007/0113465, entitled "Method for manufacture and use of the waste stream from biodiesel production (crude glycerin) as a commercial fuel" by Pech et al. and published May 24, 2007. Depending on local circumstances, such as potential demand for livestock fodder and potential offer of fuel biomass, the crude glycerin may be sold as livestock fodder and fuel biomass bought for the boiler. For these reasons, the original raw material for oils and fats should not contain toxins capable of contaminating the glycerin. In the case of FAME biodiesel, the contaminant is methanol itself. Note that in preferred embodiments of the present invention, the biodiesel is FAEE, which lacks the methanol contaminant. If ingested (or inhaled or through skin absorption) by humans, 10 mL of pure methanol can cause permanent blindness by destruction of the optical nerve, and 30 mL is potentially fatal. With 10 mL, admitting 0.79 g/mL, one has 7.9 g. Considering that the human body, in average, has 5 L of blood, 7.9 g divided by 5 L gives 1.58 g of methanol per liter of blood for blindness and by similar calculations, 4.74 g/L for death. In ethanol's case, 1.4 g/L results in decreased blood flow to the brain; more than 3 g/L causes stupefaction and possible unconsciousness; and above 5.5 g/L of ethanol concentration results in death.

As discussed above there are two yields to be maximized: oil extraction efficiency and oil conversion to biodiesel efficiency. In the art, following the disclosures of U.S. Pat. No. 2,551,254, entitled "Oil Extraction Process" and issued May 1, 1951 to Dunning, whenever the oil contained in a raw material is above 25% (w/w), such as for cottonseed (29%), rapeseed or canola (42%), sunflower meal (32%), peanut meal (48%), copra (65%) and others, especially non-traditional oil sources from plants, there are three processing alternatives: (i) in a single operation, to full-press the raw material in a screw press or expeller, leaving between 5% to 15% of residual oil (RO) weight in the press cake weight; (ii) to pre-press the material in a screw press or expeller deliberately leaving up to 20% of oil in the cake, to be flaked and solvent-extracted (mainly using commercial hexane), leaving an RO content below 1.5% (w/w) in the extracted cake; (iii) as originally disclosed by U.S. Pat. No. 4,901,635, entitled "Apparatus and method for the continuous extrusion and partial deliquefaction of oleaginous materials" and issued Feb. 20, 1990 to Williams, to use a special screw press apparatus that, besides pressing the "excess" oil, locks pressurized (above vapor pressure) water inside the solid material that, when extruded to atmospheric pressure, has this water rapidly vaporized, which gives to the extruded cake a porous nature favorable for solvent extraction.

One may ask why not use only solvent extraction for oil containing raw materials above 25% (w/w) oil content? The reason was disclosed in U.S. Pat. No. 2,551,254:
"In the first place, initial high oil content of itself inhibits reduction of the oil content to the desirable low value by solvent extraction. . . . Further, the ever present "fines" [or foots] present a problem which is especially serious in the case of these high oil content materials. Such fines not only interfere with the drainage of the miscella from the solid residue and entail increased cost for separation therefrom, but also collect in and clog the hexane recovery condensers, reducing efficiency and necessitating more frequent cleansing" [column 1, lines 12 to 25].

Small scale oil extraction is normally restricted to alternative (i), full-pressing with expellers with a RO content between 5% and 15% (w/w) of the cake mass. In this RO range one may say that the extraction yield of a high content raw material, such as, for example the copra (dried coconut meal) with 65% (w/w) oil, varies from 97.2% to 90.5%, because (65−1.84)/65=97.2%, (65−3.89)/65=94.0% and (65−6.18)/65=90.5%, considering that to reduce RO (residual oil) to the same percentage basis (total weight before expression) of C, the original oil content, the following calculation must be made: X=[(100−C)×RO]/(100−RO); for example, the 1.84 that substitutes the wrong (other basis) first choice of 5%, came from, X=[(100−65)×5]/(100−5)=1.84. With smaller oil contents and the same ROs the yield naturally falls; for example, the rapeseed of the above mentioned paragraph and nowadays the main source of biodiesel in Germany: (45−2.89)145=93.6%, (42−6.11)/42=86.4%, and (42−9.71)/42=78.4%. It is worthwhile to remember that the oil extraction yield of *Jatropha curcas* estimated from data of U.S. Pat. App. Pub. No. 2006/088089 was 66.1%.

Small scale solvent extraction is presently considered unfeasible, because, as written by Hron et al. ("An Acqueous Ethanol Extraction Process for Cottonseed Oil". *JAOCS*, vol. 61, pp. 1457-1460, 1984): "although hexane is flammable and explosive and the government has set limits for air emission and human contact, it still remains the solvent of choice for vegetable oil extraction in the US [and elsewhere]". According to Johnson et al. ("Comparison of Alternative Solvents for Oils Extraction". *JAOCS*, Vol. 60, pp. 229-242, 1983): "Only large centralized facilities can afford the capital investment and obtain the highly skilled labor to extract oilseeds with hexane". The capital investment mentioned is due to production scale economies, whose main origin is the fact that the solution (solvent+solute) used in the present art equipment flows under the action of a potential field, mainly gravity, and, therefore, it is not possible to accelerate that liquid flow, which increases equipment size. In some embodiments of the present invention, the main equipment operates on similar principles to an apparatus described in U.K. Patent No. GB 2,078,542B ("Process and apparatus for continuous processing under pressure", issued Feb. 15, 1984 to Cantizani-Filho), which overcomes this constraint in the following way:
"The basic problem is: how to make a solid displace itself in one direction and the fluid flow in the opposite direction, acting on the speeds of the two flows? The present invention [GB 2,078,542B] is based on a solution of this problem utilizing the properties of Archimedes' screw: a variable pitch and/or conical screw rotating inside a closed housing [differently from expellers or screw presses] develops a distribution of increasing pressures upon the solid which is pushed by the screw; injecting the solvent near the higher pressure portion, the solvent flows towards the other end, in a direction contrary to that of the solid. The fact that the extractor of the present invention allows the control of the two flow speeds, gives it the following advantages: a greater extracting efficiency; more compact structure and therefore less expenses [capital costs per unit of installed capacity]; possibility of extraction by solvation [combined with expression] in small scale production; compensation for eventual higher operational costs, due to the higher energy in the process, by the greater efficiency and by the lower capital and maintenance costs" [page 5, lines 9 to 25].

As far as the constraint of "obtain[ing] the highly skilled labor to extract oilseeds with hexane" cited in the beginning of the last paragraph is concerned, the "flammable and explosive" and toxic commercial hexane solvent is replaced with the much less flammable, less explosive and less toxic ethanol that, besides acting as a more benign solvent from renewable sources, is also a reactant used to produce FAEE (fatty acids ethyl esters). The reference bioethanol used is preferably the Brazilian anhydrous fuel ethanol produced from sugar cane, which presently is mixed in a 20% basis in all gasoline consumed in Brazil. Its minimum ethanol content is 99.3% (w/w) or 99.6% (vol/vol), a maximum density of 791.5 kg/cubic meters, a maximum acidity (as acetic acid) of 30 mg/L and a maximum electrical conductivity of 500 microS/m. For such a product the following statements of Lu et al. ("Nearcritical and supercritical ethanol as a benign solvent: polarity and hydrogen-bonding". *Fluid Phase Equilibria*, Vol. 198, pp. 37-49, 2002) apply:

"NC [near critical] and SC [super critical] ethanol is a compressible fluid exhibiting great tunability with temperature and pressure, it offers the potential to be applied as an environmentally benign solvent for separations and chemical reactions. . . . For liquid ethanol from ambient temperature to 225° C., the solvent strength is strongly temperature dependent and can be adjusted continuously with temperature. When the temperature increases, the dipolarity/polarizability, hydrogen-bond acidity and basicity simultaneously decrease, this turns near critical ethanol into a nearly non polar solvent with some degrees of hydrogen-bond donating and accepting abilities" [page 47].

Although the bioethanol used in preferred embodiments of the present invention is the one mentioned, derived from sugar cane, several other sources of first generation and second generation bioethanol may be included as solvent and reactant. These include first generation bioethanol, such as the sucrose and other sugars (e.g., fructose and glucose) of sugar beet, and glucose derived from starch (e.g., corn starch) through acid or enzymatic hydrolysis of starch macromolecules. Prospective second generation bioethanol includes that obtained by fermentation of pentose and hexose derived from enzymatic or acid cracking of cellulose and hemicellulose macromolecules.

Hexane is a non polar solvent, which is why it does not extract FFA and other undesirable polar components in edible oils. Its relative polarity (0.009) is the second lowest amongst organic solvents, while ethanol relative polarity at ambient temperature is 0.654 and methanol is 0.762. Hexane's flash point, however, is −23° C., while ethanol's is 13° C. and methanol's is 12° C. The explosive limits (in vol %) in air are 1.1 to 7.5 for hexane, 3.3 to 19.0 for ethanol, and 6.0 to 36.5 for methanol. For these reasons, ethanol is a preferred solvent and reactant in embodiments of the present invention, and, consequently, the biodiesel produced is composed of FAEEs, that is, fatty acids ethyl esters, and not the presently almost ubiquitous FAME (fatty acids methyl esters). As described in detail below, the anhydrous ethanol already described is used as a less polar solvent and reactant in the main equipment in a temperature range of 110° C. to 140° C., as a more polar solvent in a temperature range of 5° C. to 15° C. in the intermediate reactors, and in a temperature range of 90° C. to 120° C. in the final reactor. An intention of these temperatures being, respectively: to extract non polar glycerides by solvency and to transesterify them with an acidic catalyst, to esterify FFA and other polar glycerides with an acidic catalyst, and to transesterify non polar glycerides free of FFA (less than 0.5% w/w) in a base-catalyzed reaction. As will also be seen, intense agitation allows polar substances (e.g., FFA) to react with ethanol at higher temperatures.

Returning to FIG. 1, the main equipment is referred to herein as an "acid-enhanced solvency and expression-based extractor and in situ reactor". Its chemical reactor role is what is called in the literature in situ esterification and transesterification or alcoholysis. For example, Kildiran et al. ("In-situ Alcoholysis of Soybean Oil", *JAOCS*, Vol. 73, no. 2, pp. 225-228, 1996) describes in situ alcoholysis in the following way: "In-situ [sic] alcoholysis differs in that the oil-bearing material contacts acidified alcohol directly instead of reacting purified oil and alcohol. That is, extraction and alcoholysis proceed in the same process. This means that the alcohol acts both as an extraction solvent and as an esterification reagent". Two things are common in the literature describing in situ alcoholysis, including U.S. Pat. No. 7,112,229, entitled "Process for producing biodiesel fuel using triglyceride-rich oleaginous seed directly in a transesterification reaction in the presence of an alkaline alkoxide catalyst" and issued Sep. 26, 2006 to Khalil et al., describing ethanolysis of castor bean seeds: (i) the disclosures are based in laboratory bench scale experiments and very little is said about scale-up to commercial scale, especially about the equipments to be commercially used; (ii) many professional articles emphasizes the better total yield of biodiesel of the in situ processes compared to conventional processes.

Harrington et al. ("A Comparison of Conventional and in situ Methods of Transesterification of Seed oil from a Series of Sunflower Cultivars". *JAOCS*, Vol. 62, pp. 1009-1013, 1985), working with whole seeds from a series of sunflower cultivars, stated: "Transesterification of sunflower seed oil in situ with acidified methanol has been shown to produce fatty acid methyl esters in yields significantly greater than those obtained from conventional reaction with pre-extracted seed oil. Yield improvements of over 20% were achieved and could be related to the moisture content of the seed" [page 1009]. In another work with sunflower seed oil, Harrington et al. ("Transesterification in Situ of Sunflower Seed Oil". *Ind. Eng. Chem. Prod. Res. Dev.*, Vol. 24, pp. 314-318, 1985) concluded: "The technique of transesterification in situ of sunflower seed oil provides a yield of fatty acid esters qualitatively similar to, but quantitatively greater than, the yield obtained from treatment of the pre-extracted oil. It appears likely that the increase in yield is predominantly due to enhanced accessibility of the oil in the seed, which in turn is a consequence of the acidic reaction medium". Regarding ethanolysis, Harrington et al. wrote on page 317: ". . . The same experiment, when conducted with ethyl alcohol, gave an in situ yield of 43.7% ethyl esters [based on dry seeds weight], compared to the expected "maximum" of 42.6%. These figures suggest that not only were yield losses minimized during workup, but that other lipid material, not easily extractable with hexane, had reacted in situ and had therefore contributed to the yield of esterified products". These results were confirmed, 13 years later, in experiments reported by Siler-Marinkovic et al. ("Transesterification of sunflower oil in situ", *Fuel*, Vol. 77, pp. 1389-1391, 1998).

There are two main causes for the described increased yields: (i) sunflower seed kernels being lost during hulling together with lipids contained in the hulls; or (ii) the acid mixed with alcohol as a catalyst also acting as an extraction enhancer. For example, in the case of sunflower seed hulls, the abstract of Cancalon ("Chemical Composition of Sunflower Seed Hulls", *JAOCS*, Vol. 48, pp. 629-632, 1971) reads: "The major components of sunflower seed hulls, lipids, proteins and carbohydrates were studied. Lipids represent 5.17% of the total hull weights, 2.96% of which is wax composed of long chain fatty acids (C14-C28, mainly C20) and fatty alcohols. . . . The rest of the lipid fraction is oil with a composition similar to that of the kernel oil". It is expected that, near the kernel of the seed, where most of the triglycerides accumulate, one would also find lipids from seed hulls, pulp and eventually other parts of the fruit. For example, the total lipid content in rapeseed whole seeds is 434 to 504 g/kg, that is 43.4% to 50.4% (w/w); whereas in the hulls, which represents 105 to 172 g/kg of whole seeds weight, the lipid content is 130 to 200g/kg of the hull weight, that is, 13.0% to 20.0% (w/w). That is why the "original" in "original raw material" as used herein means not only kernels, but also whatever part of the plant that contains lipids, transformable in mono alkyl esters of ethanol, that can be economically extracted from the original raw materials. Usually these parts, besides containing economically extractable lipids, have fibers (cellulose, hemicellulose, and lignin) which, in addition to enhancing screw performance, are useful as soil conditioners.

Regarding the second cause for increased yields, early experimental results were reported by Hensarling et al. ("Extraction of Lipids from Cottonseed Tissue: IV. Use of Hexane-Acetic Acid". JAOCS, Vol. 51, pp. 166-168, 1974): "Hexane and mixtures of hexane and 2-25% acetic acid (v/v) were used to prepare oil and protein from glanded cottonseed by solvent extraction. As the amount of acetic acid in the solvent increased, the amounts of total lipid, phospholipids, neutral oil, and gossypol in each miscella increased, but the amount of free fatty acids did not change significantly". The experiment, done with glanded cotton meal mixed with hulls pieces, was performed using laboratory bench scale equipment and, since hexane is a very non-polar solvent and FFA are polar, not much FFA was extracted, as shown by the first and fifth line of table 1 (page 167) of Hensarling et al., reporting components of miscella from 2 g of meal: (i) 0% (v/v) acid, total lipids 686 mg, phosphorus 1.12 mg, FFA 15.9 mg, and neutral oil 612 mg; (ii) 25% acetic acid (v/v), total lipids 753 mg (+9.8%), phosphorus 1.22 mg (+10.2%), FFA 16.3 mg (+2.5%), and neutral oil 632 mg (+3.3%). In preferred embodiments of the present invention, FFA is useful, but FFA is a nuisance within the prior art edible oil paradigm.

Nine years later, the subject of acidic hexane was revisited, this time with soybeans in Hensarling et al. ("Solvent Extraction of Lipids from Soybeans with Acid Hexane", *JAOCS*, Vol. 60, pp. 783-784, 1983) with the following results:

"Hexane/acetic acid [5% v/v] extractions yielded ca. 11% more total lipids and ca. 6-10% more neutral oil than did hexane extractions. . . . Thirty-five times more phosphorus was extracted with hexane/acetic acid than with hexane, this phosphorus represented ca. 46% of the phospholipids phosphorus of soybean. . . . Storage of oils of oil seeds are contained in intracellular packets called spherosomes (1, 2). Physiochemical characterizations (2) and electron microscopial observations (3) proved that the limiting half-unit membrane (4) of these organelles are acid labile. . . . Since free fatty acids amounts are constant, regardless of solvent acidity (5), and then extraction of additional 'strongly bound' neutral oil was accompanied by a disproportional amount of phospholipids. This would happen if neutral and polar lipids of membranes were extracted . . . were accompanied by disintegration of intracellular membrane structure (9, 10)".

The reactor referred to herein as the main equipment is termed an "acid-enhanced solvency and extraction-based extractor and in situ reactor". In some embodiments, since corrosion is dealt with through capital investment, the palatability of oil and meal is not relevant, efficient catalyst and membrane disintegrator is desirable, and the production of inorganic fertilizer is preferred, concentrated sulfuric acid is the preferred acid catalyst, because, when neutralized with potassium hydroxide (the other catalyst used), potassium sulfate salts are produced as byproduct which chemically enhance the cake for use as organic fertilizer. Moreover, anhydrous ethanol, with the specific characteristics described previously, is used: "for liquid ethanol from ambient temperature to 225° C., the solvent strength is strongly dependent and can be adjusted continuously with temperature". In the main equipment, the acid-enhanced solvency and extraction-based extractor and in situ reactor, the temperature is preferably maintained in the range of about 110° C. to 140° C., depending on the original raw material being processed.

In some embodiments, this upper limit of 140° C. may be increased, but it is preferably 140° C. or less, because decomposition of glycerol starts at about 150° C. At this temperature range the polar lipids, such as FFA, are less soluble in ethanol, but they are extracted together (heterogeneously mixed with other liquids) with the main flow of liquids (heated ethanol, glycerides, and other non polar lipids) that are expelled or expressed under pressure in a counter current flow relative to the solid material flow. Moreover, this low solubility handicap is, to a certain level, compensated by intense emulsion of the reactants through a ShockWave Power™ reactor, that is described below. In a subsequent reactor the remaining polar lipids, mainly FFA, that may be originally present in high percentages as chosen in FIG. 1, react with very cold anhydrous ethanol via acid-based catalysis to not reach the maximum level of 0.5% w/w, or an acid number of 1.

Therefore, the main equipment may process "any potential molecule" transformable into a fatty acid ester molecule, thereby abandoning the present teachings of the prior art of the edible oil industry paradigm, because of "palatability", "physical form", and also shelf life of the oil and cake, that FFA, phospholipids, and other seed components other then neutral oil are nuisances. As far as in situ esterification and transesterification is concerned, none of the processes or apparatus disclosed herein in embodiments of the present invention are currently commercially used nor described in the prior art.

Another decision in FIG. 1 not yet fully described is "temperature and pressure changes for short residence times". The faster the physical and chemical transformations occur, the shorter the residence time. The shorter the residence time is, the greater the installed capacity of the equipment. The greater the installed capacity is, the smaller the unit capital cost of the equipment. Since "relatively large capital costs" are preferred, as shown in FIG. 1, the only way to reduce its impact is to thrive for shorter residence times. Transesterification and esterification chemical reactions depend on at least nine variables: 1) catalyst type; 2) alcohol type; 3) catalyst-to-alcohol ratio; 4) alcohol-to-oil ratio; 5) reaction temperature; 6) reaction time; 7) agitation rate; 8) FFA content; and 9) water content. Assuming reaction time as the dependent variable, reaction time can be analyzed in terms of the other eight variables, which are not necessarily independent between themselves; for example: i) with FFA content above 0.5% (w/w), to preserve yield, acidic catalysts must be used, although the reaction may be up to 4,000 times slower than base-catalyzed reactions; ii) alcohol type, reaction temperature, and agitation rate are related because agitation is used to minimize mass transfer constraints in heterogeneous reactants systems. The combination of ethanol-temperature, however, can also minimize that constraint, because, as described above, ethanol solvency power may be adjusted continuously with temperature, thereby diminishing the heterogeneity of the liquid system being chemically reacted.

The basic catalyst chosen for transesterification, which is also used to neutralize the acid catalyst and acts as an extraction enhancer, is potassium hydroxide. Although KOH is about 14% more expensive than NaOH (sodium hydroxide), KOH may be more effective in transesterifications than NaOH. The acid catalyst, also used to neutralize the basic catalyst, is concentrated (98% w/w) sulfuric acid, which is about 57% more expensive then hydrochloric acid. It is believed, however, that this cost increase is more than compensated by potassium sulfate salts that chemically enhance the byproduct organic fertilizer. Moreover, hydrochloric acid can not be used because its boiling point at atmospheric pressure and 10% (w/w) concentration in water solution is 103° C. Therefore, since there is flash vaporization of water and ethanol, there is the undesirable possibility of vaporizing HCl as well. The boiling point of sulfuric acid is 338° C. at atmospheric pressure. In terms of residence time, there are equal conditions in the base-catalyzed transesterification reaction with 1.5% (w/w) KOH and 1.0% NaOH. Moreover, according to FIGS. 2 and 3 and Table 2 on page 301 of Lotero et al., when compared to sodium methoxide, potassium methoxide, and NaOH at 1% (w/w), the yield of KOH is 6% superior to NaOH due to less triglyceride saponification and FAME dissolved in glycerol.

As described above, the preferred reactant and extraction-solvent in some embodiments of the present invention is fuel anhydrous ethanol from renewable sources. There is currently no commercial plant using ethanol for biodiesel production. This is true in spite of the fact that in Brazil market prices (without governmental interference) of fuel ethanol are favorable. In November 2007, which is the beginning of the period between sugar cane harvests when prices are normally higher, the ex-distillery price of anhydrous ethanol was US$ 1.82 per U.S. gallon in Southeastern Brazil, where, normally, anhydrous fuel ethanol is 18% more expensive than hydrated fuel ethanol, because the first has 0.7% (w/w) water content and the second 6.2% (w/w) water content. In November 2007, the average price difference in the U.S. between fuel ethanol (mainly corn-derived) and methanol (mainly produced from natural gas) was 15%, that is, US$ 2.30/gallon for the first and US$ 2.00/gallon for the second. This price difference appears to be decreasing with the passage of time, perhaps because of the increasing methanol demand for biodiesel production and natural gas prices, which usually follows petroleum prices. Anyway, a 15% price difference that decreases with time does not appear to be high enough to explain the predominant use of methanol, considering the environmental benefits of renewable ethanol versus fossil fuel-derived methanol (natural gas, petroleum, or coal).

Perhaps the main reason for the present prevailing methanol use is that methanol-based process technology is commercially proven, while the potential benefits of an ethanol-based one are not. In terms of residence time, the disadvantage of ethanol in FFA esterification when compared to methanol is compensated by adjusting ethanol polarity with cold temperatures, as well as the hydrogen-bond acidity of liquid ethanol. Another favorable point for ethanol is that it forms an azeotropic mixture with water at 95.6% (w/w) of ethanol/water, whose boiling point at 0.82 atm pressure is 78.1° C. Methanol does not forms azeotropic mixtures with water, which is why methanol is called a "dry" alcohol. Considering that the proportion of ethanol/water is well above 100%, all water is vaporized close to 78.1° C. along with 95.6% of ethanol of a given amount of the azeotropic mixture (95.6% ethanol+4.4% water) being vaporized. That is a clear advantage over methanol, where all methanol (boiling point=65° C.) has to be vaporized before water elimination (boiling point=100° C.) can be done through vaporization at normal atmospheric pressure. Anyway, all these factors reduce residence time during flash vaporization.

The analysis of catalyst-to-alcohol ratio and alcohol-to-oil ratio is divided into sulfuric acid catalysis and potassium hydroxide catalysis. The sulfuric acid catalysis analysis further is divided as follows: i) sulfuric acid catalytic and extraction enhancing for in situ reactions; ii) ethanolic extraction with or without acid enhancing; and iii) sulfuric acid catalytic action mainly for FFA esterification.

For the in situ reactions and ethanolic extractions, after unit conversions using the following molecular weights and densities respectively: methanol 32 g/mol, 0.79 g/mL; ethanol 46 g/mol, 0.79 g/mL; sulfuric acid 98 g/mol, 1.84 g/mL, one has:

Siler-Marinkovic et al. proposes a range of 922% (w/w) to 1530% (w/w) of ethanol/oil and 1.6% (w/w) to 6.5% (w/w) of sulfuric acid/ethanol;

Harrington et al. ("Transesterification in Situ of Sunflower Seed Oil") suggests 1920% (w/w) of ethanol/oil and 6.9% (w/w) of sulfuric acid/ethanol;

Hron et al. (1984) establishes 743% (w/w) of ethanol/oil for extraction without acid;

Özgül et al. proposes 1700% (w/w) of ethanol/oil and 5.8% (w/w) of sulfuric acid/ethanol;

Rao et al. ("Alcoholic Extraction of Vegetable Oils. V. Pilot Plant Extraction of Cottonseed by Aqueous Ethanol", *JAOCS*, Vo.34, pp. 277-281, 1958) establishes 625% (w/w) of ethanol/oil for extraction without acid;

Hron et al. ("Acidic Ethanol Extraction of Cottonseed", *JAOCS*, Vol. 69, pp. 951-952, 1992) proposes 1800% (w/w) of ethanol/oil for extraction enhanced with citric or phosphoric acids.

The averages and standard deviations are, respectively, 1320.0%±540.6% (w/w) of alcohol/oil, as well as, 4.8%±2.3% (w/w) of sulfuric acid/alcohol. Therefore, considering a range of 20 to 40 minutes of residence time in the acid-enhanced solvency and extraction-based extractor and in situ reactor (main equipment), and the favorable effects of temperature, the presence of auto-generated co-solvents, and, mainly, an unusual degree of agitation, the preferred ranges of excess ethanol and catalyst amount in some embodiments of the present invention are about 1190% (w/w) to 1450% (w/w) of ethanol/oil and about 4.3% (w/w) to 5.2% (w/w) of concentrated sulfuric acid/ethanol.

Mainly for FFA catalytic esterification with sulfuric acid, after similar unit conversions, one has:

Veljkovic et al. proposes ratios of up to 40.0% (w/w) of methanol/oil and 5.0% (w/w) of sulfuric acid/methanol;

Chonghong et al. ("Biodiesel production by esterification of fatty acid distillate", *Biomass and Bioenergy*, Vol. 31, pp. 563-568, 2007) suggests ratios of 73.6% (w/w) of methanol/palm fatty acid distillate and 2.5% (w/w) of sulfuric acid/methanol;

Zhang et al. ("Biodiesel production from waste cooking oil: 1. Process design and technological assessment", *Bioresource and Technology*, Vol. 89, pp. 1-16, 2003) indicates ratios of about 30.1% (w/w) to 157.7% (w/w) of methanol/waste cooking oil and about 1.3% (w/w) to 8.3% (w/w) of sulfuric acid/methanol;

Lotero et al. proposes ratios in a range of about 153% (w/w) to 230% (w/w) of ethanol/oil and about 1% (w/w) to 5% (w/w) of sulfuric acid/methanol;

Berrios et al. ("A kinetic study of the esterification of free fatty acids (FFA) in sunflower oil", *Fuel*, Vol. 86, pp. 2383-2388, 2007) indicates ratios of 213% (w/w) of methanol/oil and 11% (w/w) of sulfuric acid/methanol;

Freedman et al. ("Facts Affecting the Yields of Fatty Esters from Transesterified Vegetable Oils", *JAOCS*, vol. 61, pp. 1638-1643, 1984) suggests ratios of 106.7% (w/w) of methanol/oil and 0.94% (w/w) of sulfuric acid/methanol;

U.S. Pat. No. 4,164,506, entitled "Process for producing lower alcohol esters of fatty acids" and issued Aug. 14, 1979 to Kawahara et al., discloses ratios of 20.5% (w/w) of methanol/coconut oil and 0.5% (w/w) of sulfuric acid/methanol;

U.S. Pat. No. 4,695,411, entitled "Process for manufacturing a composition of fatty acid esters useful as gas oil substitute motor fuel with hydrated ethyl alcohol and the resultant esters composition" and issued Sep. 22, 1987 to Stern et al., discloses ratios of 38.3% (w/w) of ethanol/oil and 0.12% (w/w) to 0.38% (w/w) of sulfuric acid/ethanol.

The averages and standard deviations are, respectively, 106% (w/w)±78% (w/w) of alcohol/oil, as well as, 3.3% (w/w)±3.6% (w/w) of sulfuric acid/alcohol. The data dispersion is larger in this case: the standard deviation being 73% of the average versus 41% in the alcohol to oil ratio and 111% versus 49% in the sulfuric acid/alcohol ratio. In the alcohol/oil instance, the explanation is that in several studies the dosage of excess alcohol is determined by the FFA content and, in the case of the sulfuric acid/alcohol ratio the large variation is perhaps mainly due to worries about glycerol and ethanol ethers formation with large amounts of sulfuric acid. In a preferred embodiment of the present invention, this is not a concern, because those ethers, besides acting as co-solvents when dissolved in biodiesel, enhance the properties of FAEEs.

Therefore, considering the cycle in the first piston-cylinder reactor in the range of 20 to 40 minutes and the favorable effects of temperature, co-solvents, and agitation, a preferred excess ethanol and catalyst amount are in the range of about 74% to 138% (w/w) of ethanol/oil and about 4.3% to 5.2% (w/w) of sulfuric acid/ethanol in a preferred embodiment of the present invention, equal to the amount of catalyst in the main equipment (the acid-enhanced solvency and extraction-based extractor and in situ reactor), because, from this equipment to the next (piston-cylinder reactor), a flash evaporation of ethanol and water occurs, with almost the same amount of sulfuric acid remaining in the mixture. Because of the intense reduction of excess ethanol, from the range of 1190% to 1450% (w/w) to the range of 74% to 138% (w/w), to keep the same concentration of $H_2SO_4$, the largest part of this catalyst should be neutralized. For this, calculating the amount of sulfuric acid to be neutralized and reach the 4.3% to 5.2% catalyst range, the first replenishment of ethanol is preferably a solution of KOH in ethanol in the range of 84% (w/w) to 157% (w/w) of KOH-ethanol/total oil instead of the conventional range of 74% (w/w) to 138% (w/w). After this one-time only neutralization in the first piston cylinder, there should be only ethanol replenishment in the next cycles after flash vaporizations. From the references mentioned, another range would be 1.6% (w/w) to 4.9% (w/w) of sulfuric acid/ethanol. Since ether formation is desirable rather than undesirable, and the presence of water is unfavorable, the range of 4.3% to 5.2% is preferable, which differs from the prior art of 1.6% to 4.9%. The same conditions should prevail in the second piston-cylinder reactor.

Lotero et al. remarks:

"Ironically, the use of sulfuric acid as the catalyst at temperatures above 100° C. has received some criticism due to the formation of byproducts such as ethers of glycerol and methanol. However, formation of such ethers could be taken as a positive side reaction, rather than something that should be avoided. Indeed, more detailed studies dealing with the issue of glycerol ether additives to improve the flow properties of biodiesel and their synthesis are required".

The viscosity of ethyl esters is greater than those of methyl esters, and the addition of glycerol and ethanol ethers, besides increasing the fuel yield, lowers biodiesel viscosity, cloud point, and pour point.

For catalytic transesterification with KOH or NaOH, after similar unit conversions, one has:

Berchmans et al. ("Biodiesel production from crude *Jatropha curcas* L. seed oil with high content of free fatty acids", *Bioresource Technology*, Vol. 99, pp. 1716-1721, 2008), in the second phase of Jatropha curcas transformation, recommends about 24% (w/w) to 70% (w/w) of methanol/oil and about 4.7% (w/w) to 5.8% (w/w) of NaOH/methanol;

U.S. Pat. No. 6,712,864, entitled "Carbon nanotube structures and method for manufacturing the same" and issued Mar. 30, 2004 to Horiuchi et al., whose processes employ co-solvents, discloses about 76.7% (w/w) to 178.9% (w/w) of methanol/oil and about 0.6% (w/w) to 1.3% (w/w) of NaOH or 150% (w/w) of ethanol/oil and 1% of KOH/ethanol;

Ramadhas et al. suggests about 21.3% (w/w) to 32.0% (w/w) of methanol/oil and about 1.4% (w/w) to 2.3% (w/w) of NaOH/methanol;

Veljkovic et al. proposes about 21.3% (w/w) methanol/oil and about 4.7% (w/w) of KOH/methanol;

Vicente et al. ("Integrated biodiesel production: a comparison of different homogenous catalysts systems", Bioresource Technology, vol. 92, pp. 297-305, 2004) indicates about 21.3% (w/w) methanol/oil and about 7.0% (w/w) of KOH/methanol;

Noureddini et al. ("Kinetics of Transesterification of Soybean Oil", *JAOCS*, vol. 74, pp. 1457-1463, 1997) suggests about 21.3% (w/w) methanol/oil and about 0.9% (w/w) of NaOH/methanol with a Reynolds number above 10,000;

Boocock et al. ("Fast Formation of High-Purity Methyl Esters from Vegetable Oils", *JAOCS*, Vol. 75, pp. 1167-1172, 1998), going against the paradigm established by Freedman et al. in 1984 of a 6:1 molar ratio for methanol/glycerides that gives 21.3% (w/w) of methanol/oil, proposes a molar ratio of 27:1, or 96% (w/w) of methanol/oil and 1.6% (w/w) of NaOH/methanol;

U.S. Pat. No. 4,695,411 discloses ranges of about 46% (w/w) to 61% (w/w) of ethanol/oil and about 0.2% (w/w) to 1.6% (w/w) of NaOH/ethanol.

The averages and standard deviations are 60.1% (w/w) ±49.0% (w/w) of alcohol/oil and 2.7% (w/w)±2.1% (w/w) of NaOH or KOH/alcohol. The data dispersion is intermediate relative to the two preceding cases. In the alcohol/oil ratio, six of the 14 reviewed references followed Freedman et al. paradigm (6:1 molar ratio). In the catalyst/alcohol ratio, the data dispersion may be attributed to the concern that, although more catalyst diminishes the residence time, it may also enhance soap emulsion formation, depending on the amounts of FFA and water present.

Therefore, considering a range of 20 to 40 minutes of residence time in the third piston-cylinder reactor and, as before, the favorable effects of temperature, co-solvents, and agitation, the preferred ratios are from about 74% (w/w) to 138% (w/w) of ethanol/oil and about 4.3% (w/w) to 5.2% (w/w) of sulfuric acid/ethanol, considering that one needs more KOH to substitute for NaOH, as described above, and FFA contents are preferably kept below 0.5% (w/w) of FFA/total oil. Besides those amounts for the transesterification catalysis, more KOH is needed to neutralize the $H_2SO_4$ present [4.3% to 5.2% (w/w) of $H_2SO_4$/ethanol] in the range of 4.92% to 5.95% (w/w) of KOH/ethanol. Therefore, a ratio of KOH/ethanol in the range of 7.4% to 10.45% (w/w) is preferably received in the third piston/cylinder reactor. After completion of the transesterification reaction, the KOH catalyst [7.4% to 10.45% (w/w) of KOH/ethanol] is preferably neutralized with 2.19% to 3.78% (w/w) of $H_2SO_4$/ethanol.

Although the general trend is a diminishment of reaction time with increased temperature, the vaporization temperatures at atmospheric pressure, that is 64.7° C. and 78.4° C. for methanol and ethanol, respectively, limit the temperature range for reaction in biodiesel production. For reaction and for safety reasons, ethanol in preferably maintained in the liquid state. Ethanol vapor should be avoided because, as described above, its explosive limit is 3.3% to 19.0% volume in air and its flash point is 13° C., which is, however, much better than commercial hexane (1.1% to 7.5% and −23° C., respectively). Regardless, great care should be taken to avoid air-ethanol vapor mixtures. To maintain ethanol in a liquid phase, pressure is preferably used following ethanol's vapor pressure curve: boiling temperature of −2.3° C. at 0.013 atm; 19° C. at 0.053 atm; 34.9° C. at 0.132 atm; 63.5° C. at 0.526 atm; 78.4° C. at 1.0 atm; 90° C. at 1.6 atm; 110° C. at 4.3 atm; 152° C. at 10 atm; 183° C. at 20 atm; 218° C. at 40 atm; and 242° C. at 60 atm. That is why autoclaves are used whenever laboratory bench tests are performed with temperatures above 78.4° C., or better, above 78.1° C., the boiling point near atmospheric pressure of the azeotropic ethanol water solution (95.6% w/w of ethanol/water), as described above.

Unlike in autoclaves, where the pressure is generated through vapor formation, in the main equipment in some embodiments, the pressure is preferably generated or controlled mechanically by the action of variable rotation, a decrease in pitch in the main and feed screws, and the movement of a stationary choke or cake "discharge-plug". In the piston-cylinder reactors, the position of the piston generates or controls the pressure. Therefore, there is preferably no vapor formation, except for microbubbles that rapidly form and collapse to enhance mixing by shock waves, in the piston-cylinder reactors. The pressure gradient in the main equipment, whose temperature is preferably in the range of about 110° C. to 140° C., preferably increases from a minimum pressure of 16 atm to about 400 atm to 600 atm at the cake choke or "discharge-plug".

In the intermediate piston-cylinder reactors, whose normal operating temperature range is preferably 5° C. to 15° C., ethanol vapor formation is not an issue. Therefore, atmospheric pressure is sufficient, except during shock wave formation. A minimum pressure of 8 atm is preferably used in the final piston-cylinder reactor, whose normal operating temperature range is preferably about 90° C. to 120° C.

In terms of the background art, Demirbas teaches reaction times in the range of about 100 to 300 seconds with pressures and temperatures up to 990 atm and 250° C., respectively, in a supercritical methanol transesterification in autoclaves without catalysts. Also in autoclaves without catalysts, U.S. Patent Application Publication No. 2006/0288636, entitled "Process for non-catalytically producing biodiesel fuel without yielding byproduct" by Iijima et al. published Dec. 28, 2006, discloses residence times in the range of 4 to 12 minutes at 370° C. to 500° C. and 195 atm to 590 atm. With acid catalysis, U.S. Pat. No. 6,768,015 discloses a reaction time of less than 15 minutes, with pressure and temperature up to 34 atm and 200° C., respectively. Adopting a plug-flow environment to enhance mixing, U.S. Patent Application Publication No. 2003/0229238, entitled "Continuous Transesterification Process" by Fleisher and published Dec. 11, 2003, teaches a residence time less than 180 seconds at a temperature of 80° C. to 180° C. and pressure below 30 atm.

Therefore, the reaction time may be measured in seconds or minutes, but the majority of the cited prior art measures that time in hours. In some embodiments of the present invention, the reaction times are preferably in minutes, as described previously: 20 to 40 minutes for each of the main equipment, the first piston-cylinder reactor intermediate reactor, the second piston-cylinder reactor, and the third piston-cylinder or final reactor.

As described above, the pressures that keep ethanol in the liquid phase are preferably mechanically generated and controlled, and intermediate results (between seconds and hours for residence times) are reached with the following intermediate temperatures and corresponding pressures: 110° C. at 8 atm and 140° C. at 16 atm. The only known prior art that proposes ranges close to those is U.S. Pat. No. 4,695,411, which refers to a 30 minute reaction time for acid ethanolysis in autoclave, within the temperature range of 80° C. of 130° C. In contrast to U.S. Pat. No. 4,695,411, some embodiments of the present invention use a much lower water content, namely a preferred solvent/reactant of Brazilian type anhydrous fuel ethanol that contains up to 0.7% (w/w) of water/ethanol, in contrast to hydrated ethanol in the range of 7% (w/w) to 30% (w/w) of water/ethanol in U.S. Pat. No. 4,695,411.

The majority of the prior art already cited relates residence time to mass transfer constraints, typical of heterogeneous systems or, in other terms, to the degree of solubility of oils and fats in alcohols. Solubility data has been available since the mid-1950's in four articles by Rao et al. ("Alcoholic Extraction of Vegetable Oils. I. Solubilities of Cottonseed, Peanut, Sesame, and Soybean Oils in Aqueous Ethanol", *JAOCS*, Vol. 32, pp. 420-423, 1955; "Alcoholic Extraction of Vegetable Oils. II. Solubilities of Corn, Linseed, and Tung Oils in Aqueous Ethanol", *JAOCS*, Vol. 33, pp. 82-84, 1956; "Alcoholic Extraction of Vegetable Oils. III. Solubilities of Babassu, Coconut, Olive, Palm, Rapeseed, and Sunflower Seed Oils in Aqueous Ethanol", *JAOCS*, Vol. 33, pp. 389-391, 1956; and "Solubility of Lard in Aqueous Ethanol", *JAOCS*, Vol. 34, pp. 610-611, 1957), in which solubilities in ethanol (with 4 different water contents), between 40° C. and 100° C., are reported for the following oils and fats: cottonseed, peanut, sesame, soybean, corn, linseed, tung, babassu, coconut, olive, palm, rapeseed, sunflower, and four types of lard.

The Rao articles measure the solubilities (in mass % of oil in ethanol) of those oils and fats, showing that, besides enhancement of solubilities with increased temperatures (as theoretically-empirically shown by Lu et al.), there is also an enhancement of solubility the more anhydrous that the ethanol is. For example, for unrefined corn oil in ethanol, at increasing temperatures of a 95.4% (w/w) solution of ethanol/water, that is, close to the azeotropic solution (95.6%) that boils at 78.1° C. near atmospheric pressure, one has: 5% (w/w) of corn oil/ ethanol solution (95.4%) at 20° C. and 30° C.; 6% at 40° C.; 8% at 50° C.; 10% at 60° C.; 16% at 70° C.; 25% at 80° C.; and 100% at 90° C., that is, at 90° C., corn oil is soluble in a solution of ethanol and water close to the azeotropic point in all proportions. At atmospheric pressure and 90° C., ethanol is in a vapor state. At 78.1° C. only about 23% (w/w) of oil can be dissolved by that ethanol-water solution. Therefore, elevated temperature and pressure are preferred to have the desired solubilities in the liquid phase.

To illustrate the relationship of solubility to water content, the solubility of corn oil in 91.5% (w/w) ethanol/water at 60° C. is 6% (w/w). The solubility increases to 10% (w/w) in 95.4

(w/w) ethanol/water, 19% (w/w) in 98.0% (w/w) ethanol/water, and 32% (w/w) oil in 99.9% (w/w) ethanol/water. Therefore, U.S. Pat. No. 4,695,411 seems mistaken when choosing the range of 7% (w/w) to 30% (w/w) of water/ethanol.

Therefore, for solubility reasons, water is preferably avoided in the reaction mixture, either by prevention or remediation. In some reactions, it is easier to prevent the presence of water, e.g., by using anhydrous ethanol, as in some embodiments of the present invention, where this solvent/reactant contributes with only 0.7% (w/w) of water in Brazilian anhydrous fuel ethanol, or 2% (w/w) of water in commercial concentrated (98%) sulfuric acid, or 10% (w/w) of water in commercial anhydrous KOH (briquettes, crystal or flakes). It is more difficult to prevent the presence of water in the original raw oil-containing material; for example, in Abraham et al. ("Water Accumulation in the Alcohol Extraction of Cottonseed", JAOCS, Vol. 70, pp. 207-208, 1992) in a more extreme condition than preferred for embodiments of the present invention, flakes of hulled cottonseed put into a forced draft oven at 130° C. took 160 minutes to decrease the moisture content from 12.5% asymptotically to little less than 3%. It was relatively easy to reach 4% moisture (60 minutes) and very difficult to get moisture below 2%. That is why, in the cooking and drying of original material in embodiments of the present invention, a moisture content of about 3% to 5% is expected. According to Dunning ("Unit Operations in a Mechanical Extraction Mill", JAOCS, Vol. 33, pp. 462-470, 1956), where horizontal cooker/drier is described: "the control of moisture in mechanical pressing is one of the most important operations in the mill". Dunning proposes the cooking of the meal (disintegrated raw material) at a minimum of 12% moisture content for approximately 20 minutes, and "drying of the meal is carried out at final temperatures of 118° C.-132° C., so that the dried meal ahead of the press are at approximately 3% moisture. In the case of copra [dried coconut meal] and sesame seeds the moisture content is preferably in the range of 2%". An unavoidable source of water is reaction-formed water in the esterification of FFA: R—COOH+EtOH→R—COO-Et+$H_2O$, where R, as mentioned above, is a hydrocarbon chain of 8 to 24 carbon atoms; and Et, from ethyl alcohol is $C_2H_5$—; and R—COO-Et is FAEE, that is, a fatty acid ethyl ester. Water is also formed whenever catalysts are neutralized through the chemical reaction $H_2SO_4+2KOH \rightarrow K_2SO_4+2H_2O$, that is, one mole of sulfuric acid reacts with two moles of potassium hydroxide to form one mole of potassium sulfate and two moles of water. Continuous and intermittent flash vaporization, mainly of ethanol and water, and ethanol dehydration through molecular sieves are preferably used to remedy water accumulation.

In a preferred embodiment, full solubilities with the maximum amount of water possible are used. To that end, temperature and pressure are used. To have full solubility of oils in ethanol in an environment with 12% (w/w) water, extrapolation of linear correlations shown by Rao et al. gives, for several oils and fats, the following temperature values: rapeseed, 150° C.; peanut and lard, 140° C.; sesame, 137° C.; olive, 136° C.; soybean and cottonseed, 135° C.; palm and sunflower, 132° C.; corn, 131° C.; tung, 129° C.; linseed, 111° C., babassu, 108° C.; coconut, 95° C. In the above sample of oils and fats, the full solubility temperature range is 95° C. to 150° C., with a weighted average of 129.4° C. and a standard deviation of 14.7° C., which is a standard deviation that is 11% of the average, which shows a small dispersion. Therefore, the main equipment preferably operates within the range of 110° C. up to 140° C., with the possibility of going up to 150° C. This range is capable to encompass the majority of the oils and fats of 500 origins as mentioned above, if not with full solubility at least with a good solubility, to be enhanced by the unconventional degree of mixing of heterogeneous mixtures. To keep ethanol in the liquid phase, the mechanically generated minimum pressure in the main equipment is preferably at least 16 atm.

To reach full solubility with the presence of water is a more difficult task in the intermediate, first, and second piston-cylinder reactors. As mentioned above, FFA and other polar glycerides are esterified with an acidic catalyst in these reactors. The preferred temperature range of 5° C. to 15° C. reflects this difficulty which arises from the following trade-off:

Since "likes dissolves likes", one needs a more polar ethanol, and, according to Lu et al., "ethanol is a compressible fluid exhibiting great tunability with temperature and pressure", or, "for liquid ethanol from ambient temperature to 225° C., the solvent strength is strongly temperature dependent and can be adjusted continuously with temperature". Although in Lu et al. the tests do not go below ambient temperature, the trend of the numbers show that "great tunability" and an increase in polarity with a decrease in ethanol's temperature.

Low temperatures, however, put the reacting mixture below the freezing points of many FFAs. Therefore, the trade-off is to find the best reaction temperature that allows the fastest esterification for each oil, considering that lower temperatures are good for ethanol polarity and bad for FFA melting points, considering also that the better the solvent, the more the freezing point of the solute is depressed.

Demirbas describes the relative content of fatty acids in a sample of 15 common vegetable oils, 13 of them being edible oils. Of the 19 predominant fatty acids, from C8:0 to C24:1, the sample of Demirbas contains 13 of them. Adding the percent participation of each acid from each oil and dividing by the total percentage, one gets the following relative frequency of occurrence of the fatty acids in the sample of Demirbas: caprylic (C8:0), 0.54%; lauric (C12:0), 3.00%; mystiric (C14:0), 1.32%; palmitic (C16:0), 11.39%; palmitoleic (C16:1), 0.15%; stearic (C18:0), 2.39%; oleic (C18:1), 37.83%; linoleic (C18:2), 31.34%; linolenic (C18:3), 5.72%; ricinoleic (C18:1), 6.02%; eleostearic (C18:3), 0.02%; behenic (C22:0), 0.18%; and lignoceric (C24:0), 1.30%. Using these percentages as weights, the weighted average freezing temperature of the sample is 14.5° C., which is between the freezing points of the two most common fatty acids of the sample: oleic acid, with a freezing point is 15.2° C., and linolenic acid, with a freezing point of −7.3° C.

The preferred vegetable oils in some embodiments of the present invention, however, are inedible and unusual oils. Azam et al. describes a larger sample of oils from plant species of India as mentioned above from "plants . . . which produce non-edible oil in appreciable quantity [oil content of fruit, kernel or seed above 30%] and can be grown in large scale on non-cropped marginal lands and wastelands". The original sample of 75 plant species was reduced to 67 by eliminating oils with unusual fatty acids not contained in our preceding 19 fatty acids table, of which only two fatty acids where not present in the 67 vegetable oils sample, as well as not considering the few percentages of "osa"="other saturated acid" or "uk"="unknown". Following the same procedure of the previous paragraph, the following relative frequency of occurrence is calculated: capric (C10:0), 0.16%; lauric (C12:0), 5.92%; mystiric (C14:0), 3.37%; palmitic (C16:0), 12.95%; palmitoleic (C16:1), 0.74%; stearic (C18:0), 9.74%; oleic (C18:1), 36.86%; linoleic (C18:2), 21.25%; linolenic (C18:3), 4.63%; ricinoleic (C18:1), 1.28%; eleostearic (C18:3), 1.24%; arachidic (C20:0), 1.42%; eicosenoic (C20:1), 0.14%; arachidonic (C20:4), 0.01%; behenic (C22: 0), 0.21%; euricic (C22:1), 0.03%; and lignoceric (C24:0), 0.06%.

The weighted average melting point (m.p.) of this sub-sample from Azam et al. was 25.5° C., 11° C. higher than the average temperature of edible oils sample of Demirbas. In a histogram of the percentages of the last paragraph, with growing C (carbon) numbers in the abscissa, a relative frequency distribution shows a strong skew to the left for the Azam sample, towards saturated fatty acids, such as lauric (C12:0) with a melting point of 45.8° C.; mystiric (C14:0), 58.0° C.; palmitic (C16:0), 63.0° C.; and stearic (C18:0), 70.5° C. To the right of the mode, the most frequent fatty acid in the Kingdom Plantae, the oleic acid (C18:1) with a melting point of 15.2° C., there are only three fatty acids whose melting points are below 0° C.: linoleic (C18:2), −7.3° C.; linolenic (C18:3), −11.0° C.; and arachidonic (C20:4), −49.5° C. One explanation of this melting point behavior is that saturated fatty acids have straight carbon chains with molecules capable of packing tightly together to enhance attractive van der Waals forces, making it more difficult to break apart. Higher temperatures augment molecular and ionic movements, which is reflected in the Brownian motion of particles, up to the point where saturated fatty acids melt, these movements surpassing the attraction van der Waals forces. Unsaturated fatty acids (with a number greater than zero after the colon in the above nomenclature, for example, C20:4 meaning four double bonds between carbon atoms, that are unsaturation points, in the carbon chain) have their straight carbon chain disrupted by each double bond, thereby loosening the tight package of the fatty acids molecules and, therefore, with a smaller effect of attraction Van der Walls forces. This is why arachidonic acid (C20:4), a very crooked molecule, has a melting point of −49.5° C.

Therefore, the melting points are strongly correlated to the straightness of the carbon chain of fatty acids, and the resulting tightness of their spatial arrangements. Perhaps that is also why the weighted average melting points of the fatty acids in a specific vegetable oil is higher than the actual effective melting point of that oil. For example, the weighted average m.p. of soybean oil is [0.139×63.0+0.3×33.0+2.1× 70.5+23.2×15.2+56.2×(−7.3)+4.3×(−11.0)]/100=14.1° C., but the effective m.p. is −12 ° C. Anyway, taking a sub-sample of Demirbas, the correlation coefficient between calculated m.p. (by weighted average) and effective m.p. of 11 vegetable oils was 0.917. It was also noticeable that the larger the percentage of fatty acids with straight molecules, the smaller the difference between the calculated and the effective m.p. temperatures, e.g., palm oil (42.6% of C16:0 and 4.4% of C18:0) and coconut oil (8.0% of C8:0, 44.6% of 12:0, 16.8% of C14:0 and 8.2% of C16:0) and vice-versa, the larger the percentage of crooked molecules the greater this difference, e.g. soybean 23.2% of C18:1 and 56.2% of C18:2 or olive oil with 74.7% of C18:1 and 17.6% of C18:2.

A temperature reflecting a good trade-off between FFA melting point and ethanol polarity, for each original raw material is expected to be found in the stated range of 5° C. to 15° C. Some exploratory tests have been made with the more frequent fatty acid (oleic, C18:1) and those more frequent with high m.p. of the sub-sample of Demirbas: lauric, C12:0, m.p. 45.8° C.; mystiric, C14:0, m.p. 58° C.; palmitic, C16:0, m.p. 63° C.; and stearic, C18:0, m.p. 70.5° C. This is quite important for the feasibility of the preferred processes of the present invention, because FFA contents for the third and final piston-cylinder reactor should be below 0.5% (w/w) of FFA/ total oil, as described in the next three paragraphs.

As described above, one of the nine discussed variables affecting esterification and transesterification chemical reactions is FFA content. Concerning reaction time, FFA presence above 0.5% (w/w) of FFA/total oil in basic-catalyzed trans-esterifications leads to soapstock (R-COOK) and water formation as described above. This soapstock mixes with water in the process to form emulsions that interact with the other main substances present (biodiesel, glycerides, ethanol and glycerol), which increases the viscosity and leads to formation of gels and foams that raise mass transfer constraints and limit reaction speeds. Additionally as mentioned above, after reaction completion, these gels and foams make the separation of biodiesel from the other substances mentioned difficult, either by decantation or centrifugation, thereby diminishing total yield.

Regarding yield maximization (see FIG. 1), Friedrich states: ". . . it is therefore crucial to transfer any potential molecule into a fatty-acid-methyl-ester; this includes triglycerides and Free-Fatty-Acids". Moreover, for reasons that are now becoming clearer, including increases in food prices, some embodiment of the present invention preferably use presently discarded or underutilized raw materials and a large range of non-traditional raw material, mainly inedible or less edible oils, in contrast to current biodiesel commercial production practice, which uses refined soybean, rapeseed, palm oils, and sunflower oil.

In summary, the importance of using original raw materials with 0.5% to 80.0% (w/w) of FFA/total oil, through acid-catalyzed esterification has been explained with respect to embodiments of the present invention, the presence of FFA in the original raw materials used, rancidity formation, the origin of FFA, alternatives to deal with FFA, flexibility and high capital costs in equipments and instrumentation/automation, yields and FFA typical elimination in small scale biodiesel production, why hexane does not extract FFA, and the use of hot acidic ethanol mainly in extraction/transesterification, cold acidic ethanol in esterification, and hot ethanol in basic-catalyzed transesterification.

Up to this point, water has be discussed primarily as a restriction to reaction speed, as a reducer of oils and fats solubilities in ethanol-water solutions at different temperatures, for its role of water in soapstocks emulsions, and in terms of water elimination by flash vaporization. Zhang et al. states that "water can hydrolyze the ester products, producing [back] FFA". Lotero et al. states: "Ester production was affected by as little as 0.1% wt water concentration and was almost totally inhibited when the water level reached 5% wt. . . . Water concentration was more critical in acid catalysis than in base catalysis". According to Lotero et al., this happens because of catalyst deactivation: the attraction of water molecules by sulfuric acid become stronger than the attraction between sulfuric acid and ethanol molecules such that water surrounds the catalyst to deactivate it through "the interaction of water with the cation of the catalyst which decrease their acid strength", according to Demirbas. That is one of the reasons why the amount of catalyst in the second and third reactors in a preferred embodiment of the present invention is greater than the one proposed by the prior art, namely 4.3% to 5.2% (w/w) of sulfuric acid/ethanol rather than 1.6% to 4.9% (w/w).

Particularly in the intermediate (second or third) reactors, where the larger part of FFA acidic esterification occurs, the liquid water content is preferably kept below 0.5% (w/w) by flash vaporization. The deleterious effect of water was known at least as early as 1950, when U.S. Pat. No. 2,494,366, entitled "Production of Fatty Esters" and issued Jan. 10, 1950 to Sprules et al., stated: "The equilibria involved in the esterification steps can be favorably shifted by the continuous removal of the water formed". This removal is preferably continuous only in the main equipment in some embodiments of the present invention; in the other three reactors it is preferably intermittent.

The last variable to be described, among those that influence residence time, is agitation rate. Agitation may be used to circumvent mass transfer constraints in liquid mixture reacting systems. This mass transfer constraint comes from size limitation in surface contact areas. For example, two immiscible liquids like vegetable oil and water tend to form two layers separated by a contact surface when at rest; when mixed, these layers divide themselves in drops or droplets depending on the intensity and duration of the agitation. The smaller the droplets of water and oil in the mixture, the greater the contact surface area and smaller the mass transfer constraint between the phases. Typical equipment to agitate mixtures in reaction vessels includes rotating impellers, either blades or propeller, which establish a fluid flow in the vessel. One indirect indicator of the size of the surface contact area is the Reynolds number (Re), a measure of the ratio between inertial forces and viscous forces that is used to identify and predict different flow regimes: laminar flow occurs at low Re, where viscous forces are dominant, and is characterized by smooth, constant fluid motion. Turbulent flow occurs at high Re and is dominated by inertial forces, which tend to produce random eddies, vortices, and other flow fluctuations. Naturally, the more turbulent the flow is, the greater the surface contact area. The Reynolds number is a function of the fluid mean velocity (e.g., m/s), the geometry of the vessel or tube containing the fluid (measured as a characteristic diameter, e.g., m), the absolute dynamic fluid viscosity (e.g., Pa-s), the kinematic fluid viscosity (e.g., $m^2/s$), and the density of the fluid (e.g., $kg/m^3$).

In summary, the higher the Re number, which depends on the characteristic diameter and other variables, the more turbulent the flow is and the bigger the surface contact area is. That is why U.S. Patent Application Publication No. 2003/0032826, entitled "Transesterification process for production of biodiesel" by Hanna and published Feb. 13, 2003, states: "The feed stream into which the alcohol is introduced is characterized as having a Reynolds number of at least about 2,100". Hanna discloses four mixing/reaction zones preceded by Venturi injectors where alcohol and catalyst are injected. In the middle of a Venturi tube, the cross-sectional area is smaller, and according to a simplified expression of Bernoulli's principle $p+q=p_0$, that is, along an incompressible fluid flow line, the total pressure $p_0$ is constant (conservation of energy) and equals the sum of the static pressure p and the dynamic pressure $q=r_0 \times v^2/2$, where $r_0$ is the fluid density and v its velocity. Therefore, depending on $p_0$, according to one of Hanna's embodiment, the velocity in the middle of the Venturi tube is such that Re lies between 2,100 and 4,000, conditions under which the alcohol and the catalyst to be dispersed into the flow of the reaction mass in the form of fine droplets: "These fine droplets allow for the improved mixing associated with the present invention, as the alcohol and the catalyst can be substantially evenly distributed throughout the reaction mass, to provide a large interfacial reaction area, which results in an increased reaction rate and improved overall conversion efficiency".

A considerable number of patents and patent applications attempt to create this "large interfacial reaction area" establishing turbulent flow and pressure waves. For example, U.S. Pat. No. 6,440,057 and U.S. Pat. No. 7,045,100, both entitled "Method for producing fatty acid methyl ester and equipment for realizing the same" and issued Aug. 27, 2002 and May 16, 2006, respectively, to Ergun et al., disclose "emulsifying the mixture to reach a chemical balance state in a reaction section . . . . Wherein border surfaces of the mixture are enlarged by dynamic turbulence in the reaction section and the transesterification is performed under pressure". The fluid is pumped at approximately 200 atm and introduced in two types of reaction chambers: (1) "a static mixer made of a pipe 13 filled with balls of various sizes 14. The pipe 13 may be fitted with additional devices such as baffles, blades, etc."; (2) "a dynamic emulsifier 25, in this case made of a coiled pipe 26 filled with balls of various sizes . . . . The emulsifier 25 swirls the liquid to be transesterified from triple ester to single ester by means of high or powerful turbulence".

U.S. Patent Application Publication No. 2007/0175092, entitled "Continuous Flow Biodiesel Processor" by Ames and published Aug. 2, 2007, proposes "a continuous biodiesel processor utilizing high turbulence mixing of the oil being processed and a flow-through separation tank" with several geometries. U.S. Patent Application Publication No. 2007/0196250, entitled "Apparatus and Method for Continuous Production of Biodiesel Fuel" by Leveson et al. and published Aug. 23, 2007, describes that the flow "enters the homogenizer (200) preferably an inline homogenizer. The two phases are exposed to extreme shearing force, within the homogenization device, to extend the area of contact. Often the homogenization device will utilize a workhead consisting of a rotor and a stator, although other may be used to form the emulsion". To enhance a turbulent flow, these devices rely on the flow's velocity vector, either increasing its magnitude and, therefore the Re, and/or on an abrupt change of its direction, which detaches the boundary layer from surfaces, amidst which the liquid flow happens.

Whenever the flow velocity makes the dynamic pressure (q), which is proportional to the square of the magnitude of the velocity vector, to grow to be much larger than the static pressure (p), a discontinuity in the flow may occur when p is smaller than the vapor pressure at the prevailing temperature, causing vaporization with bubble formation. When these bubbles, dragged by the liquid, reach flow regions with lower velocities and, therefore, static pressures above the vapor pressure, they abruptly collapse, producing shock waves that enhance microdroplet formation. U.S. Pat. No. 5,188,090 and U.S. Pat. No. 5,385,298, both entitled "Apparatus for Heating Fluids" and issued Feb. 23, 1993 and Jan. 31, 1995, respectively, to Griggs, disclose "devices for heating fluids. The devices employ a cylindrical rotor which features surface irregularities". These devices evolved to those of U.S. Pat. No. 6,627,784, entitled "Highly efficient method of mixing dissimilar fluids using mechanically induced cavitation" and issued Sep. 30, 2003 to Hudson et al., and U.S. Pat. No. 7,360,755, entitled "Cavitation device with balanced hydrostatic pressure" and issued Apr. 22, 2008 to Hudson et al., both to the same assignee as the Griggs patents (Hydro Dynamics, Inc., Rome, USA), both patents in their abstracts, referring to "The cavitation also breaks down van der Waals attractions within the mixture to enhance mixing".

The devices referred to by the four patents of the previous paragraph became processes and products with apparently good commercial success, as described by Hydro Dynamics, Inc.:

"Founded in 1991, Georgia-based Hydro Dynamics, Inc. has pioneered an innovative new next generation technology called ShockWave Power™. The patented technology offers breakthrough benefits for the heating of liquids without scale buildup and/or the mixing of liquids with other liquids, gases or solids at the microscopic level to increase the efficiency of the reaction. . . . Inside the SPR [ShockWave Power™ Reactor] there is a spinning rotor producing millions of microscopic cavitation bubbles. When these bubbles collapse and produce shockwaves, powerful forces are generated that cut up the process material in microscopic sizes. This increases the surface contact area between the liquids".

Hydro Dynamics, Inc., has a product line (10 pieces of equipment) for biodiesel with throughputs in the range of 1 million gallons/year (GPY) with 4 hp installed to 150 million GPY with 600 hp installed.

Regarding the cavitation phenomenon, it may be inertial, transient cavitation or non-inertial cavitation. Inertial cavitation, derived from the v vector (fluid velocity), has already being described. Non-inertial cavitation is the process in which a bubble in a fluid is forced to oscillate in size or shape due to some form of energy input, such as an acoustic field. Such is the case for U.S. Patent Application Publication No. 2005/0027137, entitled "Apparatus and method for the production of fatty acid alkyl ester" by Hooker and published Feb. 3, 2005, whose abstract states: "The transesterification occurs when the natural boundary surfaces of the immiscible mixture are enlarged by ultrasonic cavitation in at, or near atmospheric pressure".

In a preferred embodiment of the present invention, the process and equipment induce mechanically-generated non-inertial/inertial cavitation. It is considered non-inertial/inertial because it is non-inertial without the need for preexistent bubbles and inertial without the need of fluid velocity variations. Briefly, in the piston-cylinder chemical reactor, alternate piston movements enlarge the volume occupied by the mixture and reduce its pressure below the vapor pressure points to form micro-bubbles that, during the reverse piston movement that decreases the volume and restores the pressure, collapse, thereby forming shockwaves.

In a preferred embodiment of the present invention, the processes and apparatus surpass unavoidable solvency constraints and achieve reduced reaction times, because they appeal to unusual agitation regimes. In the main equipment, namely the acid-enhanced solvency and expression-based extractor and in situ reactor, there are two agitators including one SPR™ agitator in the recirculation and flash vaporization of the liquid feedback loop and a highly turbulent flow inside the main body of the in situ reactor. The two intermediate reactors and the final reactor are of a piston-cylinder type and generate shockwaves as described above.

Kelkar et al. ("Intensification of esterification of acids for synthesis of biodiesel using acoustic and hydrodynamic cavitation", *Ultrasonics Sonochemistry*, Vol. 15, pp. 188-194, 2008) states: ". . . Preliminary studies with virgin [refined] vegetable oil (sunflower and palm oil) indicated that the conventional approach to stirring is about 10 times slower as compared to acoustic and hydrodynamic cavitation", and: "To cite a specific illustration as regards to the degree of process intensification achieved in the present work: with an operating ratio of FA ["odor"] cut [8 "Cs" and 10 "Cs"] (waste fatty acids) to methanol as 1:10, 1% by weight loading of the catalyst [conc. sulf. acid] and at operating temperature of 30° C., 92% conversion (mol %) was achieved using hydrodynamic cavitation in only 90 min. of reaction time whereas conventional methods [10], [11] for the esterification of waste cooking oil using methanol under stirring conditions required 69 h to obtain more than 90% oil conversion to methyl esters at 65° C. operating temperature and a molar ratio of methanol to oil as 30:1". The conclusion about energy efficiency of hydrodynamic versus acoustic cavitation is as follows: "It can be seen from the calculations [based on calorimetric studies] that the hydrodynamic cavitation reactor is order of magnitude [between 10 and 100] more energy efficient as compared to the acoustic cavitation reactor".

Regarding the three 8 hour shifts per day year-round operation of FIG. 1, there are at least 500 preferred plant species that may supply original raw material, mainly in the form of inedible or less-edible vegetable oil, of which the great majority is of semi-domesticated and wild plants, which are exploited in an extractive way in tropical and semi-tropical climates where they predominate, and where abound poor rural dwellers, such as in India, Bangladesh, Myanmar (Burma), Malaysia, Indonesia, China, Africa, and parts of Brazil and Latin America. This low cost labor is important for the economic feasibility in some embodiments of the present invention, because the harvest/gathering of this kind of original raw material is very labor intensive. Flexible operation is important to process this diversity of original raw materials and, also, to enhance installed capacity utilization and, therefore, to diminish unit capital costs burden.

An important part of that flexibility, linked to harvesting/gathering original raw material from these 500 plant species, is the ability of some embodiments of the processes to deal with several levels of FFA contents in that raw material. For example, the rice bran mentioned above may have anywhere in the range of 10% to 80% (w/w) of FFA in total oil; tobacco seed oil may have 10% to 30% of FFA/total oil; and *Hevea brasiliensis* seed oil may have 15% to 25% (w/w) of FFA/total oil. To move from the acid esterification catalysis of FFA to basic transesterification catalysis of glycerides, the amount of FFA not esterified is preferably less than 0.5% (w/w) of FFA/total oil. That is expensive and not easy to achieve within economical residence times; which is why the large capacity conventional commercial biodiesel plants use refined oils, perhaps wastefully discarding the FFA source of monoalkyl esters of long chain fatty acids (biodiesel).

As previously mentioned, to use this source of biodiesel is expensive in energy costs and mainly capital costs. For example, with original raw materials with less than 5% (w/w) of FFA/total oil, the intermediate reactors may not be used, because increasing the residence time in the main equipment, depending on the amount of co-solvents formed, may generate a mixture with less than 0.5% (w/w) of FFA/total oil and less than 0.5% (w/w) of water/total mixture. In such circumstances, that mixture could go directly to the fourth (and last) reactor for basic transesterification and, therefore, the middle reactors would be idle but its capital cost burden alive. This is the same difficulty found in establishing the capacity to various original raw materials. But, as mentioned above, this capacity is important to facilitate year-round 24 hours daily operation and to intensify the diffusion of the intended processes and apparatus.

As stated previously, this difficulty is preferably addressed with investment in instrumentation and automation, i.e. increased capital costs, inclusive to make flexible programming and control feasible for non-specialists. As mentioned above, in some embodiments the processes and apparatus are preferably used mainly, for example, in India, Bangladesh, Myanmar, Malaysia, China, Africa, and parts of Brazil and Latin America. The labor supply and the employment level in agriculture, as a percentage of total employment, in these countries/regions is favorable: India, 67%; Bangladesh, 52%; Myanmar, 63%; Malaysia, 15%; Indonesia, 44%; China, 44%; Africa (e.g., Namibia, 31%; Kenya, 19%; Uganda, 69%; Rwanda, 90%); Brazil, 21%; Latin America (e.g., Mexico, 15%; Colombia, 22%; Paraguay, 32%). Also, human capital, mainly in rural areas, is scarce in these countries. For example, the current adult illiteracy rate (% aged 15 and older stratum) is: India, 39.0%; Bangladesh, 52.5%; Myanmar, 10.1%; Malaysia, 15%; Indonesia, 9.6%; China, 9.1%; Africa (e.g., Namibia, 15%; Kenya, 19%; Uganda, 33.2%; Rwanda, 35.1%); Brazil, 11.4%; Latin America (e.g., Mexico, 8.4%; Colombia, 7.2%; Paraguay, 6.5%). Plain literacy is not sufficient for operation of some embodiments of processes and apparatus of the present invention. To operate the processes and apparatus preferably requires functional literacy, that is, at least the capacity to understand and follow written instructions. Functional literacy is defined by UNESCO (United Nations Education, Scientific and Cultural Organization) as: "A person is functionally literate who can engage in all those activities in which literacy is required for effective function of his or her [e.g., to operate biodiesel plants] group and community and also for enabling him or her to continue to use reading, writing and calculation for his or her own and the community's development". Functional literacy levels are typically very distant from common literacy levels throughout the world; for example, in Brazil, 70% of functional illiterate versus the before mentioned 11.4% of the same population stratum; Australia, that ranks third in the HDI (Human Development Index), the equivalent percentages are 17.0% versus 1.0%; in the USA, ranked 12 in the HDI, 20.0% versus 1.0%; in the UK ranked 16, 21.8% versus 1.0 and, in Italy, with HDI =20, 47.0% versus 1.6%.

Mainly in backward rural areas of the above-mentioned countries and regions, less available functionally literate human capital is preferably replaced by physical capital, that is, to change less available trainable human workers by microprocessors, with the hope that with the increase in cash income in these human capital-deprived communities, functional literacy levels will also increase. Almost all the above-mentioned countries and regions have the needed specialized labor (agronomists; forest engineers; chemists; chemical, mechanical, instrumentation engineers, etc.) living in their cities. It is reasonable to expect that they would be attracted to temporary assignments in the rural areas of their countries for the assembly and start-up of new plants, as well as to experimentally determine the best operational parameters for novel original raw materials, to be then programmed and controlled by microprocessors. The oral training of operational and maintenance personnel, mainly in security procedures, is indispensable. For example, no pressurized/heated ethanol should be injected in the main equipment before the minimum 16 atm of mechanically generated pressure is established and the air evacuated. Although this may be controlled by microprocessors, no operator should override this control. Another example would be procedures to be followed by operators if the system alarm indicating dangerous ethanol/air mixtures goes off.

The final ellipse of FIG. 1 to be discussed is the relatively large energy and capital costs. Although this may seem to be an unusual choice, it does not jeopardize the goal in the central ellipse of FIG. 1: small scale biodiesel production feasible with oil prices above US$60 per petroleum barrel. Agricultural raw material costs for industrial processing usually amounts from 60% to 80% of products' total costs. In conventional processes, vegetable oil seed procurement, transport, storage, and oil extraction accounts for at least 75% of the total cost of producing biodiesel. On the other side, capital costs are usually in the range of 5% to 10%, depending basically of production scales. Therefore, the clear tradeoff to circumvent the US$ 60/petroleum barrel is between original raw material total costs (procurement, transport, and storage) and byproducts net value against relatively increased capital costs.

The "activity map" of FIG. 1 represents a strategic position in a business. Inside the ellipsis are the choices made about how to do things. This diagram shows how these choices differ from traditional ones, that is, the degree of innovativeness of the positioning. The main choices are shaded in gray. The double-pointed arrow lines linking two activities shows expected positive synergy among them. The amount of this synergy is called "fit", and the sustainability of the competitive advantages gained by the positioning depends on the fit among activities. The choices made for FIG. 1 have been presented above. Further details, as needed, are added in the description of the processes and apparatus below.

Figure 2A:
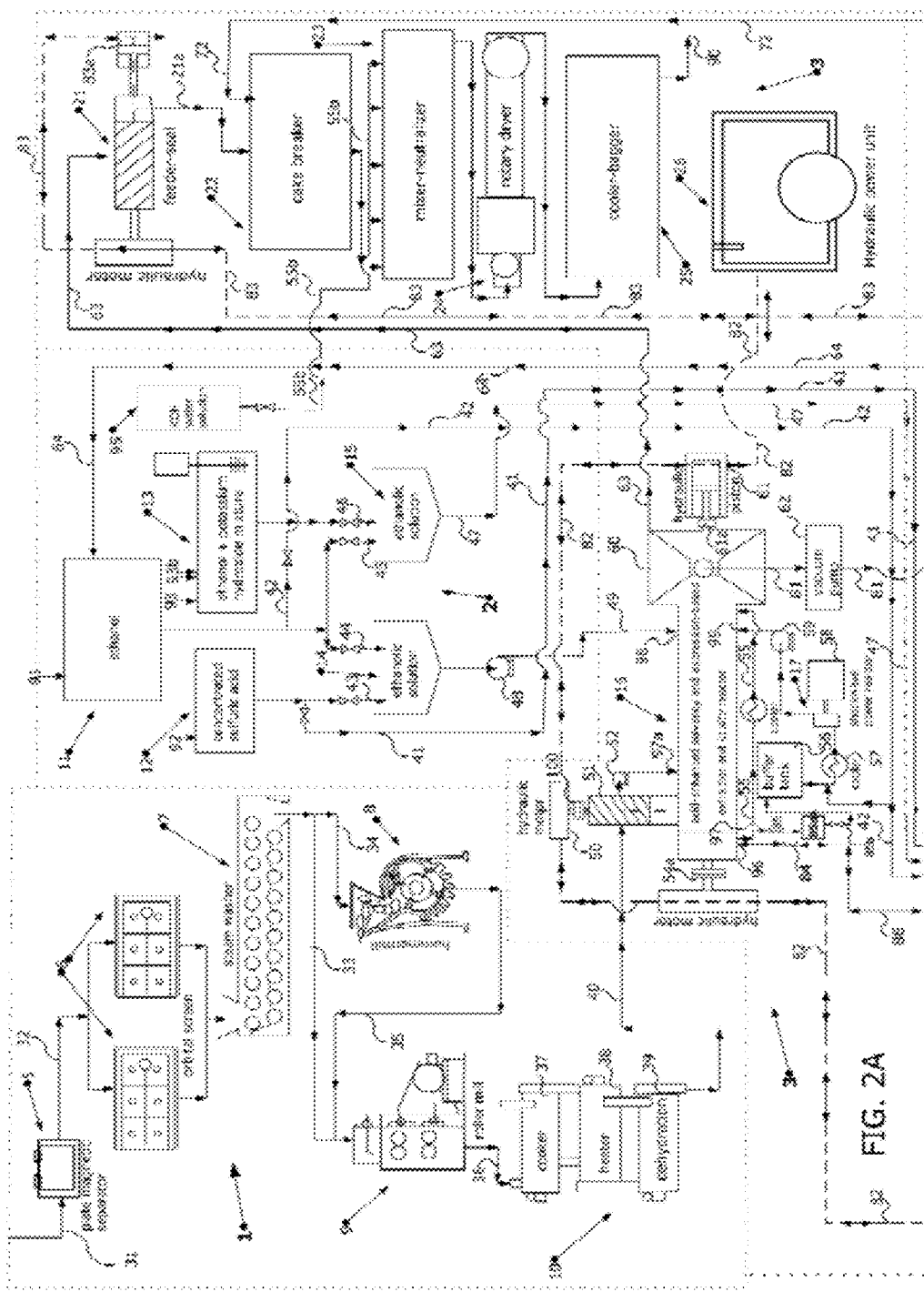
FIG. 2A shows a first half of a flow diagram of the processes and apparatus of a biodiesel production plant in an embodiment of the present invention.
Figure 2B:
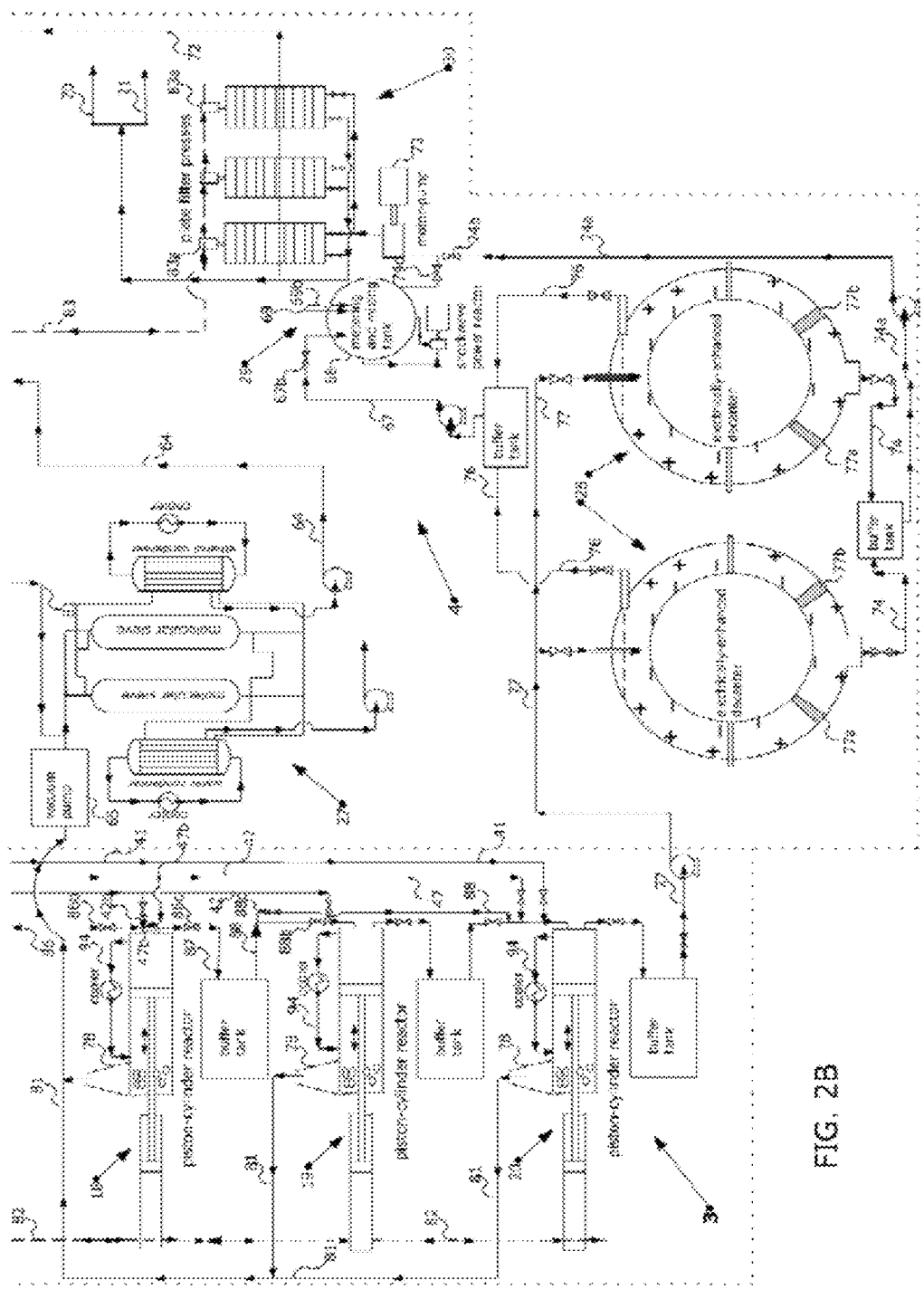
FIG. 2B shows a second half of the flow diagram of FIG. 2A.

FIG. 2A and FIG. 2B schematically show the processes and apparatus that composes the integral plant. The whole system of FIG. 2 was divided into four subsystems by dotted lines that are indicated by bold typeface numerals leaded by a bold straight line with an arrow point. The equipment is referenced in the same way without the bold nature and in a smaller font. The process flow and minor gears are referenced by numerals leaded by curved lines. Although the major apparatus have names attached to them, they are also described by their reference numbers. The original raw materials and other inputs enter the system in the left and center top part of FIG. 2A, and the product and byproducts leave the system in the top-right part of FIG. 2B and the right-bottom of FIG. 2A.

Figure 3:
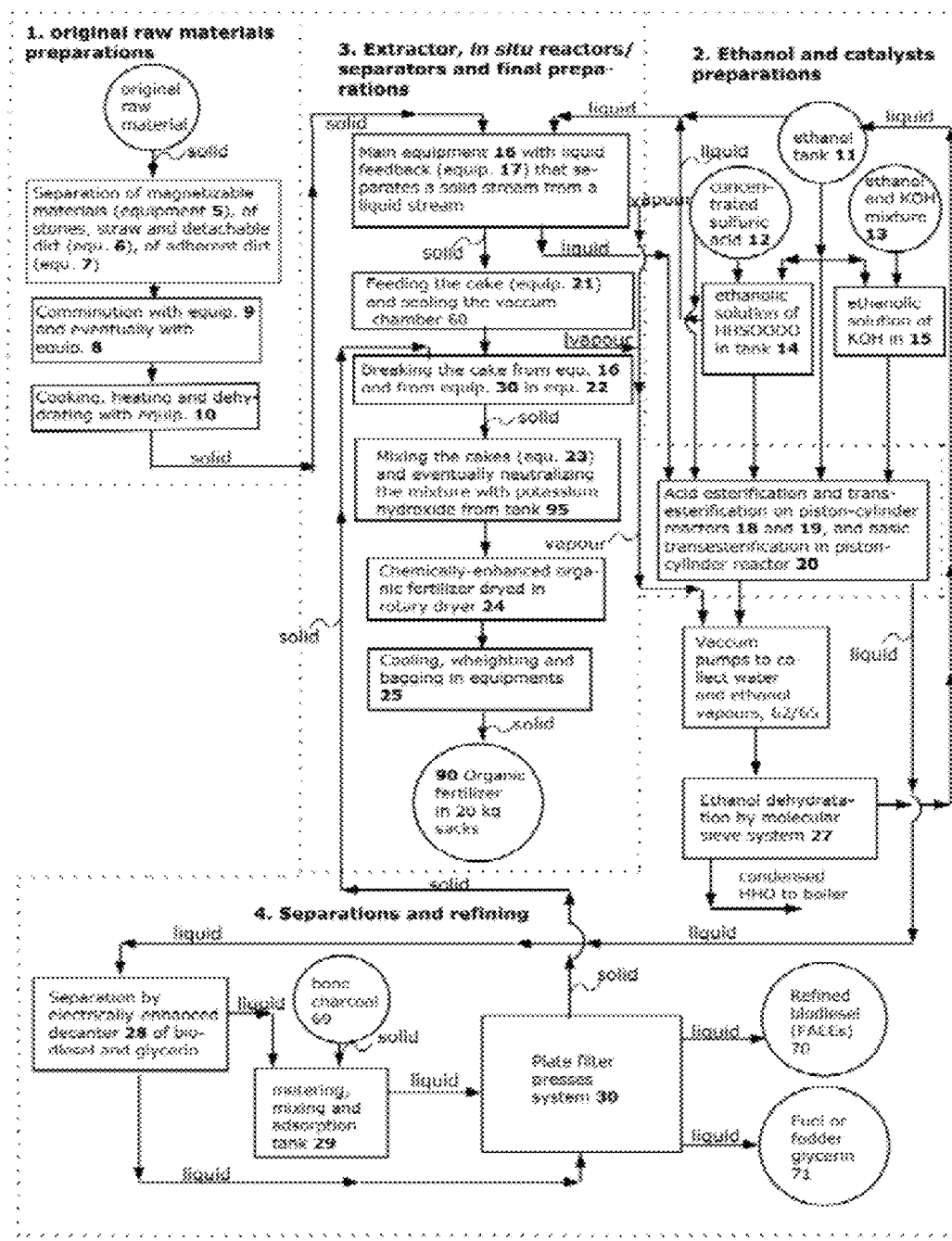
FIG. 3 shows a block diagram summary of the flow diagram of FIGS. 2A and 2B.

FIG. 3 is block diagram summary of the preferred process used with the apparatus of FIGS. 2A and 2B structured in the four subsystems mentioned. Besides the flow lines directions, nominating solid, liquid, and vapor, FIG. 3 presents mainly reference numbers, in bold typeface, of apparatus.

An overview of a preferred embodiment of the process is presented in FIG. 3, in which the total system is divided in four subsystems: 1) original raw materials preparations, 2) ethanol and catalysts preparations, 3) extractor, in situ reactors/separators, and final preparations, and 4) separation and refining.

Original raw material preparations start with the input of original raw material. Magnetizable impurities are separated by a magnetic plate 5. Stones, straw, and detachable dirt is separated by orbital screens 6. Adherent dirt is steam-washed in a steam washer 7. Depending on the hardness and size of stones and shells (e.g., macadamia, babassu and whole avocados fruits), the original raw material is either first disintegrated in a hammer mill 8 followed by treatment in a roller mill 9, or if the fruits are relatively soft and small, the raw material goes directly to the roller mill 9. After that, the comminuted material is cooked, heated, and dehydrated in a unit 10 including a cooker 37, a heater 38, and a dehydrator 39. The prepared raw material then goes to the extractor, in situ reactors/separators, and final preparations subsystem, the main equipment of the apparatus, where it is combined with bioethanol and acid catalyst that come from the ethanol and catalysts preparations subsystem.

The ethanol and catalyst preparations subsystem receives inputs from three tanks: a concentrated sulfuric acid tank 12, an anhydrous ethanol tank 11, and a potassium hydroxide/ethanol tank 13. Tanks 11 and 12 provide the inputs to prepare an ethanol solution of $H_2SO_4$ stored in a sulfuric acid/ethanol tank 14, which feeds the acid-enhanced solvency and expression-based extractor and in situ reactor 16 of the extractor, in situ reactors/separators, and final preparations subsystem. Tanks 11 and 14 also provide inputs to the piston-cylinder reactors 18 and 19, where acid esterification and transesterification occurs. Tanks 11 and 15 provide inputs for the basic transesterification in the piston-cylinder reactor 20, as well as basic catalyst neutralization with input from tank 12. The piston-cylinders 18, 19, 20 are part of the extractor, in situ reactors/separators, and final preparations subsystem, as shown by the dotted lines of FIG. 3.

As already mentioned, the extractor, in situ reactors/separators, and final preparation subsystem starts with the acid-enhanced solvency and expression-based extractor and in situ reactor 16, fed by the cooker/heater/dehydrator unit 10 of the original raw materials preparations subsystem and tanks 11 and 14 of the ethanol and catalysts preparations subsystem. This equipment separates a solid matter stream from a liquid matter stream. The solid stream exits the screw through a gear 21 that belongs to a vacuum chamber 60, sealed from outside atmosphere by the pressure developed by the exit screw 21. The produced cake from the exit screw is joined in a cake breaker 22 by a cake from the filter press 30 coming from the separation and refining subsystem, in the cake breaker 22 both cakes are disintegrated; after that, the solid matter flow goes to a mixer-neutralizer 23, where they are mixed and eventually neutralized with a water solution of KOH that comes from a KOH/water tank 95 (only shown on FIG. 2A). That neutralized mixture of cakes is a chemically-enhanced organic fertilizer product that is dried in a rotary dryer 24, and cooled, weighted, and bagged in a cooler-bagger 25; these bags preferably leave the system in 20-kg sacks provided by exit point 90. The main equipment (the acid-enhanced solvency and expression-based extractor and in situ reactor) 16 has two spots where flash evaporation takes place, in the feedback liquid stream 17 and in the vacuum chamber 60, where solid matter is discharged. Ethanol and water vapor goes to a vacuum pump 62 in the separation and refining subsystem.

The separation and refining subsystem includes the vacuum pump 62 already mentioned and a second vacuum pump 65 that receives water and ethanol vapors from the piston-cylinders 18, 19, 20 of the extractor, in situ reactors/separators, and final preparations subsystem. Ethanol is dehydrated in a molecular sieve system 27 and sent to tank 11 in the ethanol and catalysts preparation subsystem, and the condensed water is sent to a boiler. The liquid stream from the piston-cylinder 20, mainly biodiesel, glycerol, and $K_2SO_4$ salt, is sent to an electrically-enhanced decanter 28. The biodiesel stream separated by decantation is sent to a metering/mixing/adsorption tank 29 to remove impurities, glycerin, and potassium sulfate salt. The impurities are sent directly to the filter press system 30; these filters also retain the bone charcoal adsorbent 69 metered and mixed in the metering and mixing apparatus 29. The product, biodiesel (FAEEs), leaves the pressure filters and the system through exit point 70, and a byproduct, fuel or fodder glycerin, does the same through exit point 71.

Referring now to FIG. 2A, original raw material is input 31 into the system. The original raw material may include a wide variety of solid matter that contains liquid matter and solid matter where the desired oils, fats, and waxes are. It is important to make trade-offs in the definition of an innovative strategic positioning. In this case, wasted and recycled cooking oils are preferably not chosen as raw materials, because they are liquids at room temperature. Although an actually important source of raw material to be processed by this apparatus, this oil is mixed with a solid material (e.g. saw dust) before entering the acid-enhanced solvency and expression-based extractor and in situ reactor 16 or, in a preferable way, to start processing in the piston-cylinder reactors.

As mentioned above, preferred sources of original raw materials are farmer's grown domesticated and semi-domesticated plants, extractive activities of plants growing in the wild, and agricultural and agribusiness units with useful residues or under-valued byproducts. As mentioned above, the capacity to process various original raw materials and mixtures of them is preferably built into the acid-enhanced solvency and expression-based extractor and in situ reactor.

The use of an extensive range of original raw materials implies being able to process a wide range of FFA contents, potentially without losing a single molecule of them. "Original" raw materials means not only flesh, seeds, or kernels containing oils, but also whatever part of the plant (e.g., shells) that contains lipids economically transformable in mono alkyl esters of ethanol. A summary of the importance of using originals raw materials from 0.5% (w/w) to 80.0% (w/w) of FFA/total oils is provided above.

Returning to FIG. 2A, the next process step submits the layer of original raw material being moved by a conveyor belt to the action of a magnetic plate separator to remove unwanted ferrous metals and protect the downstream apparatus from damage. This is done in a plate magnetic separator 5, similar to those marketed by ERIEZ Manufacturing Co. (Erie, Pa., USA).

The resulting stream flows by a conduit 32 to one or more orbital screen separators 6 for separation of stones, straw, detachable dirt, etc. The orbital screen separator may be one such as those marketed by Desmet Ballestra North America, Inc., (Marietta, Ga., USA). In a preferred embodiment, two separators are chosen to minimize sieve set changes due to the diversity of original raw materials.

The resulting stream is sent to a steam washer 7 designed to remove adherent dirt and other impurities. In some embodiments, a custom-made steam washer is designed and built for the process. The schematic circles on the steam washer 7 of FIG. 2A are transversal cuts of brushes, the bottom row of brushes turning in one direction (e.g., clockwise) and the upper row of brushes, preferably height-adjustable in relation to the bottom row due to the diversity of raw materials sizes, turning in the same direction (e.g., clockwise), but at a slower speed than the bottom row. These speeds are preferably variably adjustable (e.g., with hydraulic motors) and adjustable to determine the translation speed of the rotating raw material. Steam preferably comes from nozzles installed in a middle portion between the brushes of the upper row. Steam and condensate water preferably exit the device out the bottom. To diminish the escape of steam from the entrance and exit portholes, high velocity air curtains may be used.

A primary purpose of the orbital screen separator 6 and steam washer 7 is to avoid sand (mainly $SiO_2$) getting into the downstream apparatus to minimize abrasion.

The exit stream from the steam washer 7 may flow by a conduit 34 to a hammer mill 8 and then flow by a conduit 35 to a roller mill 9 or alternatively may flow by a conduit 33 directly to the roller mill 9. The hammer mill 8 is preferably used with original raw materials that have very hard components, such as babassu fruits or whole avocados, that is, materials with hard stones or shells. In some embodiments, the hammer mill is model HM 44 of CPM-Roskamp Champion (Waterloo, Iowa, USA). After this first disintegration, the solid matter stream goes to the roller mill 9. If the original raw material is relatively soft and small it leaves the steam washer by a conduit 33, going directly to the roller mill 9. The roller mill preferably includes two pairs of rolls, such as model DPRM-1000-1200-36 from CPM-Roskamp Champion.

A conduit 36 links the roller mill with a cooker/heater/dehydrator 10. In a preferred embodiment, the cooker/heater/dehydrator is model AN-182 from Anderson International Corp. (Stow, Ohio, USA).

As shown in FIG. 2A, the stream of dehydrated meal is carried by a conduit 40 to the admittance screw 51 of the main equipment, an acid-enhanced solvency and expression-based extractor and in situ reactor 16, also called "the screw". This forced feeding screw 51 is attached to a variable rotation hydraulic motor 50 by a coupling 100. This feeding is "forced" because, as will be seen, the screw 51 has a decreasing pitch and the main body of the acid-enhanced solvency and expression-based extractor and in situ reactor 16, during normal operation, where screw 51 intersects it, is full of solid and liquid matter. Being forced, this feeding generates a counter-current of liquid, which is collected in the bottom of the carcass of the screw 51 and sent by a pump 52 to the porthole 97*a* of the screw.

The screw of the acid-enhanced solvency and expression-based extractor and in situ reactor 16 preferably has an almost continuously decreasing pitch that develops an increasing pressure in the solid matter, which is transported preferably linearly and longitudinally along the axis of the screw. Otherwise, the liquid matter flow follows the decreasing solid matter's pressure gradient, that is, from the end of the screw to its beginning. The path of the liquid matter, in contrast to the solid matter, has a helicoid form along the space between the threads of the screw. That is why the solid matter leaves the screw through exit 63 and the liquid matter is recirculated by exit 97 and readmitted in the screw at the entrance point 99. The other exit porthole for filtered liquid matter is the exit/entrance point 96, which is also an entrance point because the first piston-cylinder reactor 18 (see FIG. 2B) sends pressure waves backwards to clean the ceramic membrane filters of clogging foots, as explained below.

The screw 16 is preferably linked to a variable speed hydraulic motor by a flange 54*a*. A choke 117 (see FIG. 5A) at the discharge of the solid matter is adjusted to increase or to decrease solid matter's pressure by a hydraulic piston 61 linked to the choke by a flange 61*a*. The discharged solid matter experiences a flash vaporization in a vacuum chamber 60, while the water and ethanol vapors leave the screw by a conduit 81 to a vacuum pump 62. The solid matter, free of ethanol, leaves at the bottom of the vacuum chamber 60 through a feeder-seal screw 21 rotated by a variable speed hydraulic motor and whose choke is moved by a hydraulic piston 83*a* (see FIG. 2A).

Figure 6:
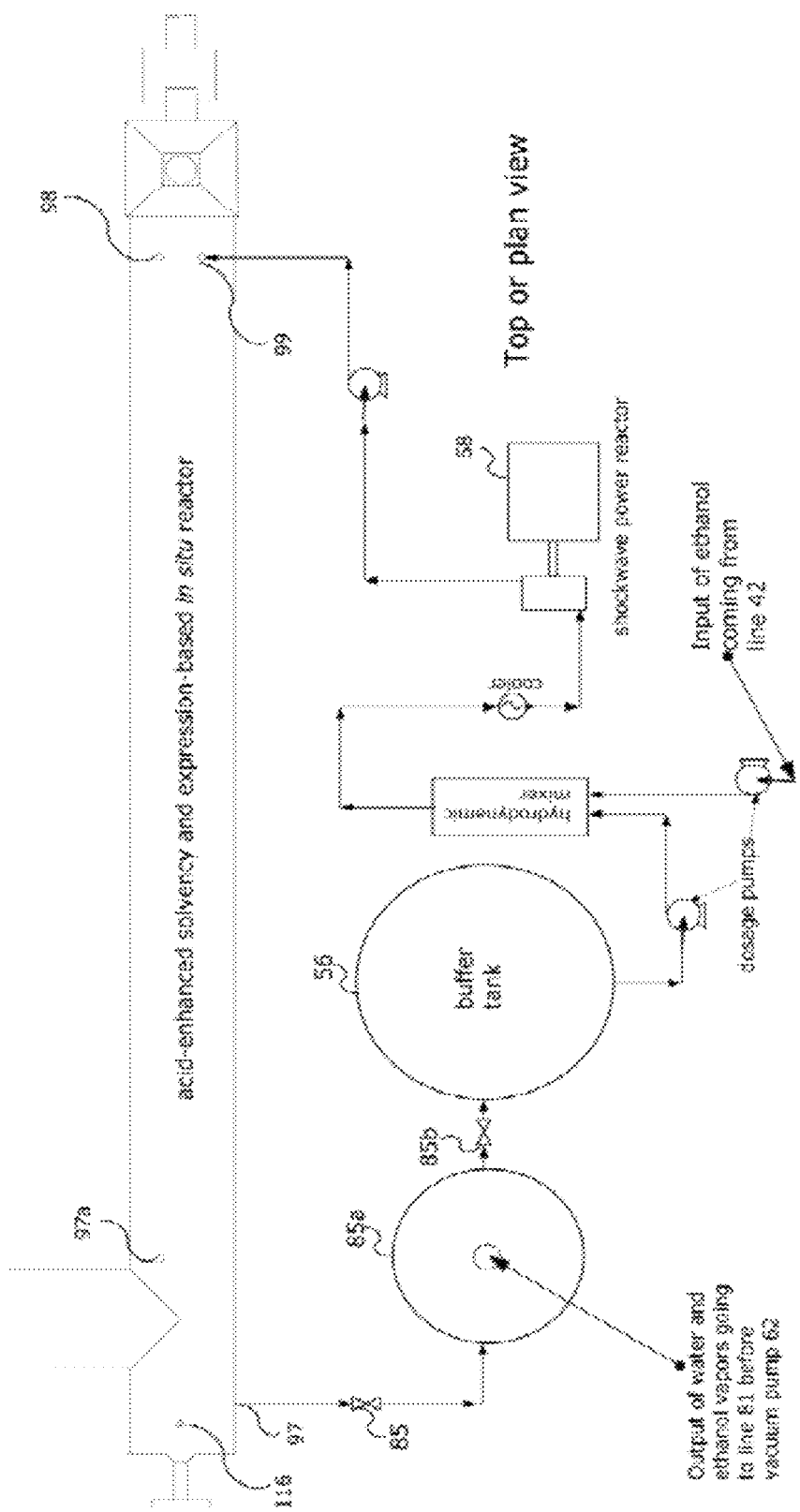
FIG. 6 shows additional details of the liquid feedback line that runs parallel to the screw of FIG. 2A.

The unfiltered, recycled liquid matter that exits the screw 16 by the porthole 97, after passing a control valve 85, enters a flash vaporization chamber 85*a*, where it loses water and ethanol vapors and where the liquid ethanol is replenished (see FIG. 6). The liquid stream then leaves the vacuum chamber through a control valve 85*b* and enters a buffer tank 56. After the buffer tank, the liquid stream is cooled in a cooler 57 to increase the solvability of polar substances in ethanol to enhance reaction rates. To enhance esterification and transesterification rates, the liquid stream goes through cavitation in a reactor 58, which is preferably a ShockWave Power Reactor marketed by Hydro Dynamics, Inc. (Rome, Ga., USA). The advertized purposes of this reactor are process intensification, mixing, increased mass transfer, and scale-free heating, which is why the temperature of the liquid stream pumped by the pump 59 to the porthole 99 of the screw 16 is compatible with the temperature inside the screw 16.

The other porthole 98 through which inputs are fed in the screw 16, receives liquid flow from a conduit 49 pumped by a pump 48. The pumped stream comes from the sulfuric acid/ethanol tank 14 with about 4.3% to 5.2% (w/w) of sulfuric acid/ethanol, as discussed above, which is different from the prior art. The amount of ethanol in that acid solution is preferably in the range of 1190% (w/w) to 1450% (w/w) of ethanol/total oil. Therefore, before starting operations, the total oil content in the original raw material is preferably determined.

To have a solution with the above stated concentration of sulfuric acid, the sulfuric acid/ethanol tank 14 is supplied by the sulfuric acid tank 12 and the ethanol tank 11, the dosages being made by valves or pumps 43 and 44. The anhydrous ethanol in the tank 11 is preferably similar to the reference Brazilian anhydrous fuel ethanol discussed above, with only about 0.7% (w/w) of water.

The KOH/ethanol tank 15 holds a solution of KOH in ethanol used to neutralize the $H_2SO_4$ in the piston-cylinder 18 and the stream that goes from the piston-cylinder reactor 19 (FIG. 2B) to the third piston-cylinder reactor 20 (FIG. 2B) and to catalyze the final basic catalysis of glycerides in the third piston-cylinder reactor 20. The total concentration of KOH for neutralization and catalysis is preferably in the range of about 7.4% (w/w) to 10.45% (w/w) of KOH/ethanol. For the final neutralization of the remaining KOH, 2.19% (w/w) to 3.78% (w/w) of $H_2SO_4$/ethanol or the equivalent amount of concentrated sulfuric acid from the sulfuric acid tank 12 is preferably used.

The dosage of KOH in the KOH/ethanol tank 15 is prepared using the dosing valves or pumps 45 and 46. The ethanol comes, as before, from the ethanol tank 11 and the KOH from an agitated mixture of KOH with ethanol of the KOH/ethanol tank 13, because although KOH is very soluble in water (see KOH/water tank 95), it is only slightly soluble in ethanol. The dosage in the KOH/ethanol tank 13 is done by solid admission of KOH flakes through a conduit 93*b* and the correspondent dosage of ethanol by the dosing valve or pump 93.

The flow 55 parallel to the screw is of thermal fluid that is used to cool the screw carcass by circulating among the two parts of them and, thereby, cooling the solid and liquid matters flowing inside the screw. This cooling is needed because the mentioned flows generate heat that must be removed, because the temperature inside the acid-enhanced solvency and expression-based extractor and in situ reactor 16 preferably remains in the range of 110° C. to 140° C.

Although significant steps have been taken to introduce the smallest amount of water with the inputs to the acid-enhanced solvency and expression-based extractor and in situ reactor 16, there is about 10% of water (w/w) in the KOH flakes, 0.7% (w/w) of water in the anhydrous ethanol, and at least 3% (w/w) of water in the dried raw material, making the flash vaporization unit 85*a* indispensable.

In FIG. 2A, anhydrous ethanol enters the ethanol tank 11 at the entrance point 91, and recycled ethanol enters the same tank 11 by way of the porthole flow conduit 64. Concentrated sulfuric acid enters the sulfuric acid tank 12 at the admittance point 92. The KOH/water tank 95 has two entrance portholes, for KOH scales and water; a conduit 55*b* delivers water solution of KOH to a mixer/neutralizer 23. A conduit 42 transports anhydrous ethanol to replenish liquid mixtures that lost ethanol and water by flash vaporization in the acid-enhanced solvency and expression-based extractor and in situ reactor 16 and piston-cylinder reactors 18, 19, 20, these last three being shown in FIG. 2B. A conduit 49 delivers a high pressure solution by pump 48 of $H_2SO_4$ in ethanol to the acid-enhanced solvency and expression-based extractor and in situ reactor 16. A conduit 47 transports a KOH solution in ethanol to neutralize the excess acid catalyst in the piston-cylinder 18 and neutralize/catalyze the basic transesterification in the piston-cylinder reactor 20 (shown in FIG. 2B). Finally, a conduit 41 delivers concentrated sulfuric acid for the final neutralization in this same piston-cylinder reactor 20.

To complete the description of FIG. 2A, the feeder-seal screw 21 discharges the solid matter through a conduit 21*a* to a cake breaker 22 that also receives pressed filter cakes (FIG.

2B) by a conduit 72. This cake breaker is preferably of the type of model SZR300 marketed by Harburg-Freudenberger Maschinenbau GmbH (Hamburg, Germany).

The solid stream exits the cake breaker 22 and goes to the mixer-neutralizer 23, a horizontal paddle mixer for pastes and filter cakes that can also receive liquid through spray bars, such as the one marketed by S. Howes, Inc. (Silver Creek, N.Y., USA). Metering the amount of KOH water solution to be admitted through the conduit 55b depends on a pH measurement of the cakes mixture. Regardless, since the majority of the soils in tropical and subtropical regions are acidic, it may be preferable to increase the pH above 6.

From the mixer-neutralizer 23 the solid stream goes to a rotary dryer 24, which may be similar to the steam heated rotary dryer marketed by Desmet Ballestra North America, Inc.

Before exiting the system through a conduit 90, the chemically-enhanced organic fertilizer is preferably cooled, weighed, and packaged in 20-kg sacks of multiwall paper with a water-repellant polyethylene layer between the papers in packaging system 25.

The last apparatus in the extractor, in situ reactors/separators, and final preparation subsystem shown in FIG. 2A is a hydraulic power unit 26, such as the V-pak low profile variable displacement power unit marketed by Parker Hannifin Corp. (Cleveland, Ohio, USA) that supplies power to the hydraulic motors, actuators, and eventually the servo valves. Two hydraulic double fluid conduits 82, 83 supply the hydraulic motors and cylinders and collect back the hydraulic fluid to the power unit 26.

The top of FIG. 2B is a continuation of the bottom of FIG. 2A. The piston-cylinder reactor 18 is fed by a conduit 86 that goes through a servo valve 84 after leaving the screw 16 through the porthole 96 (on FIG. 2A). The porthole 96 delivers a filtered mixture of liquids, and, from time to time, the piston-cylinder reactor 18 sends back a pressure wave to clean the ceramic membranes filters. After receipt of the mixture of liquids and the closure of a valve 86b (the valve 42b being already closed), that mixture is forced mainly such that the FFA contained in it is esterified. Toward that end, the cooler circuit 94 decreases the mixture's temperature to within the range of about 5° C. to 15° C. to enhance the solubility of polar molecules in ethanol. Additionally, rapid back-and-forth movements of the piston create and destroy hydraulic cavitation micro-bubbles, decreasing the mass transfer barrier. After about 5 minutes, the piston goes to its backward course, which creates a sudden pressure drop in the fluid and starts flash vaporization of ethanol and water that leaves the cylinder via holes in the cylinder surface. These vapors escape through a vacuum chamber 78 linked to a vapor conduit 81 connected to a vacuum pump 65.

After the flash vaporization, with the valves 86b, 86c, 42b closed, a forward movement of the piston measures the amount of liquid remaining in the reactor, and based on that amount, the amount of ethanol that has exited the mixture is calculated. The valve 42b is opened, the intake of ethanol is measured by the piston position, and the cycle restarts. Before that, a conduit 47b introduces KOH-ethanol to neutralize the excess $H_2SO_4$.

Operating in this way for 20 to 40 minutes, the cylinder contents are emptied by flow through a conduit 87 to the buffer tank as shown on FIG. 2B. If the original raw material had more than about 35% (w/w) of FFA, this buffer tank should have more than 0.5% (w/w) of FFA, the maximum content that should be allowed before starting the base-catalyzed transesterification in the piston-cylinder reactor 20. Therefore, the second piston-cylinder reactor 19 receives a liquid stream by a conduit 88 from the first buffer tank and repeats the operations described in the preceding paragraphs, except for the excess $H_2SO_4$ neutralization step, until the FFA content goes below 0.5% (w/w). Only then are its contents emptied into the second buffer tank.

If the first buffer tank contains less than 0.5% (w/w) of FFA, the use of the second piston-cylinder reactor 19 is omitted and the first buffer tank feeds directly to the piston-cylinder reactor 20 through a conduit 88 by closing a valve 88b and opening a valve 88c.

Either way, the piston-cylinder reactor 20 receives a liquid stream with less than 0.5% (w/w) of FFA. The reaction that takes place in the reactor 20 is a basic-catalyzed transesterification of mono-, di-, and tri-glycerides. Ethanol and KOH comes from the conduit 47. The operation is similar to the one described for acid esterification of FFA, except that the temperature is preferably in the range of about 90° C. to 120° C. to enhance the solubility of these non-polar molecules in ethanol. After completion of the reaction, KOH is neutralized with $H_2SO_4$ coming from a conduit 41. Since this final neutralization generates the salt $K_2SO_4$ and water, this water is preferably eliminated by a final flash vaporization.

At this point, the stream going to the third buffer tank is composed predominantly of FAEEs (biodiesel), glycerol, and $K_2SO_4$. This content is pumped through a conduit 77 to one of the preferably two electrically-enhanced decanters 28.

Each electrically-enhanced decanter 28 is composed of two concentric spheres made of copper alloy serving as electrical poles, as shown in FIG. 2B, of a static electrical field with the negative pole in the inner sphere and the positive pole in the outer sphere. The external sphere, divided into two connected hemispheres, supports the inner sphere by insulant material supports 77a, 77b (and two others not shown). Biodiesel is less dense than glycerin and, so, after decantation, the biodiesel stays above the glycerin and is discharged by a conduit 76 to a buffer tank. The glycerin below the biodiesel is discharged through the conduit 74.

From its buffer tank, the biodiesel is pumped by a conduit 67 through a metering valve 67b to a metering and mixing tank 68. This tank 68 also receives a measured amount of bone charcoal through an opening 69b. Bone charcoal is an adsorption material to remove the impurities mixed with the FAEEs. The mixing in tank 68 is preferably enhanced by a Shock-Wave Power Reactor similar to the one discussed earlier. From this tank the biodiesel and bone charcoal mixture is pumped by a pump 73 to pressure filters system 30. After filtering the biodiesel, the same filter system is used to filter the glycerin from, for example, $K_2SO_4$. The glycerin arrives to the motor pump 73 by a conduit 74a. The divided use of the pressure filter system 30 is controlled by a pair of valves 74b, 74c. The closure of the pressure filters is made by the pressure hydraulic cylinders 83a, connected to the feed hydraulic fluid conduit 83.

Two liquid streams and one solid one exit from the pressure filter system. One liquid stream 70 is the exit stream of purified biodiesel and the other liquid stream 71 is the exit stream of glycerin. The solid material stream 72, as already mentioned, goes to a cake breaker 22.

Figure 4:
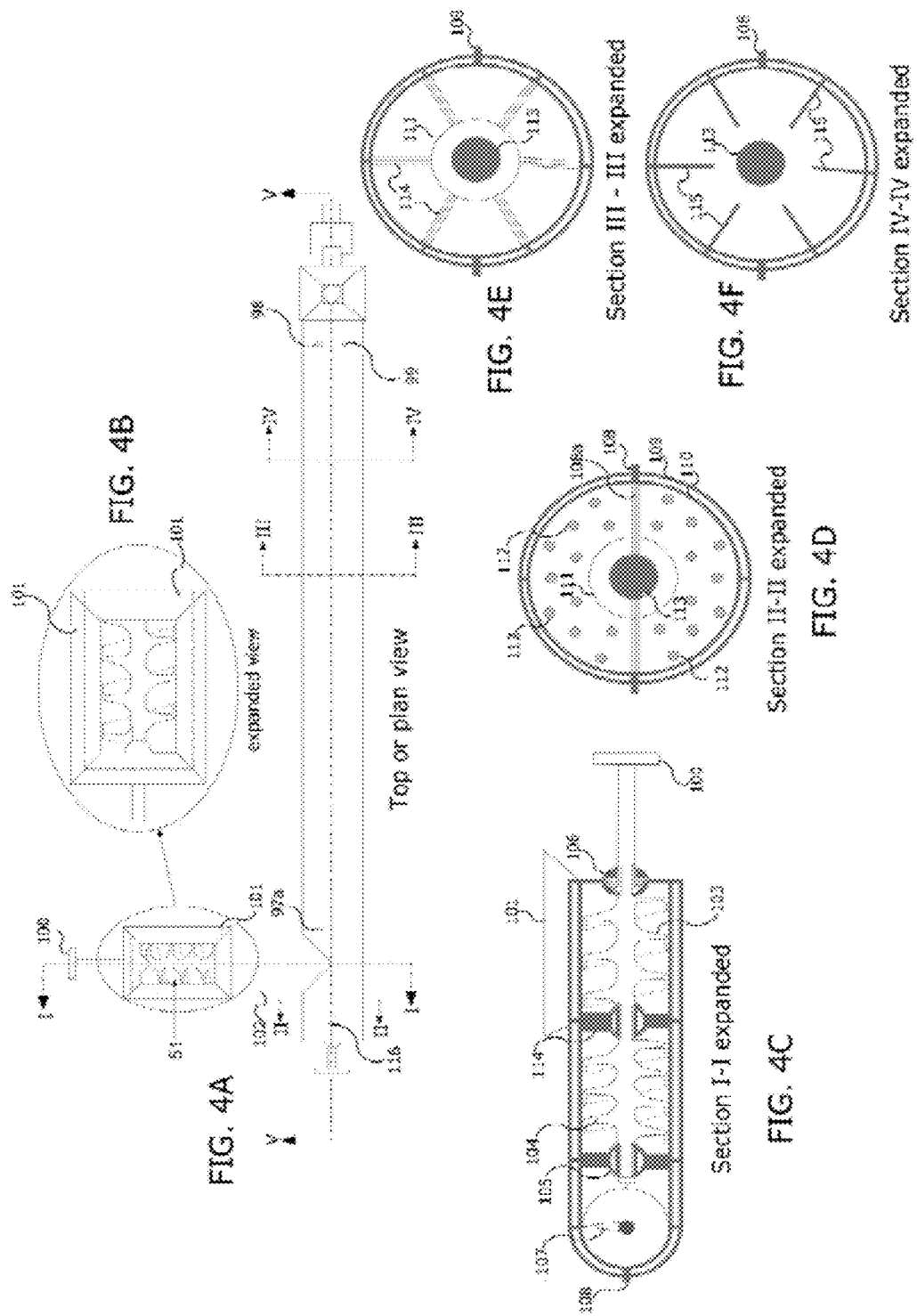
FIG. 4A schematically shows a sketch of a top or plan view of the main equipment of an acid-enhanced solvency and expression-based extractor and in situ reactor.
FIG. 4B shows an expanded view of the hopper of the reactor system of FIG. 4A.
FIG. 4C shows a cross sectional view along Section I-I of FIG. 4A.
FIG. 4D shows a cross sectional view along Section II-II of FIG. 4A.
FIG. 4E shows a cross sectional view along Section III-III of FIG. 4A.
FIG. 4F shows a cross sectional view along Section IV-IV of FIG. 4A.

FIG. 4A shows the position of five section plans of the equipment. The section plans (FIGS. 4B through 4F) use shades of gray instead of hatching to indicate materials cut by the section, with the exception that the screw cuts remain white. This plan view presents five section lines: I, a vertical plane along the longitudinal axis of the forced feeding screw; II, a vertical-transversal plane showing the ceramic membrane filters; III, a vertical-transversal plane depicting an internal thrust bearing and its supports; IV, a vertical-transversal plane showing the inserts put in parts of the screw without threads to avoid rotational motion of the solid matter; and V, a vertical-longitudinal plane by the middle of the screw.

The loading of the screw with comminuted, cooked, and dehydrated oil- and fat-containing material is through a conduit 40. The entrance includes a hopper 101. The top view (FIG. 4A) shows the external wall 102 of the carcass of the forced feeding screw 104 (see FIG. 4B) and the entrance porthole 97*a* to the liquid expelled by the screw 104. The plan view (FIG. 4A) also shows an air exit porthole 116; an entrance porthole 98 admits a fresh solution of water and $H_2SO_4$; and an entrance porthole 99 receives the feedback flow of the liquid stream starting on the porthole 97 (see FIG. 5C).

Referring to FIG. 4C, a part 100 of the coupling links the feeding screw with the variable rotation hydraulic motor that moves it. The rotation speed of this motor is preferably in the range of about 20 rpm to 60 rpm. FIG. 4C also shows the pitch 103 of the feeding screw in its load-receiving part, the smaller pitch 104 of the other part of the feeding screw, the sliding bearing 105 at the end of the feeding screw, the thrust and sealing bearing 106 at the beginning of the same screw, a section 107 of the main screw thread, and the gasket-sealed flanges 108 that unites both parts of the screw carcass.

FIG. 4D shows the carcass-linked wall that separates a small part of the screw with ceramic membrane-filtered liquid from the main body of the screw, with unfiltered liquids and solids. FIG. 4D also shows the gasket flanges 108 that unite both halves of the screw; the part 108*a* of this flange 108 that is inside the screw in the carcass-linked wall just mentioned, the external wall 109 of a casted carcass; the internal wall 110, a space between the internal wall 110 and the external wall 109 where forced circulation of cooling fluid takes place, the outside projection 111 of the thrust bearing linked to the separation wall, the ceramic membrane filters 112 inserted in the dividing wall, the pores size of these ceramic membrane filters being in the range of about 5 to 15 microns, and a section 113 of the screw where plane II-II intersects it.

FIG. 4E shows casted fusiform supports 114 of the thrust bearing 111 and a section of the screw where there are no threads. The two parts of the flange 108 are united by nuts and bolts (not shown) that apply pressure to the gasket (not shown).

FIG. 4F shows casted inserts 115 that, as previously mentioned, stop eventual rotation movements of the solid matter.

Figure 5:
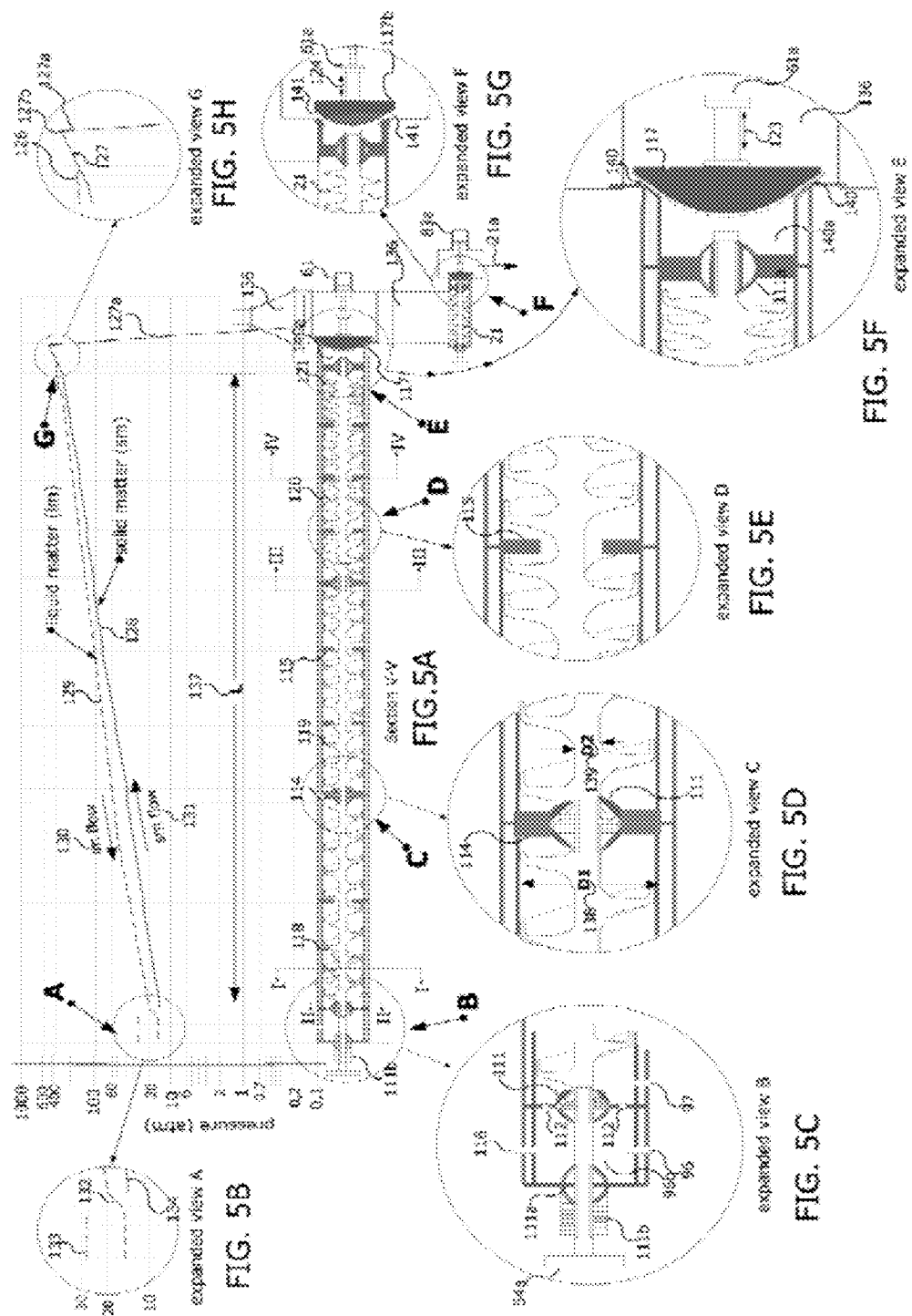
FIG. 5A shows a vertical-longitudinal view along Section V-V of FIG. 4A along with a graph of predicted conditions along the length of the screw.
FIG. 5B shows an expanded view of Circle A of FIG. 5A of the expected pressure distribution at the beginning of the screw.
FIG. 5C shows an expanded view of Circle B of FIG. 5A of the initial part of the screw showing a thrust bearing and a sealing bearing.
FIG. 5D shows an expanded view of Circle C of FIG. 5A of an internal thrust bearing of the screw.
FIG. 5E shows an expanded view of Circle D of FIG. 5A of inserts in the regions of the screw without threads.
FIG. 5F shows an expanded view of Circle E of FIG. 5A of the end of the screw with a slide plain bearing and a choke that limits the area for the cake exiting the machine.
FIG. 5G shows an expanded view of Circle F of FIG. 5A of the exit of the cake from the vacuum chamber and the sealing effect of a choke.
FIG. 5H shows an expanded view of Circle G of FIG. 5A of the expected pressure distribution at the end of the screw.

In FIG. 5A although the screw is sectioned, the sectioned portions are not grayed as the other sectioned portions are. The expected pressure curves of the solid matter transported preferably linearly by the effect of the thread are shown above the screw section. The expected pressure curves of the liquid matter that flows along the helical path of the screw in counter-current to the solid matter are also shown.

FIGS. 5A through 5H show a functioning principle of the screw: the solid matter (sm) expected pressure curve generated by the rotation of the screw. This curve, as well as an expected liquid matter (lm) curve, is shown above the longitudinal section of the screw, with spatial correlation between them. As can be seen in FIG. 5B, liquid pressure in the first part of the screw is about 16 atm, for the safety reason explained above, and, for a limited time, the pressure goes up to about 28 atm, when a pressure pulse 133 to clean the ceramic membrane filters is sent from the piston-cylinder reactor 18 (FIG. 2B). Also in FIG. 5B, the pressure drop 132 in the ceramic filters and the beginning of the sm curve 134 are shown.

At the other extreme of the pressure curves (FIG. 5H), the rapid solid matter pressure increase 127 in the space just before the choke 117 is shown, as well as the large and rapid pressure drop 127*a* after the choke 117 and inside the vacuum chamber 136. Since the Y-axis (pressure axis) is in logarithmic scale, although the expected pressure curves are represented by straight line segments, they are really exponential curves. Therefore, the expected solid matter curve 128 increases exponentially from about 16 atm to about 500 atm. It is presumed that the liquid matter pressure curve 129 is above the solid matter one, since its start 126 shown in FIG. 5H. At that point the lm pressure is above the sm curve; otherwise the liquid would not enter in the porthole 98 (FIG. 4A).

The solid matter flow 131 goes from left to right, pushed by the screw threads, and the liquid matter flow 130 goes from the right to left in FIG. 5A, following the decreasing solid matter pressures. The relations between the length dimension L 137, the screw external diameter D1, 138, and the internal (shaft) diameter D2, 139 (see FIG. 5D) are very different from those found in conventional oil screw presses or for expeller screws used in vegetable oil extraction. For example, in a preferred embodiment, L/D1 is greater than 16 and in conventional expellers this number varies between 4 and 9; and D1/D2 is greater than 5 rather than in the conventional range of 1.2 to 1.6, an even greater difference, that is easily understandable in the case of the diameters quotient because, in our case, the liquid flow runs helicoidally along the length of the screw and in the expeller's case the liquid flow is transversal and radial from the shaft to the drainage barrel (carcass).

As shown in FIG. 5A there are eight spots 114, 115 along the screw where the threads or flights are interrupted: six 115 where inserts extend from a casted carcass and two 114 that support the thrust bearings. These thread interruptions are preferred to avoid sliding of the solid matter in a rotational movement instead of the desired linear one. The interrutions 114, 115 are even more important where the sm pressure is bigger. For some sticky original raw material, more than 8 threads interruptions may be needed. Therefore, this number is considered a minimum. The different screw pitches 118, 119, 120, 121 are also shown and labeled in FIG. 5A.

FIG. 5C shows the flange 54*a* that links the screw to the hydraulic motor that rotates it preferably in the range of about 20 to 60 rpm, the sliding bearing 111*a* at the beginning of the screw/carcass, the connected sealing bearing 111*b,* a Mitchell-type thrust bearing 111 that is used in all thrust bearings of the screw, the ceramic filters 112 with pore sizes preferably in the range of about 5 to 15 microns, the porthole 116 for the elimination of air during the beginning of the screw operation, the porthole 96 that exits the filtered liquid stream and also admits pressure waves for cleaning the ceramic membrane filters, and the exit porthole 97 for the feedback liquid stream detailed in FIG. 6.

FIG. 5D shows the Mitchell-type thrust bearing 111, the fusiform supports 114 of this bearing attached to the carcass, the external diameter 138 of the screw, and the internal diameter 139 of the screw or its shaft.

FIG. 5E depicts an enlarged fusiform insert 115, which may also be casted with the carcass. The different pitch of the screw is noticeable in comparing FIGS. 5D, 5E, and 5F.

FIG. 5F shows the end of the screw, where the solid matter is discharged to the vacuum chamber 136. FIG. 5F also shows a section 111*a* of the final sliding bearing and the variable distance 140 between the choke 117 and the conical section end of the screw carcass, that distance being in the range of about 0.5 mm to 5.0 mm, the smaller the distance the higher the pressure 127*b* (see FIG. 5H) in the exit chamber 140*a*.

Inasmuch as the choke 117 is attached to a hydraulic cylinder 61 by a flange 61a to provide an adjustment length 123 (see FIG. 5F), the choke not only determines the distance 140 just mentioned, but it acts like a shock absorber to any fluctuations in chamber 140a pressure.

FIG. 5A shows the solid matter exit screw 21 that discharges the solid matter through a chute 21a to a cake breaker equipment 22 (see upper right part of FIG. 2A). This exit screw, that provides a seal to a vacuum chamber 136, has a choke 117b, similar to the one just described, that is moved by a hydraulic cylinder 83a, which varies the distance 141 (see FIG. 5G) and balances variations 124 of pressure in the exit chamber.

FIG. 6 show details of the liquid feedback line that runs parallel to the screw. The purposes for this external and parallel flow include eliminating water by flash vaporization of water and ethanol, reintroducing in the liquid mixture the amount of ethanol extracted, cooling the mixture to enhance polar components esterification, and agitating the mixture through cavitation to further enhance the esterification and heat the liquid for reintroduction into the main equipment.

FIG. 6 shows the stream that recirculates the liquid matter of the screw from the exit porthole 97 to the entrance porthole 99. Before describing the several transformations experienced by this recirculating stream, a key function of this feedback should be explained: the exit porthole 97, as shown in FIG. 5C, is located before the dividing wall, where liquids are filtered by ceramic membranes 112. Therefore, they are loaded with very small organic particles suspended within the liquid. As mentioned above, oil-bearing materials with an oil content above 25% (w/w) are difficult to extract, because they interfere with the drainage of the miscella from the solid residue as well as clogging the hexane recovery condensers. With screw presses or expellers, the small organic particles are also present and a long time would be required to separate by decantation.

The feedback of organic particles, suspended within the liquid stream, allows the pressure filtration of these suspended solids by the solid matter stream that moves inside the screw in countercurrent to the liquid stream containing the organic particles. Therefore, the backflow that cleans the ceramic membrane filters 112 can happen over longer time intervals.

Returning to FIG. 6, the valves 84, 85 (see FIG. 2A) function to keep the pressure in the chamber 96b (see FIG. 5C) above about 16 atm. FIG. 6 also shows a flash vaporization tank 85a where mainly water, but also some ethanol, are eliminated from the liquid stream. A valve 85b commands the transfer of the liquid stream to a buffer tank 56. The liquid is removed from this buffer tank by a dosage pump that impels it to a hydrodynamic mixer together with replenishment ethanol that is pumped from another dosage pump. After the mixer, the liquid stream replenished with ethanol is cooled to a temperature range of about 5° C. to 15° C. to enhance the solubility of polar molecules in the ethanol. After the cooler, the mass transfer barrier is further diminished in a Shock-Wave Power Reactor 58. Leaving this reactor 58, the liquid stream is pumped to the high pressure needed to enter the porthole 99.

In contrast to conventional solvent-based extractors or diffusers, in which the liquid velocity is not controllable and generally depends only on the acceleration of gravity, in the screw the liquid velocity is controllable because it correlates positively with: i) the pressure difference between the liquid streams that enter the screw by the portholes 98 and 99 (see FIG. 6) and the solid matter pressure at these points, ii) the steepness of the solid matter pressure rise shown in FIG. 5A, and iii) the porosity of the solid material that is inversely correlated to the steepness mentioned in ii) and directly correlated to the amount of fibers in the solid matter.

Figure 7E:
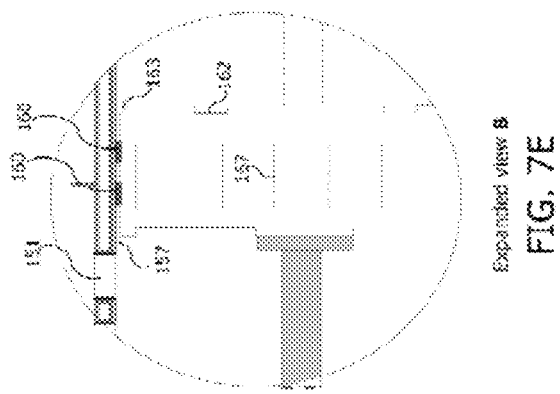
FIG. 7E shows an expanded view of Circle B of FIG. 7A of the piston and its relation with vapors exit portholes.
Figure 7B:
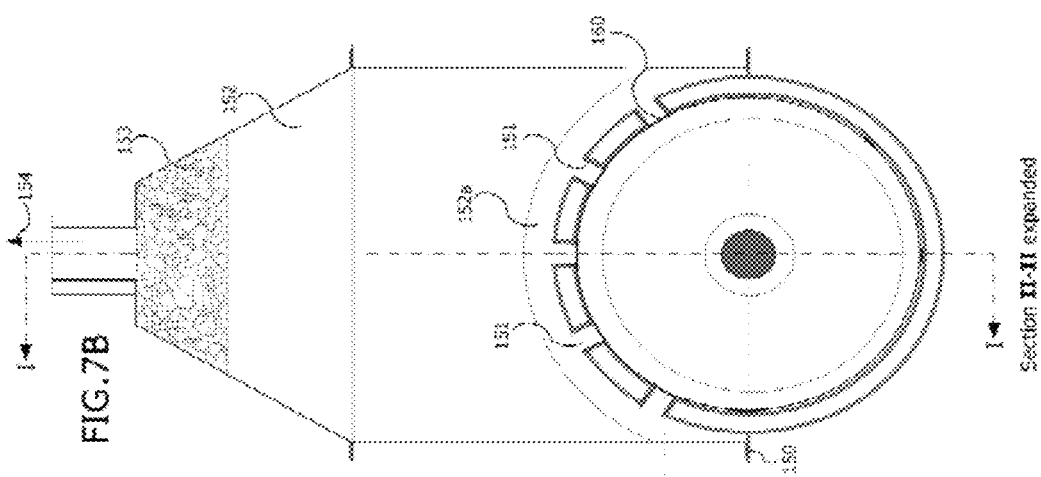
FIG. 7B shows a vertical cross sectional view of the piston-cylinder reactor along Section II-II of FIG. 7A.

FIGS. 7A through 7E show the piston-cylinder reactor. FIG. 7A shows the piston of a piston-cylinder reactor in three positions, including a fully closed and a fully open position. The cylinder carcass is depicted with a double wall for refrigeration, and the vacuum chamber receives water and ethanol vapors. FIG. 7B shows the portholes where vapors exit the cylinder to the vacuum chamber, as well as the exit spot of these vapors after being separated from liquid drops.

FIG. 7A shows the rod 160a that is attached to the piston-cylinder reactor and the hydraulic cylinder that moves it, six reinforcements 155 of the casted cover of the casted cylinder which has a flange, an equivalent cover flange being bolted with a gasket between the two parts of the flange, a composite material sliding bearing 164 and bearing seals 165, also preferably of composite material. The piston 167 is shown in three positions: i) fully closed, where the dashed cylinder is at the right side of Section I-I, ii) with the reaction chamber fully open, indicated by the non-dashed cylinder at an distance L1 145 from the fully closed position, and (iii) fully open (at the extreme left of Section I-I) for flash vaporization, that is, with the vapor exit portholes 151 fully open.

The total volume of the reaction chamber is proportional to distance L1 145 and the square of the diameter D 165. The length with the exit portholes 151 fully open is L2 146, and the total chamber volume during flash vaporization is proportional to the length L 147 and the diameter D 165 squared.

FIG. 2B shows three piston-cylinder reactors identical to the one of FIGS. 7A-7E being used. One difference between the three reactors is that the first two 18, 19 (see FIG. 2B), use an acid catalyst, mainly for esterification reactions, and the third 20 uses a basic catalyst to transesterify mono-, di-, and tri-glycerides and, eventually, other non-polar molecules present. Another difference is that the porthole 142 in the first cylinder is used to input the liquid stream and also to output it, as a backward flow occurs to clean the ceramic membranes filters 112 in FIG. 5C and FIG. 6, but in the other two piston-cylinders the porthole 143 is only used for the input of liquid material. The other porthole 144 is used as exit of the three cylinders to buffer-tanks.

Referring to FIG. 7A, two piston rings 160 seal the piston, sliding over the cylinder sleeve 157. This cylinder sleeve is welded to a circular sleeve 158 at the extreme right of the piston-cylinder reactor. The circumference on the face 156 of the piston is machined 163 to fit this weld seam. Similarly, two holes 162 are made in the surface 156 to fit the sleeves of the portholes 142, 143, 144 welded to the circular sleeve 158.

The carcass of the cylinder may be casted in two double walled halves, bolted together with a gasket in between as shown in flanges 150 of FIG. 7C. The space between these walls is used, as in the case of the screw, to cool the cylinder. As already mentioned, the cylinders 18, 19 preferably function with temperatures in the range of about 5 to 15° C., and the cylinder 20 functions with temperatures in the range of about 90 to 120° C. FIG. 7C also shows the cover's flange 148 and, in a dotted line, the internal circumference 168 of the cylinder.

FIG. 7A shows the vacuum chamber 78 where ethanol and water vapors are collected after leaving the cylinder, the exit 154 of these vapors to a vapor line 81 (see FIG. 2B) after crossing the demister 153 where liquid droplets are separated.

Figure 7D:
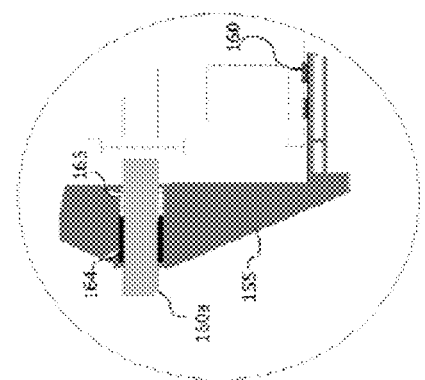
FIG. 7D shows an expanded view of Circle A of FIG. 7A of piston rings and the sealing and linear bearing of the cylinder's lid.

FIG. 7D shows, in a more visible way, the linked pistons rod 160a, the cover 155, the sliding bearing 164, the seal 165, and piston rings 160.

FIG. 7E depicts a porthole 151, piston rings 160, the sleeve 157, the machined details on the piston face 156 in its circumference 163, fitting holes 162, and the casted piston structure 167.

FIG. 7B shows a vertical transversal view of the piston-cylinder with the vapor portholes 151 and piston rings 160. FIG. 7B shows in a background view a flange 152 where the vacuum chamber 78 joins the cylinder, a flange 150 in that part of the equipment which, in addition to joining the two halves of the cylinder's carcass, also connects the vacuum chamber 78 to the cylinder, a section 153 of the demister, and a section 154 and a background view of the vapors exhaust pipe.

Referring to FIGS. 8A through 8H, the liquid mixture to be decanted comes from line 77, goes through valve 176, and enters the decanter by a pipe 196 that ends very close to the inner sphere (the negative static electrical pole) to provide a laminar flow discharging over that pole. The intention is to have positive material (e.g., glycerin) flowing along the surface of the inner sphere, while negative material is expelled by this negative pole. The expelled negative droplets coalesce by a phenomenon that is explained below with respect to FIG. 9. The small and coalesced droplets are impelled to the positive pole (the outer sphere) by a static electrical field.

Two interfaces determine two important levels: the interface 174 between air and biodiesel and the liquid interface 173 between biodiesel and glycerin. These two levels are monitored by the position of buoys 175, 175b, calibrated (weight versus buoyant up thrust) to be in equilibrium at these interfaces. The positions of these two buoys are determined by servo valves 176, 177, 178. The first, as already said, regulates the entrance of the mixture to be decanted, the second regulates the flow of biodiesel out of the decanter, and the third regulates the flow of glycerin out of the decanter.

FIG. 8C shows the line 197 that guides the buoy 175b, which determines the level 173 by the sensor 198 (depicted in FIG. 8A), which measures the position of the buoy. A mechanical ring 171 is used to move the inner sphere.

FIG. 8D shows one of four insulated supports 185 that link the inner and outer spheres. These supports are screwed in fixed nuts 186, one with clockwise threads and the other with counterclockwise threads. FIG. 8D also shows the flanges 191 where, with the help of a sealing gasket, the upper external hemisphere is bolted to the bottom one (bolts not shown), a background view of the lines 192 joining the flanges inside of the external sphere, and the circumferential weld 181 that joins permanently the upper and bottom hemispheres of the internal pole.

FIG. 8E shows in more detail the servo valve 176 that admits the mixture to be decanted already mentioned, as well as, part of the insulation layer 196 of the sphere. A sensor 198 (e.g., a sonic one) measures the position of the buoy 175 that floats at the air-biodiesel interface. FIG. 8E also shows the guiding line 170 of the buoy 175, the biodiesel exit porthole being linked with the exit servo valve 177, which is linked to the biodiesel line 76, and a mechanical ring 183 to attach the moving gear that dismount the upper hemisphere. Whenever the level 174 is below the position shown in FIG. 8A, with the servo valves 177, 178 closed, the servo valve 176 is opened, taking care that if the level 174 goes too close to the sensor 198, the air vent valve 176b and the servo valve 176 are both closed together. If the level 173 gets too low, the servo valve 178 is closed and the servo valve 176 opened.

Whenever biodiesel is not exiting the decanter together with glycerin, all three servo valves should be closed to allow sufficient time for the decantation.

FIG. 8G shows a salt (e.g., $K_2SO_4$) chamber 179 that is cleaned periodically of the precipitated salts dissolved in glycerin that did not exit the system. The porthole lid 184 is present for that purpose. Whenever the flow through glycerin valve 178 diminishes, it is an indication that the decanter is to be emptied to clean the salts accumulated in the chamber 179. This is one reason for the use of two decanters. FIG. 8G also shows a wall cut of the inner sphere 188 and of the outer sphere 189, which has the walls of the chamber 179 welded to it and an electric insulation layer 190 (e.g., projected polyurethane rigid foam) that externally covers the outer sphere, including its protuberances 187, 191, 196.

The position of the horizontal plane that cuts the apparatus and generates FIG. 8B is shown in the upper part of FIG. 8A. This horizontal cutting plane is off-center and looks downward. Therefore FIG. 8B shows the "petals" into which the sphere was divided. These petals overlap each other and are lap joint-welded or soldered, as they are preferably made from copper alloy sheets.

FIG. 8B shows the borders 194 of the petals forming the inner sphere, the visible parts 195 of the external sphere petals, and the mechanical rings 183 for lifting the upper hemisphere of the external sphere. In some embodiments, four rings are preferred, the same happening with the ring 171 of the inner sphere. The location of the plane that generates FIG. 8A is also shown in FIG. 8B.

FIG. 8F shows a cut of the mechanical ring 183, the welded lap joint 182, parts of the insulation layer 190, and the welded lap joint 181 of the inner sphere. FIG. 8H shows an enlarged view of lap joint 181.

Figure 9:
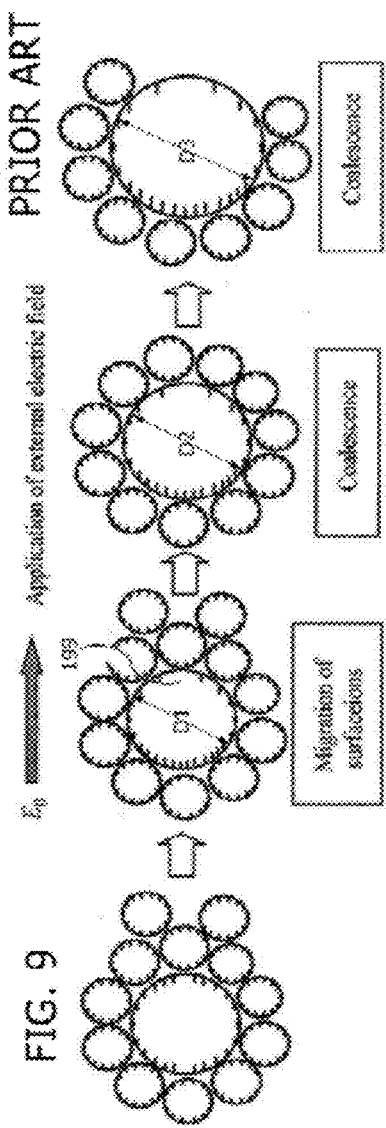
FIG. 9 shows the effect of a static electrical field in the coalescence of droplets of biodiesel as reported in the prior art.
Figure 10:
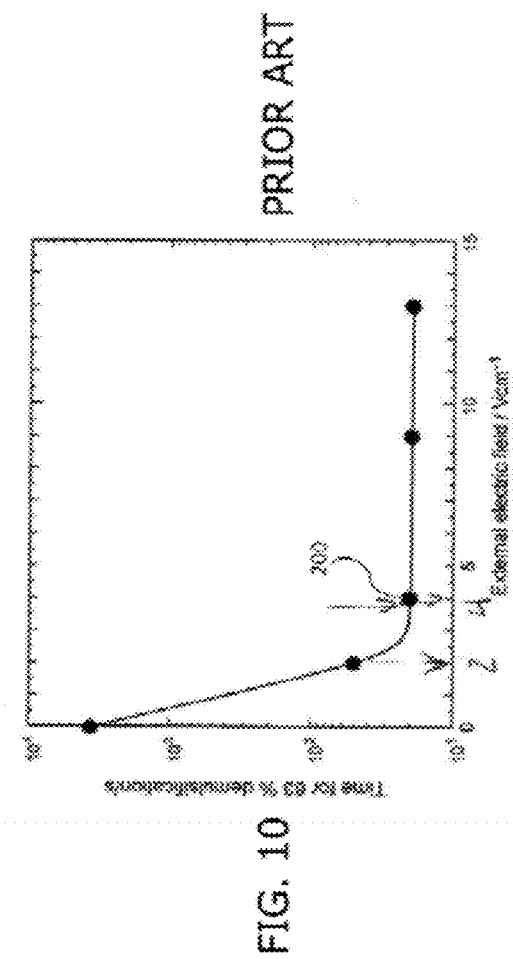
FIG. 10 shows the intensity of a static electrical (V/cm) field as a function of the time spent for 63% of destroyed emulsification as reported in the prior art.

FIG. 9 and FIG. 10 are reproductions of figures from Ichikawa ("Electrical demulsification of oil-in-water emulsion", *Colloids and Surfaces A: Physicochem. Eng. Aspects*, Vol. 302, pp. 581-586, 2007). FIG. 9 shows a schematic representation of droplets coalescencing within a static electrical field. Surface ions of the larger droplet are repelled by the equally-charged superficial ions of smaller droplets. A smaller superficial charge diminishes the repulsion of the smaller droplets by the bigger one and, therefore, the smaller droplets are engulfed by the bigger one. FIG. 10 shows the measured correlation between the intensity of the static electrical field (in V/cm) with the time (in s) spent to eliminate 63% of the emulsification of oil in water. For this reason, the preferred range of the electrical field in some embodiments of the present invention is about 2 to 5 V/cm. If the distance between the spheres is 20 cm, such as in FIG. 8A, the electrical potential between the poles is, respectively, 40 V and 100 V.

All above-mentioned references are hereby incorporated herein by reference.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A process of production of a biodiesel product comprising a fatty acid ethyl ester product, the process comprising the steps of:
   a) processing at least one raw material source comprising an average of at least 0.5% by weight of free fatty acids in total oil;
   b) extracting the free fatty acids and other reactive lipids from the raw material source and reacting the free fatty acids and other reactive lipids with ethanol using an acid catalyst and a base catalyst to form the fatty acid ethyl ester product, comprising the substeps of:
  i) feeding the raw material source using a screw against a countercurrent liquid flow comprising the ethanol and the acid catalyst to react with the free fatty acids and other reactive lipids; and
  ii) recycling at least a portion of the countercurrent liquid flow through the screw after flash dehydrating and passing the portion of the countercurrent liquid flow through a cavitation reactor;
c) transesterifying any unreacted lipids with ethanol using a base catalyst; and
d) separating the fatty acid ethyl ester product from a glycerin byproduct.

2. The process of claim 1, wherein the ethanol comprises anhydrous bioethanol.

3. The process of claim 1, wherein steps a), b), c), and d) occur at a single biodiesel production plant.

4. The process of claim 1, wherein step b) occurs in an acid-enhanced solvency and expression-based extractor and in situ reactor.

5. The process of claim 1, wherein step a) comprises the substeps of:
  filtering and steam washing the raw material source to remove dirt, stones, and sand;
  milling the raw material source;
  heating and cooking the raw material source; and
  dehydrating the raw material source to remove excess water.

6. The process of claim 1, wherein the step of feeding the raw material source using the screw against the countercurrent liquid flow comprising the ethanol and the acid catalyst to react with the free fatty acids and other reactive lipids occurs within a temperature range of about 110 to about 140 ° C., wherein the acid catalyst comprises sulfuric acid.

7. The process of claim 1, wherein step c) comprises the substeps of:
  partially neutralizing a liquid stream formed in step b) with a base;
  esterifying unreacted free fatty acid using an acid to a concentration less than or equal to 0.5% by weight; and
  transesterifying the liquid stream with a base catalyst.

8. The process of claim 7, wherein the base and the base catalyst comprise potassium hydroxide.

9. The process of claim 7, wherein the substeps of partially neutralizing the liquid stream formed in step b) with the base and esterifying unreacted free fatty acid using the acid to a concentration less than or equal to 0.5% by weight occurs in at least one piston-cylinder reactor with a residence time in a range of about 20 to about 40 minutes and a temperature within a range of about 5 to about 15 ° C.

10. The process of claim 1, wherein step d) comprises the substeps of:
  decanting the fatty acid ethyl ester product from the glycerin byproduct;
  metering and mixing the fatty acid ethyl ester product with an adsorption material to remove impurities from the fatty acid ethyl ester product; and
  pressure filtering fatty acid ethyl ester product and the adsorption material to separate the fatty acid ethyl ester from the adsorption material and impurities.

11. The process of claim 1 further comprising the step of processing a solid fraction of the raw material source formed in step b) to produce a chemically-enhanced organic fertilizer product.

* * * * *